(12) United States Patent
Yuki

(10) Patent No.: US 9,372,874 B2
(45) Date of Patent: Jun. 21, 2016

(54) CONTENT PROCESSING APPARATUS, CONTENT PROCESSING METHOD, AND PROGRAM

(71) Applicant: Panasonic Intellectual Property Corporation of America, Torrance, CA (US)

(72) Inventor: Yasuhiro Yuki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 267 days.

(21) Appl. No.: 14/115,891

(22) PCT Filed: Mar. 13, 2013

(86) PCT No.: PCT/JP2013/001672
§ 371 (c)(1),
(2) Date: Nov. 6, 2013

(87) PCT Pub. No.: WO2013/136792
PCT Pub. Date: Sep. 19, 2013

(65) Prior Publication Data
US 2014/0081956 A1 Mar. 20, 2014

(30) Foreign Application Priority Data
Mar. 15, 2012 (JP) .................. 2012-058283

(51) Int. Cl.
*G06F 17/30* (2006.01)
*H04N 5/232* (2006.01)
(Continued)

(52) U.S. Cl.
CPC ............ *G06F 17/3028* (2013.01); *H04N 5/232* (2013.01); *H04N 5/23216* (2013.01);
(Continued)

(58) Field of Classification Search
CPC .................................................. G06F 17/3028
See application file for complete search history.

(56) References Cited

U.S. PATENT DOCUMENTS 8,488,840 B2 7/2013 Fukumoto et al.
8,503,735 B2 8/2013 Morita
(Continued)

FOREIGN PATENT DOCUMENTS

JP 2006-081021 3/2006
JP 2008-136024 6/2008
(Continued)

OTHER PUBLICATIONS

International Search Report issued Jun. 18, 2013 in International (PCT) Application No. PCT/JP2013/001672.

*Primary Examiner* — Kris Mackes
(74) *Attorney, Agent, or Firm* — Wenderoth, Lind & Ponack, L.L.P.

(57) ABSTRACT

A content processing apparatus according to the present disclosure includes: a content input unit that acquires target content that is content to be processed; a content analysis unit that extracts at least one object included in the target content and feature information indicating a feature of the object, and specifies context information based on analytical information and the extracted feature information, the context information indicating contexts of the objects and including attribute information for supplementing the features of the objects, and the analytical information being information for specifying the contexts of the objects; an output control unit that calculates processing priority of each of the objects based on the context information; and a candidate process extracting unit that extracts a candidate process that is executable on the target content based on the context information and the processing priority.

21 Claims, 52 Drawing Sheets

(51) Int. Cl.
*H04N 5/91* (2006.01)
*H04N 21/44* (2011.01)
*H04N 9/82* (2006.01)

(52) U.S. Cl.
CPC ....... *H04N5/23219* (2013.01); *H04N 5/23222* (2013.01); *H04N 5/91* (2013.01); *H04N 21/44008* (2013.01); *H04N 21/44012* (2013.01); *H04N 9/8205* (2013.01)

(56) References Cited

U.S. PATENT DOCUMENTS

| | | |
|---|---|---|
| 2010/0103192 A1 | 4/2010 | Fukumoto et al. |
| 2010/0142762 A1 | 6/2010 | Morita |
| 2012/0066309 A1 | 3/2012 | Yuki et al. |
| 2012/0092370 A1* | 4/2012 | Oh ..................... G06Q 50/10 345/633 |

FOREIGN PATENT DOCUMENTS

| | | |
|---|---|---|
| JP | 2008-277903 | 11/2008 |
| JP | 4213874 | 1/2009 |
| JP | 2009-077026 | 4/2009 |
| JP | 2010-103884 | 5/2010 |
| JP | 2010-140069 | 6/2010 |
| JP | 2010-263265 | 11/2010 |
| JP | 2011-082913 | 4/2011 |
| JP | 2011-082915 | 4/2011 |
| JP | 2012-032728 | 2/2012 |
| WO | 2011/114634 | 9/2011 |

* cited by examiner

FIG. 2

| ID | Data name | Extension | Type | State | Captured date and time | Total time |
|---|---|---|---|---|---|---|
| 1 | C-1 | mp4 | Movie | Original | 2002/10/1 09:15 | 34:05 |
| 2 | C-2 | mp4 | Movie | Original | 2002/10/1 10:03 | 5:45 |
| 3 | C-3 | mp4 | Movie | Original | 2002/10/1 10:05 | 14:55 |
| 4 | C-4 | mp4 | Movie | Original | 2002/10/1 12:32 | 10:03 |
| 5 | C-5 | mp4 | Movie | Original | 2002/10/1 12:33 | 4:13 |
| 6 | C-6 | mp4 | Movie | Original | 2002/10/1 13:07 | 6:54 |
| 7 | C-7 | mp4 | Movie | Original | 2002/10/1 14:44 | 33:22 |
| 8 | C-8 | mp4 | Movie | Original | 2002/10/1 19:10 | 45:21 |
| 9 | C-9 | mp4 | Movie | Original | 2002/10/2 09:50 | 25:32 |
| 10 | C-10 | mp4 | Movie | Original | 2002/10/2 11:22 | 51:02 |
| ... | ... | ... | ... | ... | ... | ... |

FIG. 3A

Example of user information table

| ID | User name | Address |
|---|---|---|
| 0 | Mike | mike@xxx.com |
| 1 | Alice | alice@aaa.com |
| 2 | Julia | julia@jjj.com |
| 3 | Tom | tom@ttt.com |
| 4 | Paul | paul@ppp.com |
| 5 | James | james@yyy.com |
| 6 | Dan | dan@ddd.com |
| 7 | Kevin | kevin@kkk.com |
| ... | ... | ... |

FIG. 3B

Example of social information table

| ID | Name | Mike | Alice | Julia | Tom | Paul | James | Dan | Kevin |
|---|---|---|---|---|---|---|---|---|---|
| 0 | Mike | — | 0.83 | 0.83 | 0.53 | 0.51 | 0.42 | 0.18 | 0.06 |
| 1 | Alice | 0.83 | — | 0.44 | 0.24 | 0.05 | 0.08 | 0.67 | 0.91 |
| 2 | Julia | 0.83 | 0.44 | — | 0.27 | 0.77 | 0.63 | 0.45 | 0.04 |
| 3 | Tom | 0.53 | 0.24 | 0.27 | — | 0.34 | 0.55 | 0.87 | 0.14 |
| 4 | Paul | 0.51 | 0.05 | 0.77 | 0.34 | — | 0.22 | 0.88 | 0.74 |
| 5 | James | 0.42 | 0.08 | 0.63 | 0.55 | 0.22 | — | 0.71 | 0.65 |
| 6 | Dan | 0.18 | 0.67 | 0.45 | 0.87 | 0.88 | 0.71 | — | 0.62 |
| 7 | Kevin | 0.06 | 0.91 | 0.04 | 0.14 | 0.74 | 0.65 | 0.62 | — |
| ... | ... | ... | ... | ... | ... | ... | ... | ... | ... |

| RID | Relationship | 1 | 2 | 3 | 4 |
|---|---|---|---|---|---|
| R1 | Family | Parent | Child | Brother/sister | Uncle/aunt |
| R2 | Relative | Uncle/aunt | Cousin | — | — |
| R3 | School | Close friend | Friend | Classmate | — |
| R4 | Workplace | Supervisor | Colleague | Subordinate | — |
| ... | ... | ... | ... | ... | ... |

FIG. 9

Analysis data (people)

| ID | Subject information | | Attribute information (static) | | | | | State information (dynamic) | |
|---|---|---|---|---|---|---|---|---|---|
| | Extraction coordinates | Extraction area | Facial dictionary | Name | Similarity | Main subject | Relationship information | Positional relationship | Relative distance |
| P1 | 1120, 1021 | 188, 187 | × | unknown | — | | | 1 | 3.3 |
| P2 | 2601, 998 | 191, 187 | ○ | Alice | 71 | | Child's close friend | 2 | 2.1 |
| P3 | 1987, 974 | 188, 192 | ○ | Dan | 85 | | Child's classmate | 3 | 1.4 |
| P4 | 2743, 968 | 197, 199 | ○ | Mike | 90 | ○ | Child | 4 | — |
| P5 | 3134, 981 | 182, 185 | ○ | Tom | 88 | | Child's friend | 5 | 1.2 |
| P6 | 3652, 999 | 182, 185 | ○ | Paul | 87 | | Child's classmate | 6 | 2.2 |
| ... | ... | ... | ... | ... | ... | ... | ... | ... | ... |

FIG. 11

Analysis data and output priority (people)

| ID | Subject information | | | Attribute information (static) | | | | | State information (dynamic) | | Determined result |
|---|---|---|---|---|---|---|---|---|---|---|---|
| | Extraction coordinates | Extraction area | Facial dictionary | Name | Similarity | Main subject | Relationship information | | Positional relationship | Relative distance | Output priority |
| P1 | 1120, 1021 | 188, 187 | × | unknown | — | | | | 1 | 3.3 | 9 |
| P2 | 2601, 998 | 191, 187 | ○ | Alice | 71 | | Child's close friend | | 2 | 2.1 | 2 |
| P3 | 1987, 974 | 188, 192 | ○ | Dan | 85 | | Child's classmate | | 3 | 1.4 | 4 |
| P4 | 2743, 968 | 197, 199 | ○ | Mike | 90 | ○ | Child | | 4 | — | 1 |
| P5 | 3134, 981 | 182, 185 | ○ | Tom | 88 | | Child's friend | | 5 | 1.2 | 3 |
| P6 | 3652, 999 | 182, 185 | ○ | Paul | 87 | | Child's classmate | | 6 | 2.2 | 5 |
| ... | ... | ... | ... | ... | ... | ... | ... | | ... | ... | ... |

FIG. 13

Definition table (dynamic)

| ID | Extraction policy | Included ID | Accompanying information | Coordinates | Area |
|---|---|---|---|---|---|
| G1 | Main subject | P4 | Human body shape | 2413, 935 | 712, 433 |
| G2 | Secondary subject | P2 | Human body shape | 1156, 1033 | 684, 421 |
| G3 | Secondary subject | P5 | Human body shape | 2778, 902 | 770, 445 |
| G4 | Main subject-related | P4, P5 | Human body shape | 2556, 887 | 856, 502 |
| G5 | Main subject-related | P2, P3, P4 | Human body shape | 1265, 812 | 1505, 798 |
| G6 | Main subject-related | P2, P3, P4, P5 | Human body shape | 1143, 741 | 2012, 1003 |
| G7 | All elements | P1, P2, P3, P4, P5 P6 | Human body shape | 823, 639 | 3201, 1204 |
| ... | ... | ... | ... | ... | ... |

FIG. 15

Candidate process pattern table

| ID | Candidate process | During capture | During viewing | During editing | Requirement |
|---|---|---|---|---|---|
| E1 | Clip context group areas and record in separate files | ○ | ○ | ○ | There is enough free space/capacity in CPU |
| E2 | Add supplemental information (event name) to context group areas | ○ | ○ | ○ | Main subject is contained in context group |
| ... | ... | ... | ... | ... | ... |

FIG. 17

Definition table (dynamic)

| ID | Extraction policy | Included ID | Accompanying information | Coordinates | Area | Candidate process |
|---|---|---|---|---|---|---|
| G1 | Main subject | P4 | Human body shape | 2413, 935 | 712, 433 | E1, E2 |
| G2 | Secondary subject | P2 | Human body shape | 1156, 1033 | 684, 421 | E1 |
| G3 | Secondary subject | P5 | Human body shape | 2778, 902 | 770, 445 | E1 |
| G4 | Main subject-related | P4, P5 | Human body shape | 2556, 887 | 856, 502 | E1, E2 |
| G5 | Main subject-related | P2, P3, P4 | Human body shape | 1265, 812 | 1505, 798 | E1, E2 |
| G6 | Main subject-related | P2, P3, P4, P5 | Human body shape | 1143, 741 | 2012, 1003 | E1, E2 |
| G7 | All elements | P1, P2, P3, P4, P5 P6 | Human body shape | 823, 639 | 3201, 1204 | E1, E2 |
| ... | ... | ... | ... | ... | ... | ... |

FIG. 19

| ID | Data name | Extension | Type | Tag information | Captured date and time | | Total time |
|---|---|---|---|---|---|---|---|
| 1 | C-1 | mp4 | Movie | Original | 2002/10/1 | 09:15 | 34:05 |
| 2 | C-2 | mp4 | Movie | Original | 2002/10/1 | 10:03 | 5:45 |
| 3 | C-3 | mp4 | Movie | Original | 2002/10/1 | 10:05 | 14:55 |
| 4 | C-4 | mp4 | Movie | Original | 2002/10/1 | 12:32 | 10:03 |
| 5 | C-5 | mp4 | Movie | Original | 2002/10/1 | 12:33 | 4:13 |
| 6 | C-6 | mp4 | Movie | Original | 2002/10/1 | 13:07 | 6:54 |
| 7 | C-7 | mp4 | Movie | Original | 2002/10/1 | 14:44 | 33:22 |
| 8 | C-8 | mp4 | Movie | Original | 2002/10/1 | 19:10 | 45:21 |
| 9 | C-9 | mp4 | Movie | Original | 2002/10/2 | 09:50 | 25:32 |
| 10 | C-10 | mp4 | Movie | Original | 2002/10/2 | 11:22 | 51:02 |
| 11 | C-11 | mp4 | Movie | Auto G1 | 2003/12/1 | 22:23 | 5:01 |
| 12 | C-12 | mp4 | Movie | Auto G2 | 2003/12/1 | 22:23 | 4:33 |
| 13 | C-13 | mp4 | Movie | Auto G3 | 2003/12/1 | 22:23 | 3:21 |
| 14 | C-14 | mp4 | Movie | Auto G4 | 2003/12/1 | 22:23 | 3:21 |
| 15 | C-15 | mp4 | Movie | Auto G5 | 2003/12/1 | 22:23 | 4:56 |
| 16 | C-16 | mp4 | Movie | Auto G6 | 2003/12/1 | 22:23 | 4:56 |
| 17 | C-17 | mp4 | Movie | Auto G7 | 2003/12/1 | 22:23 | 5:01 |
| ... | | | | | | | |

Analysis data (common object)

| ID | Subject information | | Attribute information (static) | | | | | State information (dynamic) | | | Determined result | |
|---|---|---|---|---|---|---|---|---|---|---|---|---|
| | Extraction coordinates | Extraction area | Dictionary registration | Name | Similarity | Main subject | Attention information | Positional relationship | Focus area | Relative distance | | Output priority |
| M1 | 1704, 381 | 390, 402 | × | unknown | — | | MARK | 2 | × | 3.2 | | 1.0 |
| M2 | 2821, 603 | 1214, 743 | × | unknown | — | | TEXT:YOSAKOI | 1 | △ | 0.8 | | 3.0 |
| ... | ... | ... | ... | ... | ... | ... | ... | ... | ... | ... | | ... |

FIG. 29

| Attention information priority point-addition table | |
|---|---|
| LANDMARK | 5.0 |
| PERSON | 3.0 |
| TEXT | 1.0 |
| MARK | 0.5 |
| ... | ... |

FIG. 30

| Relative distance priority point-addition table | |
|---|---|
| 0 to less than 0.5 | 3.0 |
| 0.5 to less than 1.0 | 2.0 |
| 1.0 to less than 3.0 | 1.0 |
| 3.0 or greater | 0.5 |
| ... | ... |

FIG. 32

Definition table (dynamic)

| ID | Extraction policy | Included ID | Accompanying information | Coordinates | Area |
|---|---|---|---|---|---|
| G1 | Main subject | P4 | Human body shape | 2413, 935 | 712, 433 |
| G2 | Secondary subject | P2 | Human body shape | 1156, 1033 | 684, 421 |
| G3 | Secondary subject | M2 | TEXT:YOSAKOI | 2821, 603 | 1214, 743 |
| G4 | Main subject-related | P4, M2 | Human body shape | 2443, 576 | 1587, 896 |
| G5 | Main subject-related | P2, P3, P4 | Human body shape | 1265, 812 | 1505, 798 |
| G6 | Main subject-related | P2, P3, P4, M2 | Human body shape | 2254, 575 | 1704, 898 |
| G7 | All elements | P1, P2, P3, P4, M2, P6 | Human body shape | 823, 546 | 3201, 1454 |
| ... | ... | ... | ... | ... | ... |

FIG. 34

Candidate process pattern table

| Requirement | ID | Candidate process | Capturing | Viewing | Editing | Name of candidate process | Icon |
|---|---|---|---|---|---|---|---|
| Context group area fits within focus area (coverage area of less than 80%) | E1 | Zoom in such that context group area fits maximum size of focus area | ○ | ○ | ○ | Auto zoom-in | ZI |
| | E2 | Clip context group area apart from display of focus area and record the context group | ○ | × | × | Tracking capture of designated subject | FR |
| Context group area partially overlaps focus area | E3 | Zoom out such that context group area fits maximum size of focus area | ○ | ○ | ○ | Auto zoom-out | ZO |
| | E4 | Clip context group area apart from display of focus area and record the context group | ○ | × | × | Tracking capture of designated subject | FR |
| Context group area is outside focus area | E5 | Zoom out such that context group area fits maximum size of focus area | ○ | ○ | ○ | Auto zoom-out | ZO |
| | E6 | Clip context group area apart from display of focus area and record the context group | ○ | × | × | Tracking capture of designated subject | FR |

FIG. 36

Definition table (dynamic)

| ID | Extraction policy | Included ID | Accompanying information | Coordinates | Area | Candidate process |
|---|---|---|---|---|---|---|
| G1 | Main subject | P4 | Human body shape | 2413, 935 | 712, 433 | E1, E2 |
| G2 | Secondary subject | P2 | Human body shape | 1156, 1033 | 684, 421 | E5, E6 |
| G3 | Secondary subject | M2 | TEXT:YOSAKOI | 2821, 603 | 1214, 743 | E3, E4 |
| G4 | Main subject-related | P4, M2 | Human body shape | 2443, 576 | 1587, 896 | E3, E4 |
| G5 | Main subject-related | P2, P3, P4 | Human body shape | 1265, 812 | 1505, 798 | E3, E4 |
| G6 | Main subject-related | P2, P3, P4, M2 | Human body shape | 2254, 575 | 1704, 898 | E3, E4 |
| G7 | All elements | P1, P2, P3, P4, M2, P6 | Human body shape | 823, 546 | 3201, 1454 | E3, E4 |
| ... | ... | | | ... | | |

| Icon reference table | | | |
|---|---|---|---|
| Icon | Use | Before execution | During execution |
| ZI | Zoom-in process | ▶IN◀ | — |
| ZO | Zoom-out process | OUT | — |
| FR | Context group area recording process | REC | STOP |

| Results of calculation of relative coordinates of context group outside focus area ||
|---|---|
| Context group | Relative coordinates within focus area |
| P1 | 0, 348 |
| P2 | 0, 332 |
| P3 | 0, 315 |
| P6 | 1024, 313 |
| ... | ... |

FIG. 50

Candidate process pattern table

| Requirement | ID | Candidate process | Capturing | Viewing | Editing | Name of candidate process | Icon |
|---|---|---|---|---|---|---|---|
| Context group area fits within focus area (coverage area of less than 80%) | E1 | Zoom in such that context group area fits maximum size of focus area | ○ | ○ | ○ | Auto zoom-in | ZI |
| | E2 | Clip context group area apart from display of focus area and record the context group | ○ | × | × | Tracking capture of designated subject | FR |
| Context group area partially overlaps focus area | E3 | Zoom out such that context group area fits maximum size of focus area | ○ | ○ | ○ | Auto zoom-out | ZO |
| | E4 | Clip context group area apart from display of focus area and record the context group | ○ | × | × | Tracking capture of designated subject | FR |
| Context group area is outside focus area | E5 | Zoom out such that context group area fits maximum size of focus area | ○ | ○ | ○ | Auto zoom-out | ZO |
| | E6 | Clip context group area apart from display of focus area and record the context group | ○ | × | × | Tracking capture of designated subject | FR |
| Multiple context group areas are selected | E7 | Display designated multiple context group areas as separate frames | ○ | ○ | ○ | Auto display of multiple frames | MV |
| | E8 | Combine designated multiple context group areas into single moving image, and clip and record separately from display of focus area | ○ | × | × | Auto capture of multiple frames | MR |

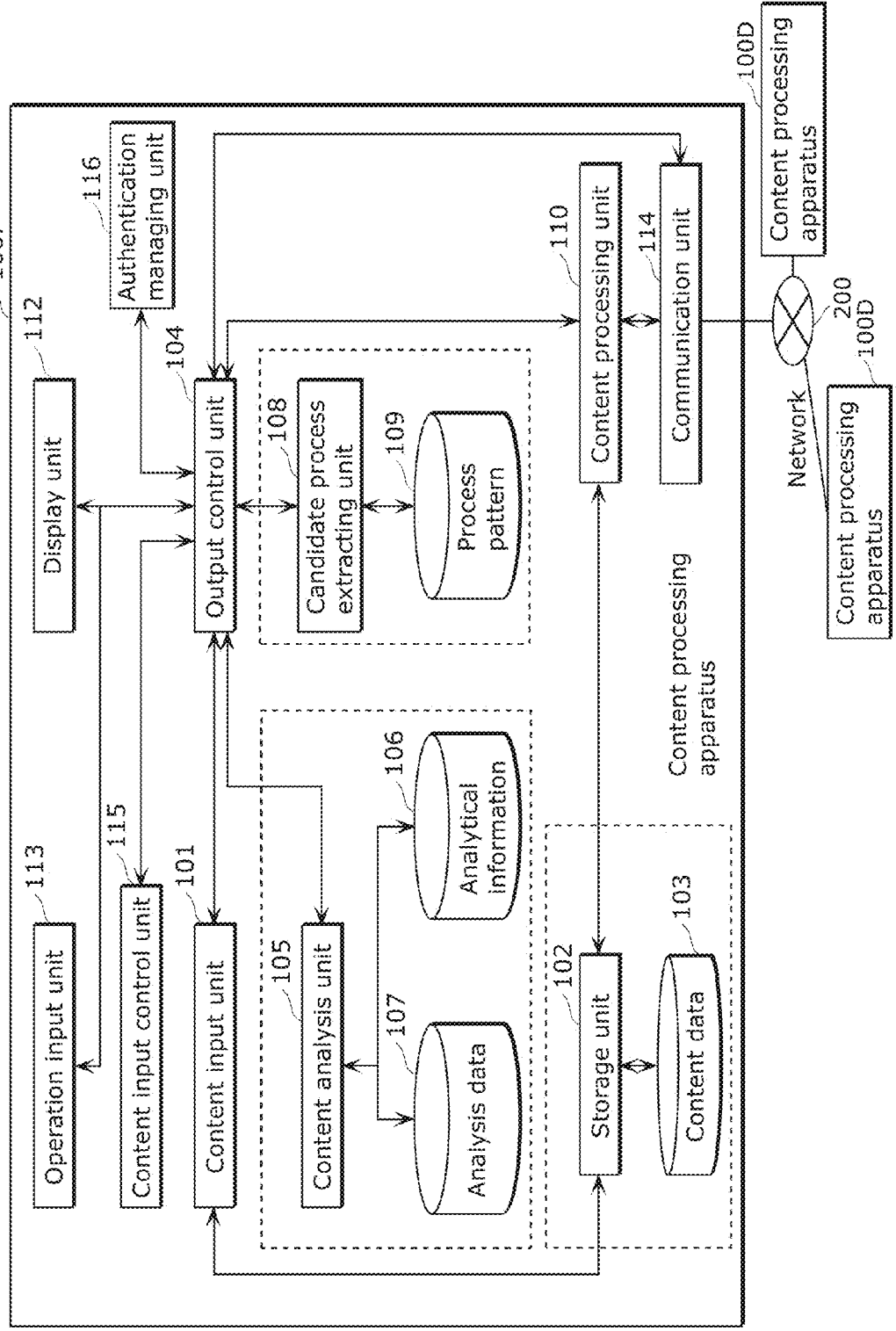

CONTENT PROCESSING APPARATUS, CONTENT PROCESSING METHOD, AND PROGRAM

TECHNICAL FIELD

The present invention relates to a content processing apparatus, a content processing method, and a program.

BACKGROUND ART

Recent imaging devices such as consumer digital still cameras, video cameras, and cameras built in mobile phones are becoming more and more sophisticated in functionality. Accordingly, various types of models are now available at low prices, including imaging devices that support a high level of photography such as high-speed continuous shooting in addition to recording of high-quality images such as photos and video, imaging devices that automatically add meta information such as the positional information of photographing locations and the names of people in photos and video, imaging devices that have a network connecting function and upload captured photos directly to servers on networks from the imaging devices, and the like. With trends toward higher definition imaging devices and improvements in digital processing techniques, content processing methods, which are performed by digital techniques such as zoom-in and zoom-out processing and focus processing through touch operations on a capture/display screen provided with a touch panel, in addition to conventional zoom-in and zoom-out processing of the shooting angle of view through physical control by an optical lens mechanism, have been developed for the user's convenience and are now becoming mature. Furthermore, a content processing method for zooming in a selected area to view with a double-tap operation or a pinch-out operation (an operation of touching the screen with two fingers and moving the two fingers away from each other) on the display screen for viewing and editing is also getting widely used in the processing of viewing and editing of the stored content.

Also, content processing methods for providing a less novice and more professional level of finishing in content processing such as image-capturing, viewing and editing in a more convenient, easy and reliable manner have been proposed (see, for example, Patent Literatures (PTLs) 1 to 3).

CITATION LIST

Patent Literature

[PTL 1] Japanese Unexamined Patent Application Publication No. 2008-136024
[PTL 2] Japanese Unexamined Patent Application Publication No. 2009-77026
[PTL 3] Japanese Patent No. 4213874

SUMMARY OF INVENTION

Technical Problem

However, the conventional techniques as described above are problematic in that there are significant intellectual and operational burdens on the user to perform content processing at the time of image-capturing, viewing or editing of the content.

The present invention has been made in view of the problems described above, and it is an object of the present invention to provide a content processing apparatus, a content processing method, and a program that reduce the intellectual and operational burdens of the users required to perform content processing at the time of mage-capturing, viewing or editing of the content.

Solution to Problem

In order to achieve the above object, a content processing apparatus according to one aspect of the present invention is a content processing apparatus including: a content acquiring unit configured to acquire target content that is content to be processed; a content analysis unit configured to extract at least two objects included in the target content and feature information indicating features of the objects, and specify context information based on analytical information and the extracted feature information, the context information indicating contexts of the objects and including attribute information for supplementing the features of the objects, and the analytical information being information for specifying the contexts of the objects; a processing control unit configured to control processing performed on the target content; and a candidate process extracting unit configured to extract at least one candidate process that is executable on the target content based on the context information and the processing priority, wherein the process output control unit is configured to calculate the processing priority of each of the objects based on the context information, and the candidate process extracting unit is configured to extract at least one candidate process based on the context information and the processing priority.

Advantageous Effects of Invention

With the content processing apparatus and the like according to the present invention, it is possible to reduce the intellectual and operational burdens of the user required to perform content processing at the time of image-capturing, viewing or editing of the content.

BRIEF DESCRIPTION OF DRAWINGS

FIG. 2 is a diagram showing an example of content data according to Embodiment 1.
FIG. 3A is a diagram showing an example of social information, which is an example of analytical information according to Embodiment 1.
FIG. 3B is a diagram showing an example of social information, which is an example of analytical information according to Embodiment 1.
FIG. 9 is a diagram showing an example of analysis data (people) according to Embodiment 1.

FIG. 11 is a diagram showing the analysis data (people) of Embodiment 1 and examples of results of output priority determining processing.

FIG. 13 is a diagram showing an example of a context group information definition table according to Embodiment 1.

FIG. 15 is a diagram showing an example of a candidate process pattern table according to Embodiment 1.

FIG. 17 is a diagram showing an example in which candidate processes are set with respect to context group information according to Embodiment 1.

FIG. 19 is a diagram showing an example of a content index obtained after execution of content processing according to Embodiment 1.

FIG. 28 is a diagram showing an example of analysis data (common object) according to Embodiment 3.

FIG. 29 is a diagram showing an example of an attention information priority point-addition table according to Embodiment 3.

FIG. 30 is a diagram showing an example of a relative distance priority point-addition table according to Embodiment 3.

FIG. 32 is a diagram showing an example of a context group information definition table according to Embodiment 3.

FIG. 34 is a diagram showing an example of a candidate process pattern table according to Embodiment 3.

FIG. 36 is a diagram showing an example in which candidate processes are set with respect to context group information according to Embodiment 3.

FIG. 50 is a diagram showing an example of a candidate process pattern table according to Variation 5 of Embodiment 3.

FIG. 62 is a block diagram showing a configuration of a content processing apparatus according to Embodiment 6.

DESCRIPTION OF EMBODIMENTS

Figure 1:
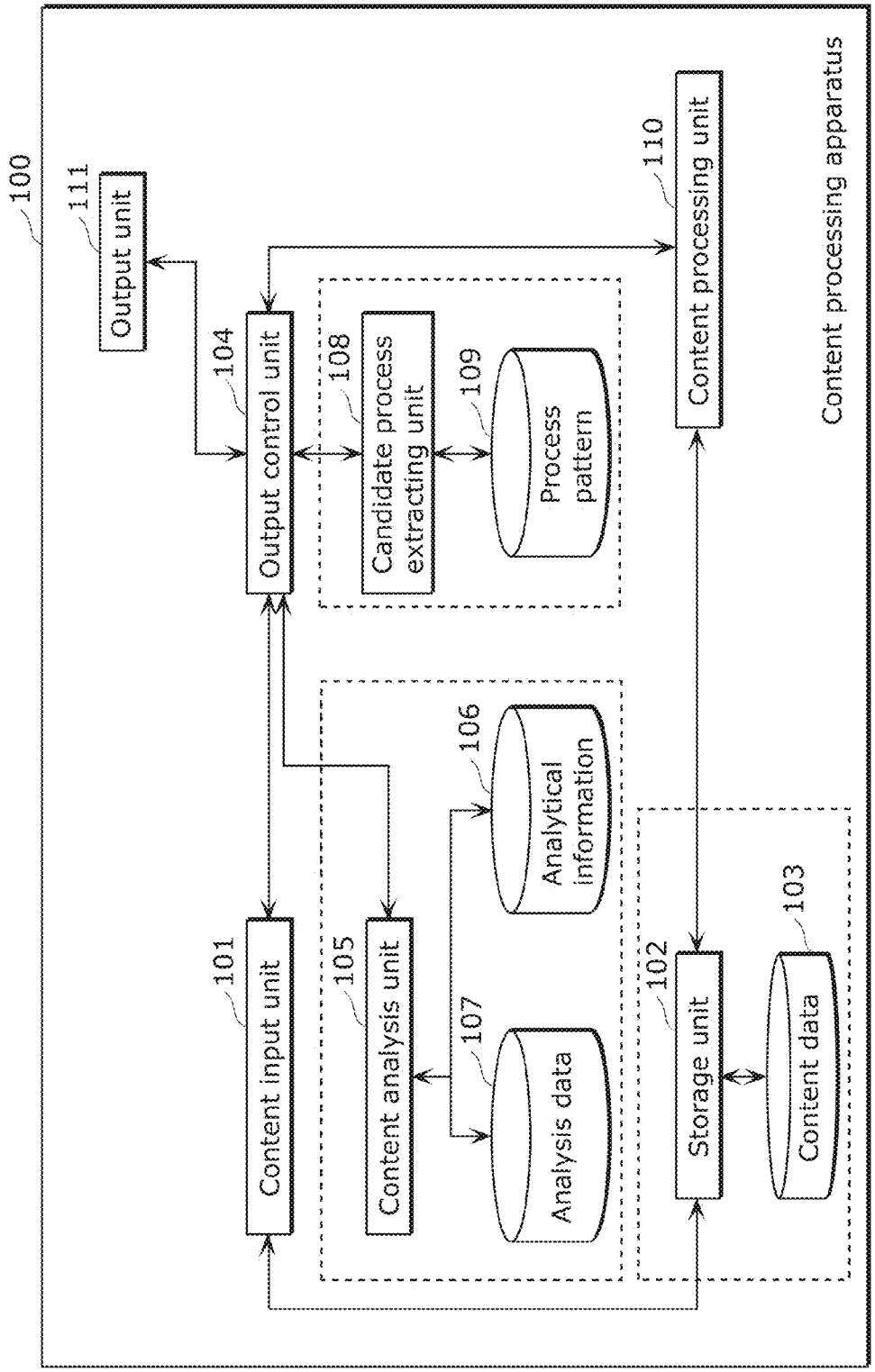
FIG. 1 is a block diagram showing a configuration of a content processing apparatus 100 according to Embodiment 1.

Underlying Knowledge Forming Basis of the Present Invention

The present inventors found that the following problems occur in the content processing method disclosed in PTLs 1 to 3 mentioned in the Background Art.

PTL 1 proposes a technique that, when a subject to be captured moves out of the angle of view of the capture/display screen, detects that movement and displays an icon for prompting the operating user to perform physical zoom-out processing by using the optical lens mechanism; and a technique that, when the optical lens mechanism that is implementing zoom-out processing reaches the wide-angle end, displays an icon for prompting the operating user to geographically move backward according to the direction and position of the uncaptured portion.

However, PTL 1 is problematic in that only the icon for prompting the user to perform zoom-out processing is displayed when a subject that can be viewed by the capturing user on the capture/display screen moves out of the capture/display screen, and thus no consideration is given to a subject that cannot be viewed by the capturing user on the capture/display screen, and the user cannot know an important subject other than the subject displayed on the capture/display screen.

PTL 2 proposes a technique in which in order to reduce the burden of editing operations performed after image-capturing and to perform image-capturing for a scheduled length of time for each event, the length of time of image-capturing for each file and the number of files to be recorded are pre-set in a storage medium, and a moving image file is recorded in the recording media at the same time when image-capturing is performed.

In PTL 2, when editing a moving image file at the same time when image-capturing is performed by manually selecting one from scenario titles of fixed events that have been set in advance, it is possible to save the captured moving image by controlling the image-capturing time based on the fixed event scenario or by adding a preset effect, such as zoom-in, zoom-out or fade-out at the end of image-capturing. However, PTL 2 is problematic in that flexible content processing cannot be performed such as recording a plurality of files while performing content processing more optimal to the movement of at least one dynamically moving subject.

PTL 3 proposes a technique in which with respect to a subject to be captured, supplemental information related to the subject is detected based on the position and direction at and in which image-capturing is performed, and then displayed.

In PTL 3, only when supplemental information has been found for a subject (common object) that matches the image-capturing position and direction, the supplemental information can be displayed. However, PTL 3 is problematic in that analysis is performed on none of the subjects included in content on which image-capturing, viewing or editing is to be performed, and thus it is not possible to suggest a content processing operation to the user who performs image-capturing, viewing or editing based on the attribute and the like of the subject.

In order to solve the above problem, a content processing apparatus according to one aspect of the present invention is a content processing apparatus including: a content acquiring unit configured to acquire target content that is content to be processed; a content analysis unit configured to extract at least two objects included in the target content and feature information indicating features of the objects, and specify context information based on analytical information and the extracted feature information, the context information indicating contexts of the objects and including attribute information for supplementing the features of the objects, and the analytical information being information for specifying the contexts of the objects; a processing control unit configured to control processing performed on the target content; and a candidate process extracting unit configured to extract at least one candidate process that is executable on the target content based on the context information and the processing priority, wherein the process output control unit is configured to calculate the processing priority of each of the objects based on the context information, and the candidate process extracting unit is configured to extract at least one candidate process based on the context information and the processing priority.

With this configuration, context information containing object relationship information can be specified according an object or a subject included in the target content and feature information such as, for example, the audio of the object. Also, the processing priority of the object can be calculated based on the relationship between objects included in the specified context information, and thus a candidate process with respect to the target content can be determined and executed by taking the processing priority into consideration. Accordingly, for example, in the case where faces of a plurality of people are included as objects in target content such as a moving image, it is possible to perform control so as to zoom in (perform digital zoom processing) on the faces and its related parts of up to two people specified as context information from among the plurality of people to a specified size, and perform output processing of outputting them as separate moving image files (recording into a storage medium).

That is, it is possible to easily achieve execution of content processing according to the context information without requiring a user operation or instruction with respect to each object.

As described above, the context information of at least two subjects in the target content is analyzed, and a candidate content process that is optimal in image-capturing, viewing or editing is presented to the user by taking the processing priority into consideration, and execution of the process can be controlled. It is thereby possible to implement a content processing apparatus that can minimize the intellectual and operational burdens of the user required to perform content processing at the time of image-capturing, viewing or editing of the content.

Here, for example, the target content may be any one of a still image, a moving mage and audio, or may be data obtained by combining two or more thereof. The objects may be objects representing at least one of people, characters and common objects, or may be audio objects. Also, the feature information may include, for example, at least one of a set of relative coordinates, a relative size, a relative area of the object (subject) in the moving image, an appearance timing, a duration of appearance and a relative volume in the time axis of the audio object.

With this configuration, the execution content of a candidate content process can be adjusted according to the feature information and executed. For example, it is possible to perform control so as to zoom in on a person whose relative area has a specified value or less among a plurality of people included in a moving image, or automatically increase the output volume of audio whose relative volume has a specified value or less among the audio included in a moving image. In this way, it is possible to adjust the content of a candidate content process according to the feature information without requiring a user operation or instruction with respect to each object.

Also, for example, the context information includes attribute information for supplementing the features of the objects, and the attribute information includes information regarding at least one of people, characters, common objects and audio. To be specific, the attribute information regarding people includes at least one of a subject name, a similarity, social information and clothing information, and the attribute information regarding characters includes at least one of a character string, the versatility of a character string, and the risk of a character string. Also, the attribute information regarding common objects include an object name, accuracy, related information and object's positional information, and the attribute information regarding audio includes at least one of a voice print, a speaker's name, a similarity, social information and voice type.

With this configuration, it is possible to supplement the context information according to the attribute information and adjust the execution content of a candidate content process and execute the candidate content process. For example, it is possible to perform control so as to set, among a plurality of people included in a moving image, a person who is registered in a facial dictionary as the main subject, zoom in (perform digital zoom processing) on each person determined as a close friend of the main subject, add information that supplements the object element, and output as a separate moving image file (display the name of the subject specified based on the facial similarity and the voice print in a superimposed manner, and record into a storage medium).

In this way, it is possible to adjust the content of a candidate content process according to the attribute information without requiring a user operation or instruction with respect to each object.

Also, for example, the processing control unit may be configured to define context group information based on the context information of each of the extracted objects and determine whether or not the candidate process extracted by the candidate process extracting unit is executed, the context group information being information indicating criteria for grouping the objects, and the candidate process extracting unit may be configured to extract at least one candidate process executable on each group into which the objects are grouped based on the context group information.

With this configuration, a candidate content process that needs to be executed can be determined according to the context groups constituted by a plurality of objects included in the content. For example, it is possible to perform control so as to perform a zoom-in process (digital zoom process) or an output process (recording into a storage medium) on the composition of a moving image constituted by a plurality of people or common objects.

In this way, a plurality of objects can be handled as a single context group, and therefore it is unnecessary to perform a processing operation on each object, and the content processing on the context group can be executed at a time. This can reduce the possibility of a failure in image-capturing that appears to be caused by a novice such as stepwise zoom-in or zoom-out processing.

Also, for example, the content processing apparatus may further include an output unit configured to output a notification regarding a processing status of at least one candidate process, and the processing control unit may be configured to, before or after execution of at least one candidate process extracted by the candidate process extracting unit, cause the output unit to output information indicating whether or not the at least one candidate process is executed as the notification.

With this configuration, before or after execution of the extracted candidate process, candidate process execution information indicating whether or not the candidate process is executed can be output to the outside of the content processing apparatus. For example, in the case where the digital camera has, in its side surface, a light-emitting unit or audio speaker for informing the user of a content process currently executed within the camera, a configuration is possible in which an operation such as a zoom-in process (digital zoom process) or an output process (recording into a storage medium) performed on a target object, or completion of image-capturing can be notified to the user by using illumination of the light-emitting unit, a buzzer or a voice guide from the speaker.

In this way, it is possible to notify the user of a content process currently executed within the content processing apparatus without requiring the user who is operating the content processing apparatus to perform an operation or provide an instruction.

Also for example, the content processing apparatus may further include a display unit configured to display information regarding processing performed on the target content, and the processing control unit may be configured to, before or after execution of at least one candidate process extracted by the candidate process extracting unit, cause the display unit to display execution information indicating whether or not the at least one candidate process is executed.

With this configuration, before or after execution of the extracted candidate process, candidate process execution information indicating whether or not the candidate process is executed can be displayed on the display unit of the content processing apparatus. For example, a content process that is currently executed within the digital camera can be visualized on the main screen or sub-screen of the digital camera for the user by using a character string or icon.

In this way, it is possible to more reliably notify the user of a content process currently executed within the content processing apparatus by using a character string or an icon, without requiring the user who is operating the content processing apparatus to perform an operation or provide an instruction.

Also, for example, the processing control unit may be configured to cause the display unit to display the execution information in a neighborhood of the objects displayed by the display unit in a visually recognizable manner based on at least one of the set of relative coordinates and the relative size contained in the feature information extracted by the content analysis unit.

With this configuration, the extracted candidate process can be displayed near the object. For example, a candidate process such as a zoom-in process (digital zoom process) performed on a subject (object) can be linked to the subject, and thus can be intuitively recognized. In this way, it is possible to reduce the occurrence of an erroneous operation or instruction regarding a candidate process on a subject included in the target content, and thus content processing can be more reliably executed.

Also, for example, the content processing apparatus may further include a display unit configured to display information regarding processing performed on the target content; and an operation input unit configured to receive an operation from a user, and the processing control unit may be configured to, before or after execution of the candidate process extracted by the candidate process extracting unit, cause the display unit to display at least one candidate process, and the processing control unit may be configured to, when the operation input unit receives an operation to execute at least one candidate process from among the at least one candidate process displayed by the display unit, execute a process corresponding to the at least one candidate process.

With this configuration, it is possible to perform control so as to display candidate processes on the display unit, and execute a candidate process based on a user operation (instruction) from the user received through the operation input unit. For example, in a digital camera equipped with a touch panel screen or an electronic device in which operation is possible via an input device such as a mouse, it is possible to receive an operation (instruction) of a content process that the user wants while the user is viewing the candidate content processes. Accordingly, it is possible to execute a content process intended by the user or suggest and execute a content process not conceivable by the user while preventing execution of a content process unintended by the operating user that is determined automatically by the output control unit of the content processing apparatus.

Also, for example, the processing control unit may be configured to cause the display unit to display a guiding line for visualizing an area on which at least one candidate process extracted by the candidate process extracting unit is to be executed based on at least one of the set of relative coordinates and the relative size contained in the feature information extracted by the content analysis unit.

With this configuration, a guiding line in accordance with the output image when the extracted candidate process is executed can be displayed. For example, with the guiding line, the user can intuitively recognize the result obtained from execution of a process such as a zoom-in process (digital zoom process) on a subject, and thus the user can easily select a candidate process that he/she wants from among a plurality of candidate processes.

In this way, it is possible to reduce the occurrence of an erroneous operation or instruction regarding a candidate process not intended by the user, and thus content processing can be more reliably executed while the user can recognize the resulting image after execution of the content processing.

Also, for example, the processing control unit may be configured to cause the display unit to display at least one of (a) information indicating an outline of the candidate process and (b) an icon or menu corresponding to an operation that can be received by the operation input unit, based on the feature information extracted by the content analysis unit and at least one candidate process extracted by the candidate process extracting unit.

With this configuration, it is possible to display an icon indicating the outline of an extracted candidate process, and an icon or a menu that facilitates designation of an operation or instruction through the operation input unit. For example, with such an icon, the user can intuitively recognize a process such as a zoom-in process (digital zoom process) on a subject, and thus in the case where a plurality of candidate processes are shown on the same screen, the user can easily select a candidate process that he/she wants by using an icon or menu.

In this way, it is possible to reduce the occurrence of an erroneous operation or instruction regarding a candidate process not intended by the user, and thus content processing can be more reliably executed while the user recognizes the outline of the content processing.

Also, for example, the processing control unit may be configured to manage a maximum area and a focus area, the maximum area being a maximum area where the target content acquired by the content acquiring unit can be displayed by the display unit, and the focus area being a display area currently displayed by the display unit, and the processing control unit may be configured to request the content analysis unit to analyze, among the at least one object included in the target content, only an object within a specified range in at least one of the maximum area and the focus area.

With this configuration, it is possible to perform control so as to perform analysis processing based on the focus area on the target content. Accordingly, for example, in the case where the resolution of the maximum area is 4096 horizontal pixels×2160 vertical pixels, and the resolution of the specified analysis range in the focus area is 1024 horizontal pixels×768 vertical pixels, candidate processes can be extracted only through analysis of object elements included in the specified analysis range in the focus area, and thus the load of content analysis processing on the maximum area can be reduced. Accordingly, as a result of the processing load being reduced, an improvement in the response speed of the content processing apparatus and a reduction in the power consumption can be expected.

Also, for example, the processing control unit may be configured to: set a candidate process display area in a predetermined portion of the focus area when the focus area is displayed by the display unit; and cause the display unit to display at least one candidate process extracted by the candidate process extracting unit in the candidate process display area.

With this configuration, control can be performed so as to display candidate processes in the candidate process display area other than the focus area. It is possible to, for example, display candidate processes in the candidate process display area while displaying the content of the target content in the focus area, and thus the reduction in the visibility of the target content caused by candidate processes with respect to the object elements included in the focus area being displayed in a superimposed manner can be avoided. In this way, a desired process can be executed by simply selecting a candidate process displayed in the candidate process display area.

Also, for example, the processing control unit may be configured to request the content analysis unit to analyze, in addition to the object that is within the focus area, an object that is not within the focus area.

With this configuration, object elements located in an area other than the focus area in the target content can be analyzed, and candidate processes with respect to the object elements located in an area other than the focus area can be extracted. For example, in addition to the people displayed in the focus area, other object elements that need to be captured, viewed or edited can be found, and candidate processes with respect to the people and common objects that are not displayed in the focus area can be displayed. It is therefore possible to instantly zoom out (digitally zoom out) the content by the user simply selecting a candidate process to be executed. Accordingly, it is possible to suggest and execute a content process with respect to an object element located in an area other than the focus area, which is not conceivable by the user, in addition to the content processes in the focus area which are conceivable by the user.

Also, for example, the processing control unit may be configured to: when causing the display unit to display a candidate process with respect to a first object that is not within the focus area, calculate, from a relative positional relationship based on each feature information of second objects that are not within the focus area, a direction and order of appearance of the second objects as viewed from a center of the focus area; and cause the display unit to display the at least one candidate process extracted by the candidate process extracting unit in the candidate process display area according to the calculated direction and order of appearance.

With this configuration, candidate processes with respect to the object elements located in an area other than the focus area can be displayed in the direction of appearance and in the order of appearance with respect to the center of the focus area. For example, in addition to the people displayed in the focus area, the presence of other object elements that need to be captured, viewed or edited as well as the direction in which the object elements are present can be visualized. This makes selection of a candidate process with respect to a person or a common object that is not displayed in the focus area more intuitive with the use of the order of appearance and the like, and thus the user can select a candidate process and provide an instruction to execute the candidate process based on the positional relationship in the real space.

In this way, the occurrence of an error when designating a candidate process with respect to an object element located in an area other than the focus area can be reduced, and thus a candidate process can be executed more reliably.

Also, for example, the processing control unit may be configured to cause the display unit to display at least one candidate process extracted by the candidate process extracting unit, and the processing control unit may be configured to change content of the at least one candidate process displayed by the display unit according to the calculated processing priority.

With this configuration, it is possible to perform control so as to highlight the indications of candidate processes with decoration or the like according to the processing priority. Accordingly, for example, the user can easily find the main subject and an important secondary subject. Also, the presence or absence of subjects that need to be captured, viewed or edited other than the people displayed in the focus area can be notified to the user through such highlighting.

It is thereby possible to reduce the opportunity loss such as in the case where the user misses an object element.

Also, for example, the processing control unit may be configured to change selecting content or processing content of the at least one candidate process displayed by the display unit according to the calculated processing priority and the attribute information and the state information that are contained in the context information.

With this configuration, it is possible to perform control so as to perform selection, content adjustment and display of a candidate process to be processed on at least two objects (context information) designated by the user, based on the output priority and the analysis data including the positions in the real space, the order of appearance, the positional relationship, and the relationship between people. For example, a candidate process common to a plurality of subjects can be selected intuitively and easily, and candidate processes can be presented according to the position in the real space.

In this way, erroneous operations by the user can be prevented, and the number of operations can be reduced.

Also, for example, the processing control unit may be configured to generate an output template containing at least one piece of context information according to the calculated processing priority and the attribute information and the state information that are contained in the context information, combine the target content linked to at least one piece of context group information while dynamically changing the output template, and output the output template.

With this configuration, an output template including at least one selected context information can be generated based on the output priority and the analysis data including the position of the context information in the real space, the order of appearance, the positional relationship, and the relationship between people, and displayed as multiple frames in a single screen and output as a composite file. For example, moving images displayed as multiple frames can be generated according to the template that can be dynamically changed.

In this way, it is possible to eliminate the burden of having to edit a single moving image from a plurality of moving images by using a dedicated tool such as a personal computer, and to achieve a new means that generates composite footage in which at least one piece of context information is arranged at the same time when an operation such as image-capturing or viewing is performed.

Also, for example, the processing control unit may be configured to, in response to the operation received by the operation input unit, perform designation of at least one piece of context information and specifying of a candidate process, and dynamically change an output template containing at least one piece of context information based on the operation.

With this configuration, in response to input of a touch operation from the user, at least one piece of context information can be designated and a candidate process can be specified. It is also possible to dynamically generate the output template based on, in addition to the context information, the trajectory of the dividing line that divides the designated area by a touch operation, the area ratio assigned to each context group, and the like, and thus candidates to be processed in the moving image, how they are combined, and the output result can be changed. Accordingly, for example, control is possible such as controlling the zoom factor based on the area ratio, or determining the angle of view of context group information to be combined based on the moving range of the object elements per unit time. In this way, designation of context information and execution of a candidate process can be achieved intuitively by a touch operation, reducing the operational burden of the user.

Also, for example, the content processing apparatus may further include a communication unit configured to perform communication with a device external to the content processing apparatus, and the processing control unit may be configured to acquire, from an external information providing apparatus via the communication unit, at least one of the following: information required by the content analysis unit to extract the objects and the feature information; information required by the candidate process extracting unit to extract at least one candidate process; and information required to generate an output template containing at least one piece of context information.

With this configuration, it is possible to acquire information such as the updated analytical information, process patterns and output templates from the information providing apparatus connected via the network, and add the information to the information held in the content processing apparatus or update the information. Accordingly, for example, the failure in extraction of context information caused by stale analytical information can be reduced, and thus it is possible to achieve addition, improved quality and maintenance of the process patterns and output templates of the content processing method regarding output.

Also, for example, the content processing apparatus may further include a content input control unit configured to perform control on the content acquiring unit based on a processing result of the processing control unit, and the processing control unit may be configured to monitor a relationship between a maximum area and the state information corresponding to context information referred to from the defined context group information, the maximum area being a maximum area where the target content acquired by the content input unit can be displayed by the display unit, and perform physical control or digital processing control on the content acquiring unit via the content input control unit according to an overlap between the maximum area and the context information or according to a state of the context information.

With this configuration, the direction, focal length and the like of the input apparatus such as a camera can be automatically adjusted and controlled according to the state of the context information of the subjects in the input moving image such that the context information is not partially lost. Accordingly, for example, when image-capturing is performed while a part of the entire image is displayed on the screen of the digital camera by zooming in through digital zoom processing, even if the user who is capturing the image while holding the camera by hand pays too much attention to the moving image on the display screen and unintentionally changes the direction of the digital camera, the direction of the digital camera can be automatically adjusted by the pan head or the like provided in the digital camera.

In this way, it is possible to reduce the partial loss of the context information caused by an optical illusion of the capturing user or an operation error.

Here, for example, the content processing apparatus may be configured to include an authentication managing unit configured to perform authentication on a processing request input to the content processing apparatus, and the output control unit may be configured to receive a processing request from an external apparatus via the communication unit, and when it is determined by the authentication managing unit that the processing request from the external apparatus is executable, provide the process to the external apparatus.

With this configuration, it is possible to perform content processing and distribution while the moving image input from other terminals via a network, the extracted context information or the like is shared between authenticated content processing apparatuses. Accordingly, for example, a new image-capturing/viewing/editing unit can be provided that enables individual mobile terminals to clip given context information to make footage while distributing the captured moving image to the mobile terminals connected to a network and while sharing the moving image between the plurality of mobile terminals. It is also possible to provide a new image-capturing/viewing/editing unit that while extracting consistent context information by temporarily merging the facial dictionaries of individual mobile terminals, can distribute a single piece of footage to the individual mobile terminals.

These general and specific aspects may be implemented using a system, a method, an integrated circuit, a computer program, or a computer-readable recording medium such as a CD-ROM, or any combination of systems, methods, integrated circuits, computer programs, or recording media.

Hereinafter, embodiments will be described with reference to the drawings. Note that in the following embodiments, the same reference numerals are given to the same structural elements, and descriptions thereof are omitted.

Each of the embodiments described below shows a specific example of a preferred example of the present invention. The numerical values, shapes, materials, structural elements, the arrangement and connection of the structural elements, steps, the processing order of the steps etc. shown in the following embodiments are merely examples, and therefore do not limit the scope of the present invention. Among the structural elements in the following embodiments, structural elements not recited in any one of the independent claims that indicate the broadest concepts of the invention are described as structural elements that constitute preferable embodiments.

[Embodiment 1]

FIG. 1 is a block diagram showing a configuration of a content processing apparatus 100 according to Embodiment 1.

The content processing apparatus 100 shown in FIG. 1 includes a content input unit 101, a storage unit 102, content data 103, an output control unit 104, a content analysis unit 105, analytical information 106, analysis data 107, a candidate process extracting unit 108, a process pattern 109, a content processing unit 110, and an output unit 111.

The content processing apparatus 100 of the present embodiment may be, for example, a surveillance camera or in-car camera capable of image-capturing for 24 hours, a miniature camera that can be embedded in a personal item such as a pair of glasses or a necklace, a digital still camera or digital video camera for professional or consumer use capable of capturing still images or moving images, or the like. Hereinafter, the content processing apparatus 100 will be described by using a specific situation in which the content processing apparatus is used. The present embodiment will be described by taking, as an example, a case where a fixed camera (content processing apparatus 100) installed in a school classroom automatically records daily activities in the classroom to monitor students' safety and record students' growth. An overview of processing performed by each structural element will be given below.

The storage unit 102 includes a storage medium such as a hard disk or a flash memory. The storage unit 102 stores therein content acquired via the content input unit 101 as the content data 103 in a reloadable format. The storage unit 102 also has a function of providing the content data 103 stored in the content input unit 101 as target content.

The content input unit 101 is an example of a content acquiring unit, for example, and receives an input of content (target content) to be processed. To be specific, the content input unit 101 acquires target content such as a still image or moving image to be processed through an input unit (for example, a high definition camera module provided in the camera) mounted in the content processing apparatus 100.

The content input unit 101 inputs the acquired target content into the output control unit 104. Here, two patterns can be assumed: a pattern in which the content input unit 101 inputs the target content acquired from the input unit of the content processing apparatus 100 into the output control unit 104 or the storage unit 102; and a pattern in which the content input unit 101 inputs the content data 103 stored in the storage unit 102 into the output control unit 104 as the target content. The present embodiment will be described in the case where the content input unit 101 acquires target content from the storage unit 102 of the content processing apparatus 100 and inputs the target content into the output control unit 104.

The content analysis unit 105 extracts at least two objects (object elements) included in the target content and feature information indicating features of the objects (object elements). Also, the content analysis unit 105 specifies context information based on analytical information and the extracted feature information, the context information indicating contexts of the objects and including attribute information for supplementing the features of the objects (object elements), and the analytical information being information for specifying the contexts of the objects.

To be specific, in response to a request from the output control unit 104, the content analysis unit 105 specifies, for example, at least two objects included in a moving image that is target content, and extracts semantic information (context information) of the objects by using the analytical information 106. As used herein, the analytical information 106 refers to information that is held or updated in the content processing apparatus 100 and that is used to specify the feature information indicating the features of the object elements and the contexts (contexts, circumstances, environments, meanings, etc.) of the object elements. Also, the semantic information (context information) refers to information that indicates the contexts (meanings) of the objects, and examples thereof include information specifying the type and name of the objects, information regarding the features of the objects, information indicating relationships with other objects included in the target content, information indicating an absolute positional relationship in the target content, and information indicating relative positional relationships with other objects. Also, the analytical information 106 refers to information used to extract the context information described above. The analytical information 106 will be described later in detail. The content analysis unit 105 holds therein the extracted context information as the analysis data 107, and provides the analysis data 107 in response to a request from the output control unit 104.

The candidate process extracting unit 108 extracts a candidate process that is executable on the target content.

To be specific, in response to a request from the output control unit 104, the candidate process extracting unit 108 extracts a candidate process that is executable on the obtained context information (or context group information) based on the process pattern 109. As used herein, the context group information refers to information indicating criteria for grouping a plurality of object elements by using the respective context information of the plurality of object elements.

For example, the candidate process extracting unit 108 extracts an executable candidate process by, with respect to each context group (each group) that is a group of object elements grouped by the context group information, checking whether there is a candidate process that satisfies a candidate process pattern execution requirement and setting a candidate process that matches the context group.

A specific example of the candidate process will be described later, and thus a description thereof is not given here.

In response to a request from the output control unit 104, the content processing unit 110 executes processing on the target content received from the output control unit 104, and stores the processed and output content in the storage unit 102. Furthermore, the content processing unit 110 notifies, where necessary, the output control unit 104 of the processing status of the target content or the result of processing.

To be specific, the content processing unit 110 receives the candidate process designated by the output control unit 104 and checks whether or not the received candidate process is executed. Then, if it is determined that the candidate process is executable, the content processing unit 110 executes the candidate process on the target content. If it is determined that the candidate process is not executable, the content processing unit 110 does not execute the candidate process on the target content. As used herein, the candidate process is a candidate for processing performed on the target content.

The output control unit 104 is an example of a processing control unit and controls processing performed on the target content acquired via the content input unit 101. At this time, the output control unit 104 has a function of reading the input target content at any given timing and temporarily saving the target content to perform a defined process.

For example, the output control unit 104 receives, as the target content, the content data 103 from the storage unit 102 via the content input unit 101. The output control unit 104 requests the content analysis unit 105 to analyze the received target content, and acquires the result of analysis from the content analysis unit 105.

The output control unit 104 also determines whether or not there is an object element in the target content based on the acquired result of analysis and calculates output priority of the existing object element. The output control unit 104 calculates the output priority (processing priority) of the object element based on the context information extracted by the content analysis unit 105.

The output control unit 104 also reads (acquires) the analysis data 107 managed by the content analysis unit 105, defines at least one piece of context group information based on the feature information and the context information included in the analysis data 107 and the calculated output priority, and delivers the context group information to the candidate process extracting unit 108. As used herein, the context group information refers to information indicating criteria for grouping a plurality of object elements by using the context information as described above.

Also, the output control unit 104 receives, from the candidate process extracting unit 108, a candidate process table extracted by the candidate process extracting unit 108, analyzes the content of the candidate process table, determines a candidate process that needs to be processed preferentially, and requests the content processing unit 110 to execute the determined candidate process.

In response to the processing status or the result of processing from the content processing unit 110, the output control unit 104 requests the output unit 111 for a user notification regarding the processing status or the result of processing.

The output unit 111 outputs a user notification regarding the processing status or execution result of the candidate process. The output unit 111 may be, for example, an audio output device such as a speaker, or a light-emitting device such as an LED. Examples of the user notification include a buzzer provided by an audio output device, switching on, switching off and flashing of a light-emitting device, and the like.

Operations of the content processing apparatus 100 having the above-described configuration will be described next with reference to FIGS. 2 to 5.

FIG. 2 is a diagram showing an example of the content data 103 of Embodiment 1.

The storage unit 102 shown in FIG. 1 stores therein the content data 103, for example. Of the content data 103, the storage unit 102 generates some meta information indicating an overview of the content as a content index. The content index include, for example, a number uniquely assigned to each data, the name of data that enables access to each data (also referred to as an object identifier or data path), an extension that represents the type of file format (in this example, mp4 indicating a moving image), the type of the content data 103 (in this example, for the sake of simplifying the description, only "movie" indicating a moving image is used), "state" indicating the generated result of the content data 103, capturing date and time at which the content data 103 was generated, the total (reproduction) time of a moving image, and the like.

FIGS. 3A and 3B are diagrams showing an example of social information, which is an example of the analytical information 106 of Embodiment 1.

FIG. 3A shows a user information table indicating the information of each user from among the social information. In this table, for example, for each identifying ID, a name indicating the name or nickname of the user, and an address indicating a means for transmitting information to the user by e-mail or the like are written.

FIG. 3B shows a social information table indicating the degree of closeness representing the relationship and the closeness between each social information owner and other users. The social information table shown in FIG. 3B is stored as the analytical information 106 in the content analysis unit 105, as with FIG. 3A. As used herein, the relationship indicates whether or not the target user of interest (social information owner) and other users are acquaintances in the real world. The degree of closeness indicates the closeness as viewed from the social information owner, expressed as a particular numerical value.

For example, in FIG. 3B, social information owners are listed in the vertical columns, and users targeted for evaluation with respect to each social information owner are listed in the horizontal rows. The degree of closeness with respect to each user is managed as a numerical value from 0 to less than 1. In the case where the users are not acquaintances in the real world, the degree of closeness is expressed as "0" or "a numerical value close to 0". Here, if it is assumed that, for example, the social information owner is "Mike" having an identifying ID of "0", "Mike" and "Alice" are acquaintances, and the degree of closeness is expressed as "0.83", Furthermore, the degree of closeness to "Julia" is expressed as "0.83", and the degree of closeness to "Tom" is expressed as "0.53", which indicates that "Mike" has a closer relationship with "Alice" and "Julia" who have greater values than "Tom". Needless to say, "Mike" is the social information owner, and thus "-" (no input of numerical value is required) is written, as the numerical value of the degree of closeness, in the cell at which the row and column corresponding to "Mike" intersect. Furthermore, if it is assumed that the social information owner is "Alice" having an identifying ID of "1", the relationship therewith and the degree of closeness to each user can be managed as numerical values.

Note that, this example is described assuming that the numerical value of the degree of closeness is a normalized numerical value from 0 to less than 1, but the method of managing the degree of closeness is not limited thereto. It may be possible to use a point system in which points are added without any upper limit, or a grading system consisting of several levels such as A to E according to decreased granularity.

Figures 4A, 4B:
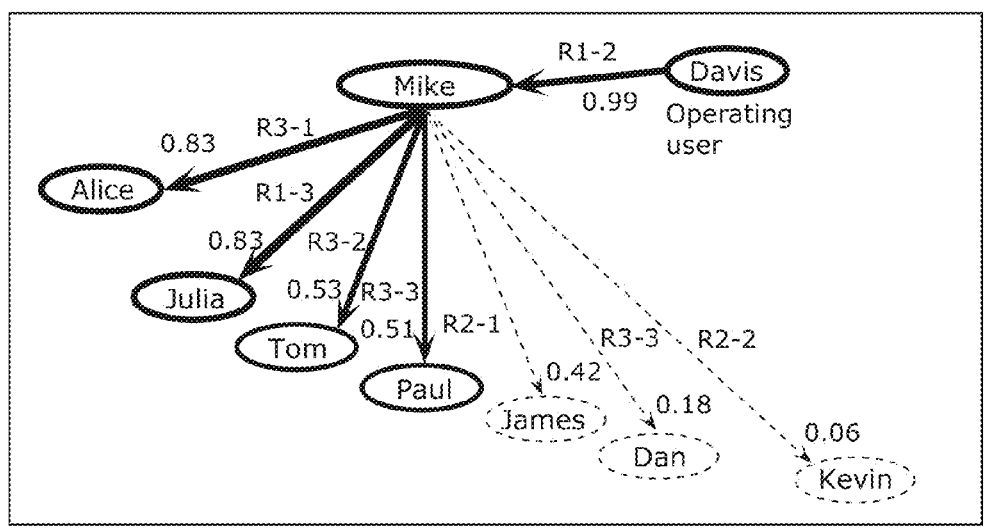
FIG. 4A is a diagram showing an example of a node concept of social information according to Embodiment 1.
FIG. 4B is a diagram showing an example of a relationship reference table according to Embodiment 1.
Figure 5:
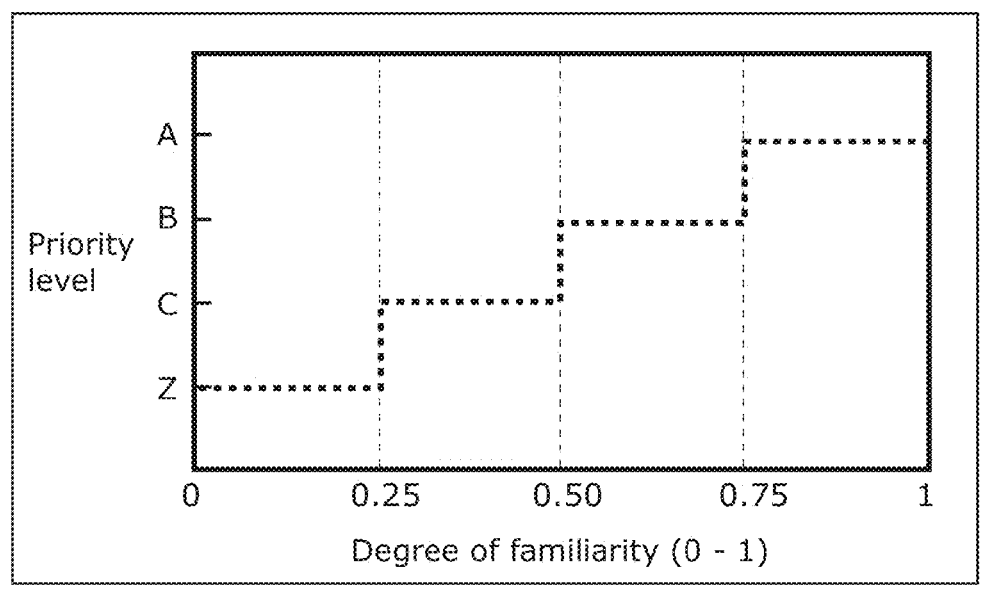
FIG. 5 is a diagram showing an example of a priority determining threshold value table held as analytical information in a content analysis unit according to Embodiment 1.

FIG. 4A is a diagram showing an example of a node concept of the social information of Embodiment 1. FIG. 4B is a diagram showing an example of a relationship reference table according to Embodiment 1. FIG. 5 is a diagram showing an example of a priority determining threshold value table according to Embodiment 1.

As shown in FIG. 4A, the social information is expressed by numerical values and arrows indicating the degree of closeness of a node "Mike" who is the social information owner to each user. In this diagram, the higher the numerical value, the closer the relationship (closer to 1), and the lower the numerical value, the more distant the relationship (closer to 0). Also, the relationship between each node and other users indicated by an arrow extending from the node is managed by using the relationship reference table shown in FIG. 4B by referring to the relationship ID (RID). In the relationship reference table shown in FIG. 4B, the greater the sub-number of each relationship, the more distant the relationship. Accordingly, for example, at school, "friend" is more distant in relationship than "close friend", and "classmate" is more distant in relationship than "friend".

In the example shown in FIG. 4A, "Davis" is set as the operating user. Then, "Mike" is selected as a social information owner based on the relationship with the operating user "Davis". The operating user "Davis" may be set in advance in the content processing apparatus 100, or may be set via a portable terminal such as smart phone.

FIG. 5 is a diagram showing an example of a priority determining threshold value table held in the content analysis unit 105 as the analytical information 106. The output control unit 104 calculates a level of output priority of a candidate process, which will be described later, by referring to, for example, the threshold values shown in FIG. 5. In this example, the priority level is divided into four stages, namely, A, B, C and Z. In FIG. 4A, "Alice" and "Julia" are both 0.83 and thus are classified as priority level "A". Likewise, "Tom" and "Paul" are 0.53 and 0.51, and thus are classified as priority level "B".

Content processing performed by the content processing apparatus 100 of Embodiment 1 will be roughly described with reference to FIG. 6.

Figure 6:
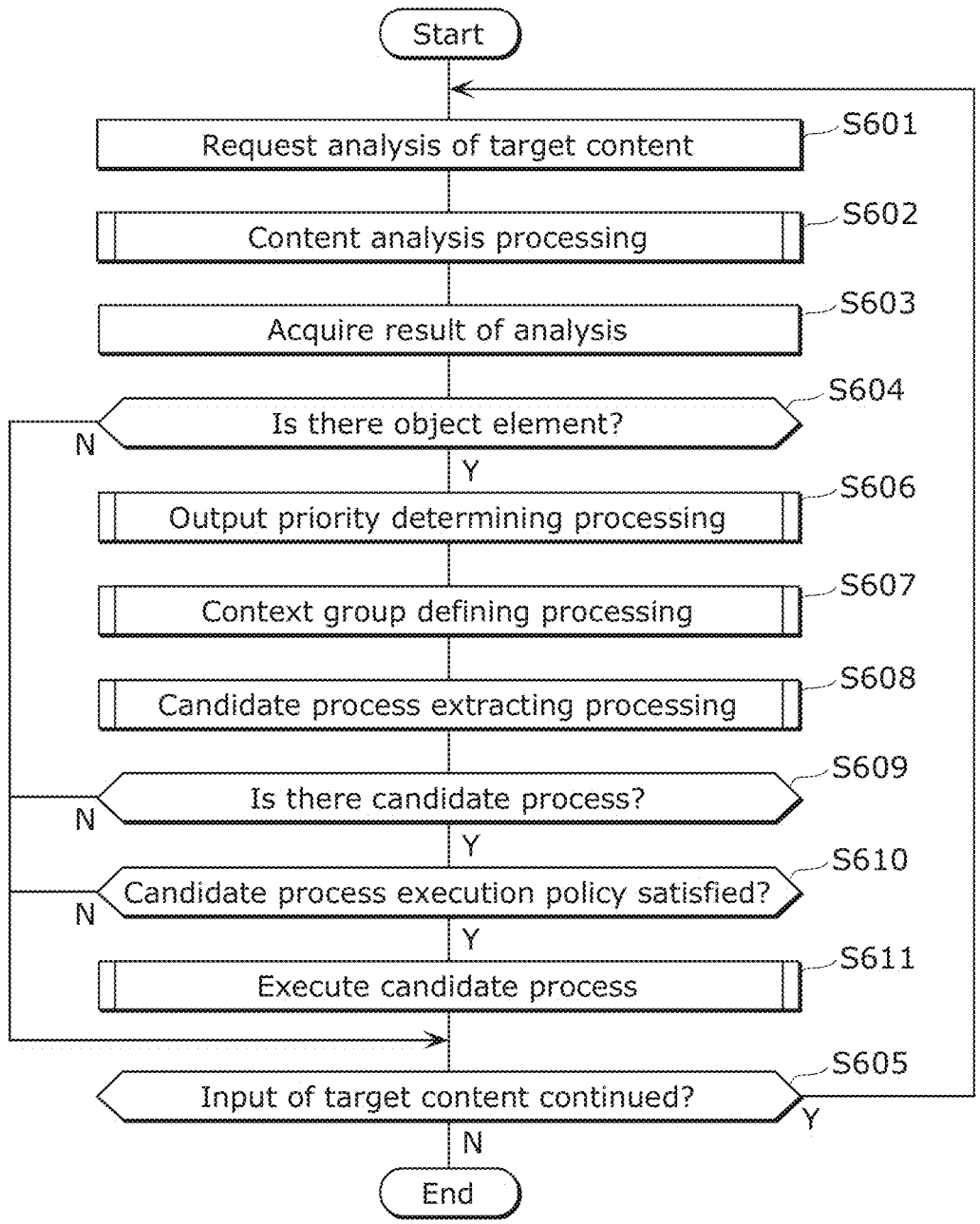
FIG. 6 is a flowchart illustrating a flow of processing for determining a content process performed by an output control nit according to Embodiment 1.

FIG. 6 is a flowchart illustrating a flow of processing for determining a content process performed by the output control unit 104 of Embodiment 1.

First, the output control unit 104 receives the content data 103 as target content from the storage unit 102 via the content input unit 101, and requests the content analysis unit 105 to analyze the target content (S601). In response to a request from the output control unit 104, the content analysis unit 105 performs analysis processing on the target content (S602).

Next, the output control unit 104 acquires the result of analysis from the content analysis unit 105 (S603), and determines whether or not there is an object element in the target content, the object element representing a person, a common object or the like (S604).

If it is determined in step S604 that there is no object element in the target content (No in S604), the output control unit 104 determines whether input of the target content is continued (S605). Then, in step S605, if input of the target content is not continued and ends (No in S605), the processing of extracting a candidate process ends. If input of the target content is continued (Yes in S605), the procedure returns to step S601, and the processing of extracting a candidate process with respect to the target content is continued.

If, on the other hand, it is determined in step S604 that there is an object element in the target content (Yes in S604), the output control unit 104 starts output priority determining processing (S606) for determining (calculating) output priority based on the result of analysis extracted by the content analysis unit 105.

Next, the output control unit 104 starts context group defining processing for defining, based on the output priorities determined by the output control unit 104, information (context group information) indicating criteria for grouping at least one object element included in the target content as a context group (S607).

Next, the output control unit 104 requests the candidate process extracting unit 108 to extract a candidate process with respect to the context group information defined by the output control unit 104. The candidate process extracting unit 108 extracts a candidate process with respect to the context group (S608).

Next, the output control unit 104 receives the result of extraction of a candidate process from the candidate process extracting unit 108. If there is a candidate process as a result of extraction of a candidate process (Yes in S609), it is determined whether a requirement of candidate process execution policy preset for the candidate process by the content processing apparatus 100 is satisfied (S610).

If it is determined in step S610 that the requirement is satisfied (Yes in S610), the output control unit 104 requests the content processing unit 110 to execute the candidate process (S611).

Next, the output control unit 104 receives the execution status or execution result of the processing from the content processing unit 110, and then determines whether or not input of the target content is continued (S605).

If it is determined in step S609 that there is no candidate process (No in S609), and it is determined in step S610 that the requirement is not satisfied (No in S610), the procedure advances to step S605, and the output control unit 104 determines whether or not input of the target content is continued.

In the present embodiment, in order to simplify the description, the candidate process execution policy is defined to "execute all of the extracted candidate processes".

Note that the candidate process execution policy is defined to "execute all of the extracted candidate processes", but the candidate process execution policy is not limited thereto, and may be changed as appropriate according to the processing power (for example, CPU resource, free space, and the like) of the content processing apparatus 100, the installation conditions (for example, indoor, outdoor, rain, network communication availability and the like) of the content processing apparatus 100, as well as changes in the status of the target content (for example, a significant reduction in brightness). Specifically, for example, the candidate process execution policy may be defined to "execute, out of the extracted candidate processes, only a candidate process whose context group information includes the main subject" or "execute the top two of the extracted candidate processes".

A flow of the content analysis processing (details of step S602) performed by the content analysis unit 105 will be described with reference to FIGS. 7 to 9.

Figure 7:
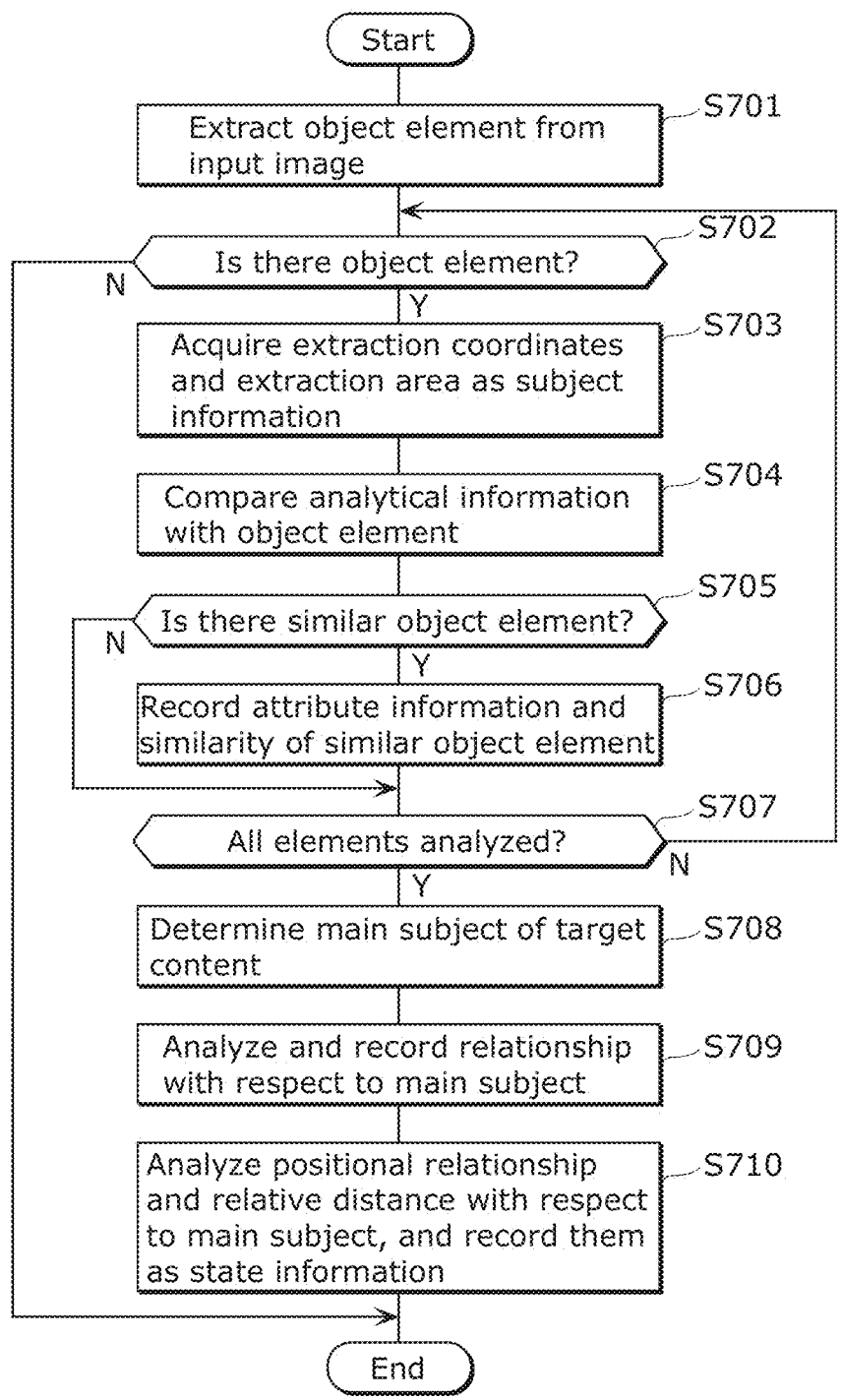
FIG. 7 is a flowchart illustrating a flow of content analysis processing according to Embodiment 1.
Figure 8:
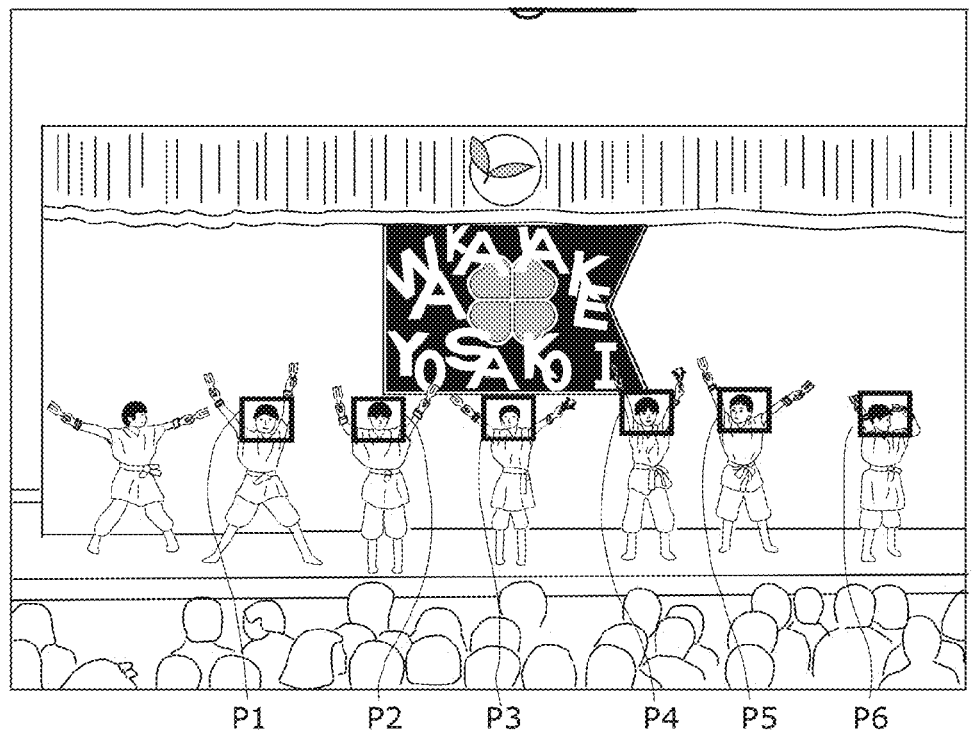
FIG. 8 is a diagram showing an example of a moving image serving as target content according to Embodiment 1.

FIG. 7 is a flowchart illustrating a flow of the content analysis processing according to Embodiment FIG. 8 is a diagram showing an example of a moving image serving as target content according to Embodiment 1. FIG. 9 is a diagram showing an example of analysis data (people) according to Embodiment 1.

The present embodiment will be described assuming that, out of the content data 103 shown in FIG. 2, a moving image indicated by data name "C-1" and having a duration of 34 minutes and 05 seconds is input as target content. It is also assumed that in the moving image, out of the user information shown in FIGS. 3A and 3B, users whose IDs are 0, 1, 2, 3, 4 and 5 are included as subjects in the moving image.

First, in response to a request from the output control unit 104, the content analysis unit 105 extracts an object element from the input image (target content) transferred from the output control unit 104 (S701).

The content analysis unit 105 then determines whether there is an object element in the input image (target content) (S702). If it is determined in step S702 that there is no object element in the input image (target content) (No in S702), the content analysis unit 105 ends the content analysis processing.

If, on the other hand, it is determined in step S702 that there is an object element in the input image (target content) (Yes in S702), the content analysis unit 105 acquires a set of extraction coordinates and an extraction area as subject information of the extracted object element (S703). In the target content (moving image) shown in FIG. 8, as object elements, people's faces are extracted as a result of analysis, and thus there are six object elements P1 to P6 in the target content. In the case where the entire resolution of the target content (moving image) shown in FIG. 8 is 4000 horizontal pixels×2000 vertical pixels, in the analysis data (people) shown in FIG. 9, when expressed in the abscissa and the ordinate, the set of extraction coordinates of the subject information of P1 is (1120, 1021), and the extraction area is (188, 187). After this, with respect to the extracted object elements P2 to P6, their subject information can be extracted in the same manner.

Next, the content analysis unit 105 compares the analytical information 106 with the object elements (S704).

Next, the content analysis unit 105 determines whether there is a similar object element (S705). If it is determined in step S705 that there is no similar object element (No in S705), the content analysis unit 105 does not record a similar object element. For example, in the example shown in FIG. 9, among the extracted object elements P1 to P6, there is no object element similar to P1 in the facial dictionary of the analytical information 106, and thus a cross is recorded as its status in the Facial Dictionary field, and "unknown" is recorded in the Name field.

If, on the other hand, it is determined in step S705 that there is a similar object element (Yes in S705), the content analysis unit 105 records attribute information and similarity of the similar object element (S706). For example, in the example shown in FIG. 9, there are object elements similar to P2 and P3 in the facial dictionary of the analytical information 106, and thus the names of the similar object elements found in the facial dictionary of the analytical information 106 such as "Alice" and "Dan", and their similarities are recorded in the analysis data.

As used herein, the attribute information refers to information that supplements the features of the object elements. Examples of the attribute information include attribute information regarding people, attribute information regarding characters, attribute information regarding common objects, and attribute information regarding audio. Examples of the attribute information regarding people include the name of a subject, a similarity, social information, clothing information, and the like. Examples of the attribute information regarding characters include a character string, the versatility of a character string, the risk of a character string, and the like. Examples of the attribute information regarding common objects include the name of an object, accuracy, related information, object's positional information, and the like. Examples of the attribute information regarding audio include a voice print, the name of a speaker, similarity, social information, a voice type, and the like.

Next, the content analysis unit 105 determines whether or not analysis has been performed on all of the object elements (S707). If it is determined in step S707 that not all of the object elements have been analyzed (No in S707), the procedure returns to step 702, and the content analysis unit 105 repeats the object element extraction processing. If, for example, only the analysis of P1 and P2 shown in FIG. 9 has been finished, the object element extraction processing is performed on each of the object elements P3 to P6 so as to record their attribute information and similarity.

If, on the other hand, it is determined in step S707 that the analysis of all of the object elements has been finished (Yes in S707), the content analysis unit 105 determines the main subject of the target content (S708).

In the example shown in FIG. 4A, "Davis" is set as the operating user who is operating the content processing apparatus 100, and from the relationship thereof, it can be seen that "Mike" is "R1-2: child", to which most attention is to be given among the extracted object elements. Accordingly, in the analysis data shown in FIG. 9, "Mike" is determined as the main subject, and a circle is recorded in the Main Subject field in FIG. 9.

As used herein, the main subject refers to, in the analysis data, among a plurality of objects included in the target content, an important object (person, etc.) to which most attention is to be given by 1) the user who is operating the content processing apparatus, 2) a person that has been set in advance, or 3) a person who has been selected via a portable terminal that works in cooperation with the content processing apparatus.

Furthermore, the content analysis unit 105 analyzes and records the relationships between the main subject "Mike" and each object element, as shown in FIG. 4A (S709). Here, an example is shown in which relationship information with respect to all of the extracted object elements is recorded, but it is also possible to use a configuration in which the object elements are classified into the priority levels A to C, and Z as shown in FIG. 5 according to the degree of closeness, and relationship information with respect to the object elements of the level Z is not recorded.

Finally, the content analysis unit 105 analyzes the moving image as the target content for the positional relationship and the relative distance from the main subject, and records the positional relationship and the relative distance as state information (S710). As shown in FIG. 8, when the object elements are numbered from left to right according to the order of appearance in the moving image, the object elements P1 to P6 are managed by the numbers "1" to "6". Also, the relative distance from the main subject "Mike" is converted into a numerical value and recorded in the Relative Distance field.

For example, the relative distance of P2 from the main subject P4 is "2.1", and the relative distance of the object element P5 who is adjacent to the object element P4 is "1.2", from which it can be determined that the object element P2 is positioned relatively more distant from the object element P4 as compared to the object element P5. The state information is not limited to the positional relationship and the relative distance from the main subject as described above, and may be any other information as long as the information relates to the state of the object elements included in the target content. Examples of other information regarding the state of the object elements include an exposure rate indicating the degree of exposure of the object elements included in the moving image serving as the target content, and a superimposition rate indicating the degree of superimposition of the object elements.

A flow of the output priority determining processing (details of step S606) performed by the output control unit 104 will be described with reference to FIGS. 10 and 11.

Figure 10:
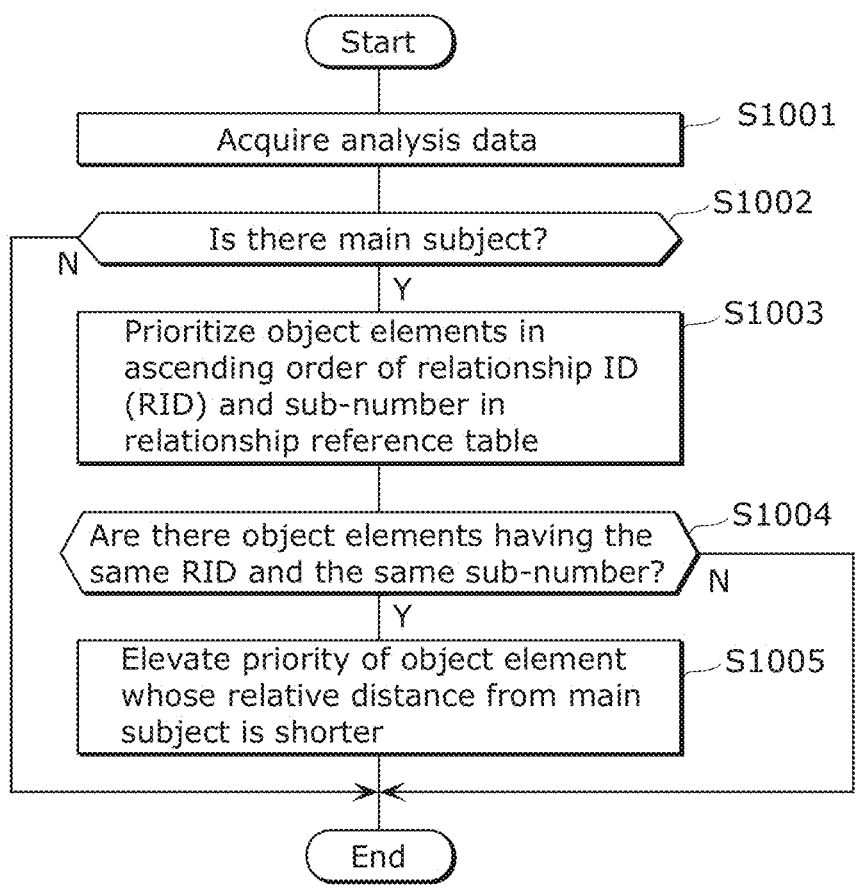
FIG. 10 is a flowchart illustrating a flow of output priority determining processing according to Embodiment 1.

FIG. 10 is a flowchart showing a flow of the output priority determining processing of Embodiment 1. FIG. 11 is a diagram showing the analysis data (people) of Embodiment 1 and examples of results of the priority determining processing.

First, the output control unit 104 acquires the analysis data 107 analyzed by the content analysis unit 105 (S1001).

Next, the output control unit 104 determines whether or not there is a main subject in the analysis data 107 (S1002). If it is determined in step S1002 that there is no main subject (No in S1002), the output control unit 104 ends the output priority determining processing.

If, on the other hand, it is determined in step S1002 that there is a main subject (Yes in S1002), the output control unit 104 prioritizes the object elements in ascending order of the relationship ID (RID) and the sub-number of the relationship ID in the relationship reference table (S1003).

Next, the output control unit 104 determines whether there are object elements having the same relationship ID (RID) and the same sub-number of the relationship ID (S1004).

If it is determined in step S1004 that there are no object elements having the same relationship ID (RID) and the same sub-number of the relationship ID (No in S1004), the output control unit 104 ends the output priority determining processing.

If, on the other hand, it is determined in step S1004 that there are object elements having the same relationship ID (RID) and the same sub-number of the relationship ID (Yes in S1004), the output control unit 104 performs control so as to elevate the output priority of an object element having a shorter relative distance from the main subject (S1005).

In the present embodiment, in step S1003, the output control unit 104 prioritizes the object elements, for example, in ascending order of the relationship ID (RID) and the sub-number of the relationship ID (the numbers representing parent, child, brother/sister, and the like in the ascending order) in the relationship reference table shown in FIG. 4B. More specifically, the output control unit 104 sets the main subject as the first output priority. Then, as shown in FIG. 11, based on the relationship information, the next closely related object element "Alice", who is set as a "child's close friend", is given the second output priority. Then, "Tom" who is a "child's friend" is given the third output priority. In this example, the object elements P3 and P6 each have the relationship ID and the sub-number of the relationship ID indicating a "child's classmate", or in other words, they have the same relationship (Yes in S1004), and thus control is performed so as to elevate the output priority of an object element having a shorter relative distance from the main subject in the target content (the moving image) (S1005). That is, in the example shown in FIG. 11, the object element P3 is positioned closer to the main subject as compared to the object element P6, and thus "4" is given to the object element P3 as its output priority, and "5" is given to the object element P6 as its output priority.

A flow of the context group defining processing (details of step S607) performed by the output control unit 104 will be described next with reference to FIGS. 12 to 14.

Figure 12:
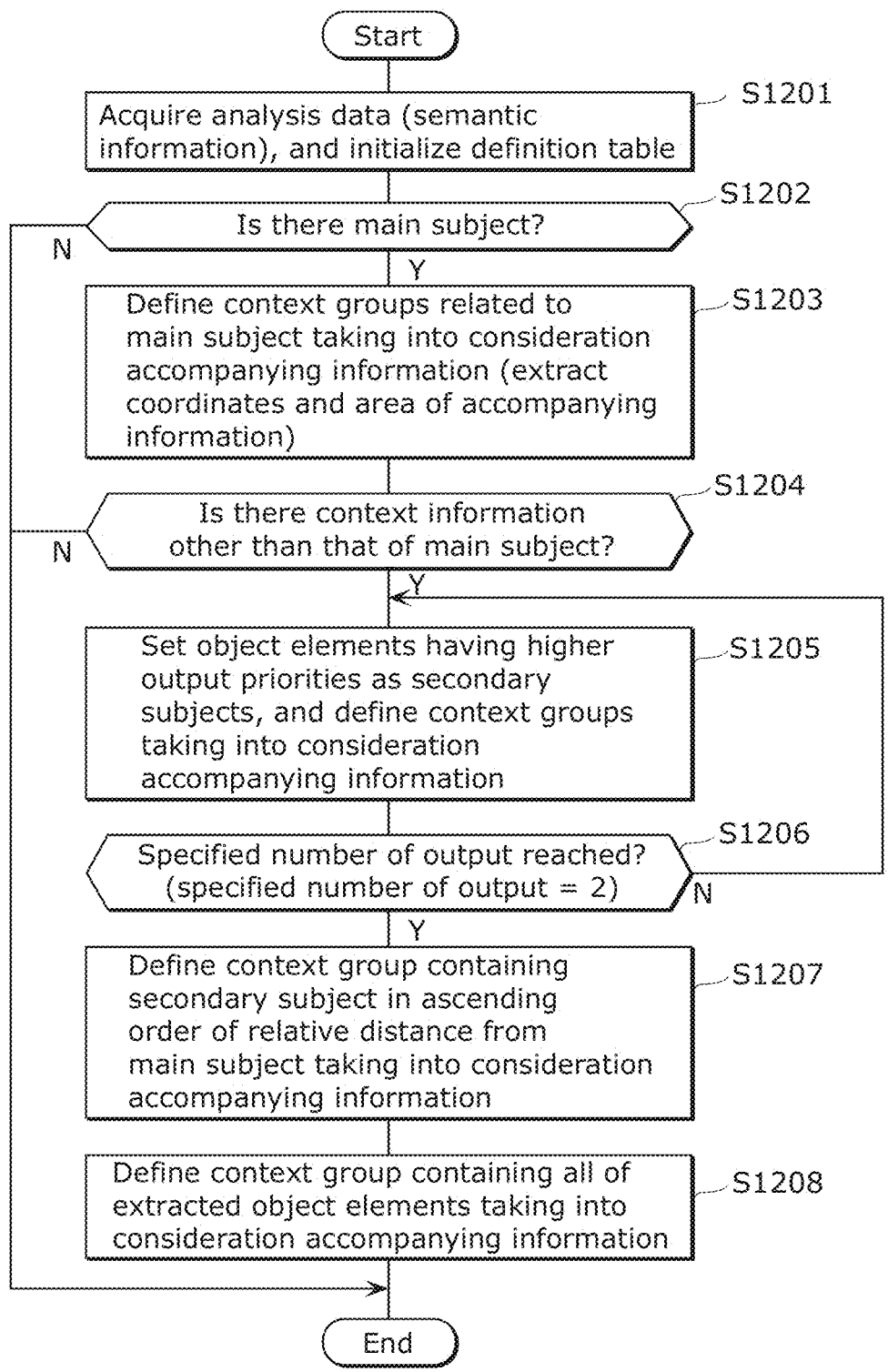
FIG. 12 is a flowchart illustrating a flow of context group defining processing according to Embodiment 1.

FIG. 12 is a flowchart illustrating a flow of the context group defining processing according to Embodiment 1. FIG. 13 is a diagram showing an example of a context group information definition table according to Embodiment 1.

First, the output control unit 104 acquires the analysis data 107 analyzed by the content analysis unit 105, and initializes the definition table (the table in which context group information is defined) held in the output control unit 104 (S1201).

Next, the output control unit 104 determines whether or not there is a main subject in the analysis data 107 (S1202). If it is determined in step S1202 that there is no main subject (No in S1202), the output control unit 104 ends the context group defining processing.

If, on the other hand, it is determined in step S1202 that there is a main subject (Yes in S1202), the output control unit 104 defines context groups specially related to the main subject, taking into consideration accompanying information (S1203). As used herein, the accompanying information refers to area information regarding an area that accompanies the object element extracted by the content analysis unit 105 and is difficult to be separated. In the present embodiment, for example, the accompanying information can be a portion corresponding to a body part (a torso, a hand, a foot or the like that is under the neck) that accompanied by a human face. The output control unit 104 newly defines a set of coordinates and an area of the accompanying information. For example, in the target content shown in FIG. 14, the output control unit 104 estimates in advance, based on the set of coordinates and the area where the face of the main subject P4 is located, a display area of the torso portion that can be inevitably determined from the positional relationship with the face, and then automatically adjusts the face and the torso such that they are within the angle of view as a single content. Note that the present embodiment is described taking an example in which the object elements are humans, but the present invention is not limited thereto. In the case where the object elements are common objects, the portions accompanied by the objects may be defined as the accompanying information.

Next, the output control unit 104 checks whether there is context information other than that of the main subject (S1204). If it is determined in step S1204 that there is no context information other than that of the main subject (No in S1204), the output control unit 104 ends the context group defining processing.

If, on the other hand, it is determined in step S1204 that there is context information other than that of the main subject (Yes in S1204), the output control unit 104 sets an object element having a high output priority as a secondary subject, and defines the context group information taking into consideration the accompanying information (S1205).

Next, the output control unit 104 checks whether or not the number of output of secondary subjects has reached a specified number of output (S1206). If it is determined in step S1206 that, for example, the number of output of secondary subjects has not reached the specified number of output (in this example, the specified number of output is 3) (No in S1206), the procedure returns to step S1205, and the output control unit 104 continues extraction of a secondary subject and defining of context group information specially related to the secondary subject. In the present embodiment, as shown in FIG. 13, the main subject P4 is grouped as G1, and the set of coordinates and the expansion area of each of the secondary subjects P2 and P5 are calculated and recorded.

Note that, in this example, determination is made as to whether the number of output of a secondary subject has reached a fixed specified number of output, but the determination method is not limited thereto. It is also possible to use a determination method in which extraction of a secondary subject and defining of context group information related to the secondary subject are continued until all of the users classified into the priority levels A to C shown in FIG. 5 are extracted.

If, on the other hand, it is determined in step S1206 that the number of output of secondary subjects has reached the specified number of output (Yes in S1206), the output control unit 104 defines context group information containing secondary subjects in ascending order of the relative distance from the main subject taking into consideration the accompanying information (S1207).

Next, the output control unit 104 defines context group information containing all of the extracted object elements taking into consideration the accompanying information, and ends the context group defining processing (S1208).

In the present embodiment, as shown in FIG. 13, for example, a context group G4 is defined as a group including, in addition to the main subject P4, the secondary subject P5 having the shortest relative distance from the main subject. Next, a context group G5 is defined as a group including the secondary subject P2 having the next shortest relative distance from the main subject P4.

Note that, in the present embodiment, an example is described in which the context group information is defined in combination with a secondary subject whose relative distance from the main subject is short, but the defining method is not limited thereto. It may be possible to use, for example, a method in which the context group information is defined by combining users classified as the priority level A shown in FIG. 5, or a method in which the context group information is defined by comprehensively combining previously extracted context information.

Figure 14:
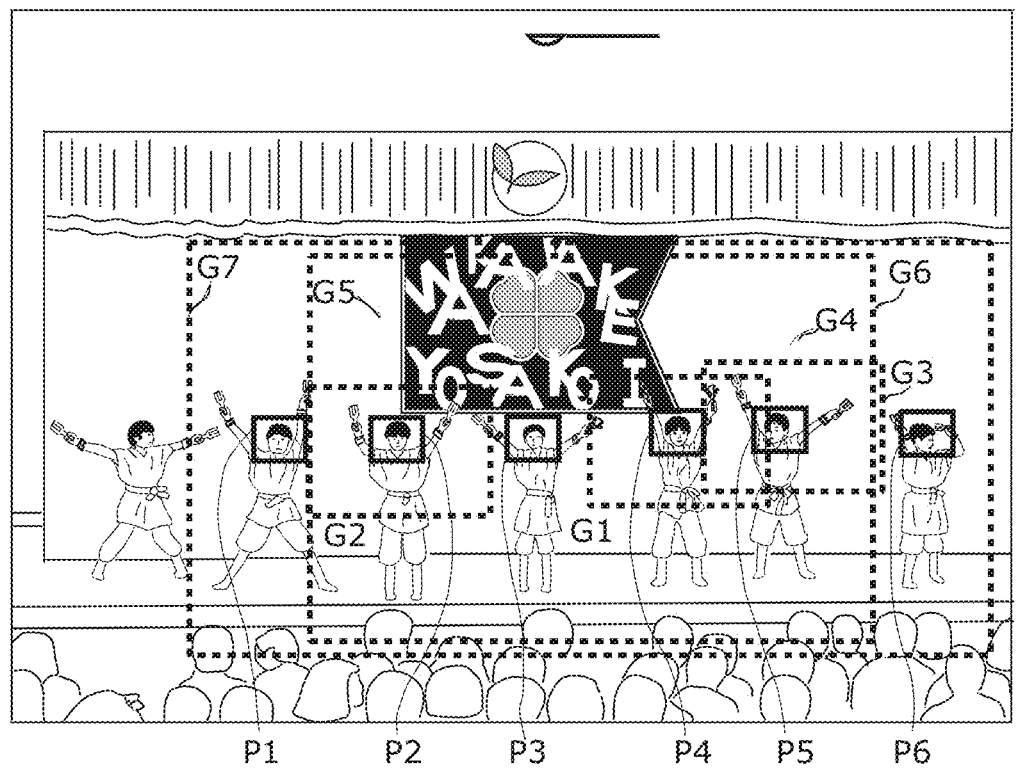
FIG. 14 is a diagram showing an example in which definitions of context group information are overlaid on a moving image serving as target content according to Embodiment 1.

FIG. 14 is a diagram showing an example in which definitions of context group information are overlaid on a moving image serving as target content according to Embodiment 1.

As shown in FIG. 14, an area containing at least one object element is defined as context group information, and therefore it is possible to implement content processing with which, a meaningful area containing, in the target content that is to be captured, viewed or edited, a main subject or secondary subject can be set as a target range.

A flow of the candidate process extracting processing (details of step S608) performed by the candidate process extracting unit 108 will be described next with reference to FIGS. 15 to 17.

Figure 16:
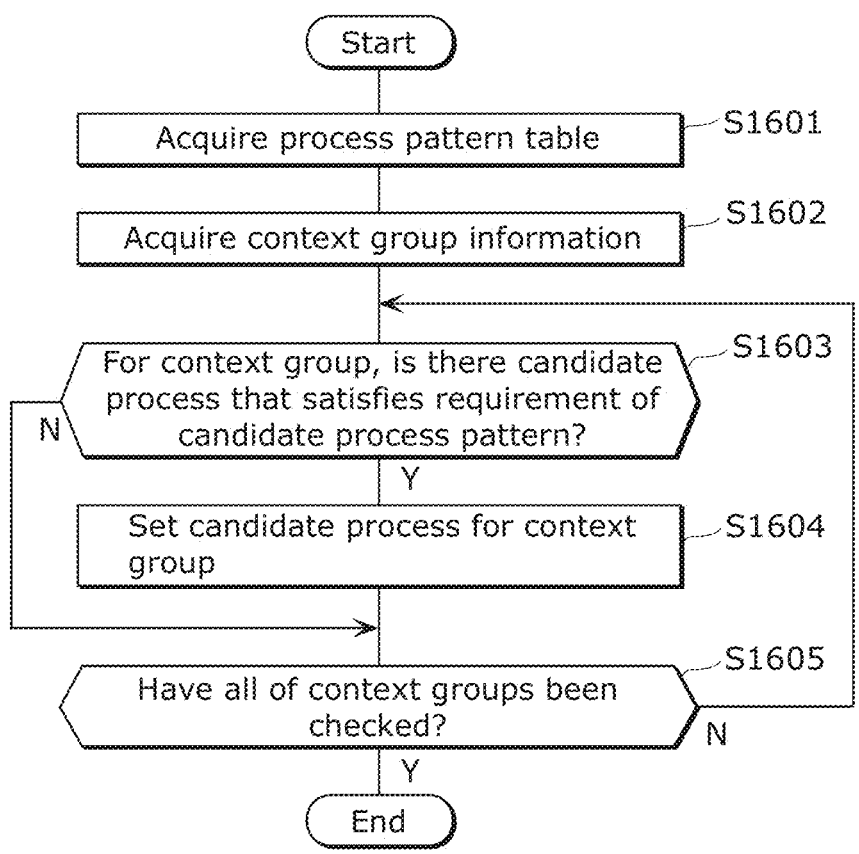
FIG. 16 is a flowchart illustrating a flow of candidate process extracting processing according to Embodiment 1.

FIG. 15 is a diagram showing an example of a candidate process pattern table according to Embodiment 1, FIG. 16 is a flowchart illustrating a flow of candidate process extracting processing according to Embodiment 1. FIG. 17 is a diagram showing an example in which candidate processes are set with respect to context group information according to Embodiment 1.

The candidate process extracting unit 108 holds, as the process pattern 109, a candidate process pattern table as shown in FIG. 15. The process pattern is managed by using candidate process IDs such as E1 and E2, and candidate processes that can be processed in the content processing unit 110 are written. In the present embodiment, in order to simplify the description, the outline of a candidate process that is digitally processed is written with a character string. Furthermore, for each candidate process, a requirement for execution of the process is written. For example, FIG. 15 shows that a candidate process E2 is executable only when the context group information includes the main subject.

The candidate process extracting unit 108 acquires the candidate process pattern table therefrom (S1601).

Next, the candidate process extracting unit 108 acquires context group information from the output control unit 104 (S1602).

Next, the candidate process extracting unit 108 checks, for each group of the context group information, whether there is a candidate process that satisfies an execution requirement in the candidate process pattern (S1603).

If it is determined in step S1603 that there is a candidate process that satisfies a requirement (Yes in S1603), the candidate process extracting unit 108 sets the candidate process with respect to the context group (S1604).

If, on the other hand, it is determined in step S1603 that there is no candidate process that satisfies a requirement (No in S1603), the candidate process extracting unit 108 advances the procedure to step S1605.

Then, the candidate process extracting unit 108 checks whether all of the context groups of the context group information have been checked as to whether there is a candidate process that satisfies an execution requirement (S1605).

If it is determined in step S1605 that there still is a context group that needs to be checked (No in S1605), the candidate process extracting unit 108 repeats the processing from step S1603.

If, on the other hand, it is determined in step S1605 that all of the context groups of the context group information have been checked as to whether there is a candidate process that satisfies an execution requirement (Yes in S1605), the candidate process extracting unit 108 ends the candidate process extracting processing.

As a result of the candidate process extracting processing being performed, in the present embodiment, as shown in FIG. 17, for each group of the context group information, candidate processes that correspond to the requirements written in the candidate process table are recorded.

A flow of the candidate process execution processing (details of step S611) performed by the content processing unit 110 will be described next with reference to FIGS. 18 to 20G.

Figure 18:
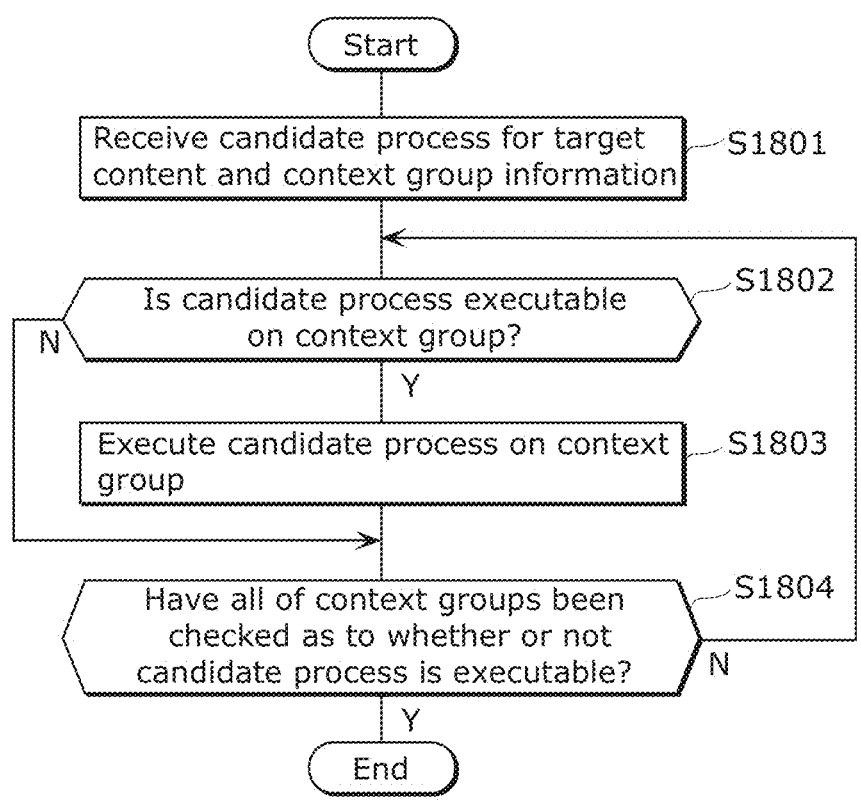
FIG. 18 is a flowchart illustrating a flow of candidate process execution processing according to Embodiment 1.

FIG. 18 is a flowchart illustrating a flow of the candidate process execution processing according to Embodiment 1.

The output control unit 104 acquires a candidate process with respect to the context group information of the target content from the candidate process extracting unit 108, and thereafter requests the content processing unit 110 to execute the candidate process in accordance with the above-described candidate process execution policy.

That is, first, the content processing unit 110 receives the target content and a candidate process designated by the output control unit 104 with respect to context group information (S1801).

Next, the content processing unit 110 checks whether or not the candidate process is executable on a context group contained in the context group information (S1802).

If it is determined in step S1802 that the candidate process is executable (Yes in S1802), the content processing unit 110 executes the candidate process on the context group (S1803). If, on the other hand, it is determined in step S1802 that the candidate process is not executable (No in S1802), the content processing unit 110 skips step S1803, and the procedure advances to step S1804.

In the present embodiment, for a context group of the context group information shown in FIG. 17, the candidate processes El and E2 that are referred to from the candidate process pattern shown in FIG. 15 are executed. That is, the content processing unit 110 specifies the context group G1 containing the main subject P4 in the target content based on the set of coordinates and the area, clips the context group in accordance with the candidate process El. Furthermore, the content processing unit 110 generates a separate file by adding the supplemental information (for example, event name, etc.) in accordance with the candidate process E2, and then requests the storage unit 102 to save the file.

Next, the content processing unit 110 determines whether all of the context groups of the context group information have been checked as to whether a candidate process instructed to the context group is executable (S1804).

If it is determined in step S1804 that there still is a context group that has not been checked (No in S1804), the content processing unit 110 repeats the processing from step S1802. If, on the other hand, it is determined in step S1804 that all of the context groups of the context group information have been checked as to whether a candidate process instructed to the context group is executable (Yes in S1804), the content processing unit 110 ends the processing.

In the present embodiment, the context groups G2 to G7 after G1 shown in FIG. 17 are checked as to whether a candidate process instructed to the context groups G2 to G7 is executable, and when all of the context groups have been checked, the processing ends.

Then, the content processing unit 110 notifies the output control unit 104 of the processing status or the result of processing. As indicated in step S605 in FIG. 6, the output control unit 104 then determines whether or not to request the content analysis unit 105 to perform analysis processing on the next target content in response to a notification from the content processing unit 110.

In order to simplify the description, the present embodiment has been described by using a moving image as the target content or an image contained in a moving image in time series as the target content. In order to maintain the continuity of the moving image, the output control unit 104 may be configured to, in the case of executing a content process of clipping a given area of the target content, hold context group information that is based on previously defined context information, and continuously perform track processing on the consecutive images so as to provide an output as a single moving image in a file. Also, it is obvious that the content processing apparatus 100 is useful in image-capturing, viewing or editing of still images.

FIG. 19 is a diagram showing an example of a content index obtained after execution of the content processing according to Embodiment 1, FIGS. 20A to 20G are diagrams showing examples of content obtained after execution of the content processing according to Embodiment 1.

In the context index shown in FIG. 2 held in the storage unit 102 of the content processing apparatus 100, C-1 to C-10 having tag information "Original" are stored. However, in FIG. 19, G1 to G7 having tag information "Auto" are newly stored as C-11 to C-17.

Figure 20A:
FIG. 20A is a diagram showing an example of content obtained after execution of content processing according to Embodiment 1.
Figure 20B:
FIG. 20B is a diagram showing an example of content obtained after execution of content processing according to Embodiment 1.
Figure 20C:
FIG. 20C is a diagram showing an example of content obtained after execution of content processing according to Embodiment 1.

Also, as shown in FIGS. 20A to 20G, as a result of processing of each candidate process, for example, FIG. 20A shows a file generated and stored by clipping only the main subject P4 in accordance with the candidate process E1, and adding supplemental information "Mike 2002" in accordance with the candidate process E2. FIG. 20B shows a file generated and stored by clipping only the secondary subject P2 in accordance with the candidate process E1, and thus the candidate process E2 not designated was not executed.

Note that the present embodiment has been described taking an example in which object elements as typified by people's faces are extracted from the target content, but the object elements to be extracted are not limited thereto. The object elements may be, other than people's faces, for example, common objects such as characters, symbols, signboards on the street or landmarks. Also, there may be a candidate process that extracts, for example, an appearance timing, a duration of appearance, a relative volume or the like in the time axis of audio included in the target content as an object element, compares the object element with a voice print that is the analytical information 106, and clips the object element.

Note that the present embodiment has been described by using a portion corresponding to a body part as the accompanying information that accompanies an object element analyzed by the content analysis unit 105, but the accompanying information is not limited thereto. It is also possible to use, for example, information that can identify an individual such as the color, shape or feature of clothes worn by the person, the feature of a bag carried by the person with the use of a sensor, communication or the like.

In order to simplify the description, the present embodiment and the subsequent embodiments will be described taking a moving image as the target content. For example, in the case of executing a content process of clipping a given area of the target content, it is possible to hold context group information that is based on previously defined context information, and continuously perform track processing on the consecutive images so as to provide an output as a single moving image in a file, but the present invention is not limited thereto. In order to prevent a situation in which, for example, context information cannot be extracted due to a person to be extracted as the context information turning away or turning around, the accuracy of track processing may be improved by assisting extraction of context information by using the continuity or the like of the accompanying information (for example, the color of clothes worn by the person) linked to the context information.

As described above, according to the present embodiment, the context information of each object element is calculated according to the feature information regarding a subject or audio contained in the content, and candidate content processes extracted from the context information can be determined and executed. Accordingly, for example, in the case where the faces of a plurality of people are included as object elements in a moving image, it is possible to perform control so as to zoom in (perform a digital zoom process) on the faces and its related parts of up to two people, among the plurality of people, calculated as context information to a specified size and output as separate moving image files (record into a storage medium). In this way, it is possible to easily achieve execution of a content process according to the context information without requiring a user operation or instruction with respect to each object element.

The present embodiment has been described taking an example in which, as the subject information of an object element, a set of coordinates and an area in the target content are designated, but the representation of the subject information of the subject element is not limited thereto, and may be a vector representation in the target content.

Also, the present embodiment has been described taking an example in which in the candidate process extracting processing (step S608), a candidate process with respect to a context group is determined with reference to the candidate process table, but the method of determining a candidate process is not limited thereto. For example, in the case where it is determined that the area of an object element is small by considering the set of coordinates of the object element in the moving image and the relative size and the relative area with respect to the whole, the execution content of the candidate process may be adjusted according to the feature information extracted for the object element, such as zooming in (performing a digital zoom process) on the object element to a size larger than a predetermined size.

Also, with the present embodiment, the execution content of a candidate content process can be adjusted according to the feature information and executed. For example, it is possible to perform control so as to zoom in on a person whose relative area is a specified value or less among a plurality of people included in a moving image, or automatically increase the output volume of audio whose relative volume is a specified value or less among the audio included in a moving image. That is, the content of the candidate content process can be adjusted according to the feature information and executed.

Figure 20D:
FIG. 20D is a diagram showing an example of content obtained after execution of content processing according to Embodiment 1.
Figure 20E:
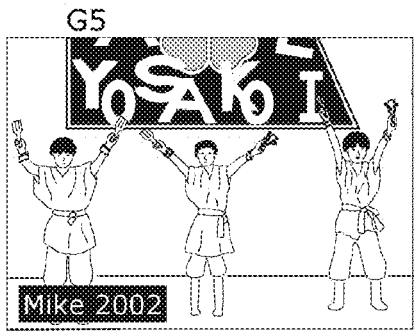
FIG. 20E is a diagram showing an example of content obtained after execution of content processing according to Embodiment 1.
Figure 20F:
FIG. 20F is a diagram showing an example of content obtained after execution of content processing according to Embodiment 1.
Figure 20G:
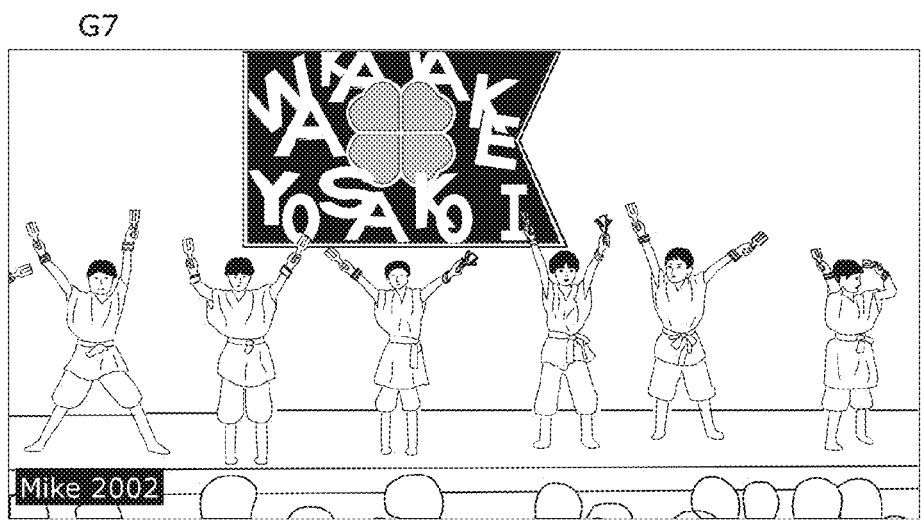
FIG. 20G is a diagram showing an example of content obtained after execution of content processing according to Embodiment 1.

Also, the present embodiment has been described taking an example in which the supplemental information of an object element is added by combining the person's name "Mike" with the updated date and time "2002" of the file to which reference was made and displaying them as shown in FIGS. 20A and 20D, but addition of the supplemental information is not limited thereto. For example, when the supplemental information is text, it may be embedded as meta information in a file that is output. When the supplemental information is an icon indicating an object element, it may be added to a portion of a moving image that is output, and then displayed so as to adjust the execution content of a candidate process.

Also, with the present embodiment, it is possible to supplement the context information according to the attribute information, adjust the execution content of a candidate content process and execute the candidate content process. Accordingly, for example, it is possible to perform control so as to set, among a plurality of people included in a moving image, a person registered as important in the facial dictionary as the main subject, zoom in (perform a digital zoom process) on each person determined as a close friend of the main subject, add information that supplements the object element, and output as a separate moving image file (display the name of the subject specified based on the facial similarity and the voice print in a superimposed manner, and record into a storage medium). That is, the content of a candidate content process can be adjusted according to the attribute information and executed without requiring a user operation or instruction with respect to each object element.

Also, the present embodiment has been described taking an example in which a candidate process with respect to context group is to "clip a context group area and output the context group area in a file", but the candidate process is not limited thereto. It is also possible to perform an effect process for providing a visual effect when the target content is viewed, such as a zoom-in process from the full view display of the target content to a context group, or addition of a decorative frame around the context group area.

Also, with the present embodiment, a candidate content process that needs to be executed can be determined according to the context group information constituted by a plurality of object elements included in the content, and it is possible to perform control so as to perform, for example, a zoom-in process (digital zoom process) or an output process (recording into a storage medium) on the composition of a moving image constituted by a plurality of people or common objects. In this way, a plurality of object elements can be handled as a single context group, and therefore it is unnecessary to perform a content processing operation on each object element, and the content process on the context group can be executed at a time. This can reduce the possibility of a failure in image-capturing that appears to be caused by a novice such as stepwise zoom-in or zoom-out processing.

Also, in the present embodiment, the output control unit 104 requests the output unit 111 to provide a user notification using a buzzer or a light-emitting device in response to the processing status or the result of processing from the content processing unit 110, but the output provided by the output unit 111 is not limited thereto. For example, in the case where the digital camera has, in its side surface, a light-emitting unit or audio speaker for informing the user of a content process currently executed within the camera, a configuration is possible in which an operation such as a zoom-in process (digital zoom process) or an output process (recording into a storage medium) performed on a target object element, or completion of image-capturing is notified to the user by using illumination of the light-emitting unit, a buzzer or a voice guide from the speaker. That is, the output control unit 104 may output, to the outside of the content processing apparatus, candidate process execution information indicating whether a candidate process has been executed or not.

With the present embodiment, it is possible to notify the user of a content process that is currently executed within the content processing apparatus without requiring the operating user to perform an operation or provide an instruction.

As described above, with the present embodiment, it is possible to present, to the user, an operation or a composition of content to be captured, viewed or edited by analyzing the relationship between a plurality of subjects (objects).

As described above, with the present embodiment, it is possible to implement a content processing apparatus, a content processing method, and a program that reduce the intellectual and operational burdens of the user required to perform content processing at the time of image-capturing, viewing or editing of the content.

[Embodiment 2]

Embodiment 2 will be described next. In the present embodiment, a case will be described in which the content processing apparatus displays a currently executed process so that the user can know the process currently executed in the content processing apparatus.

Figure 21:
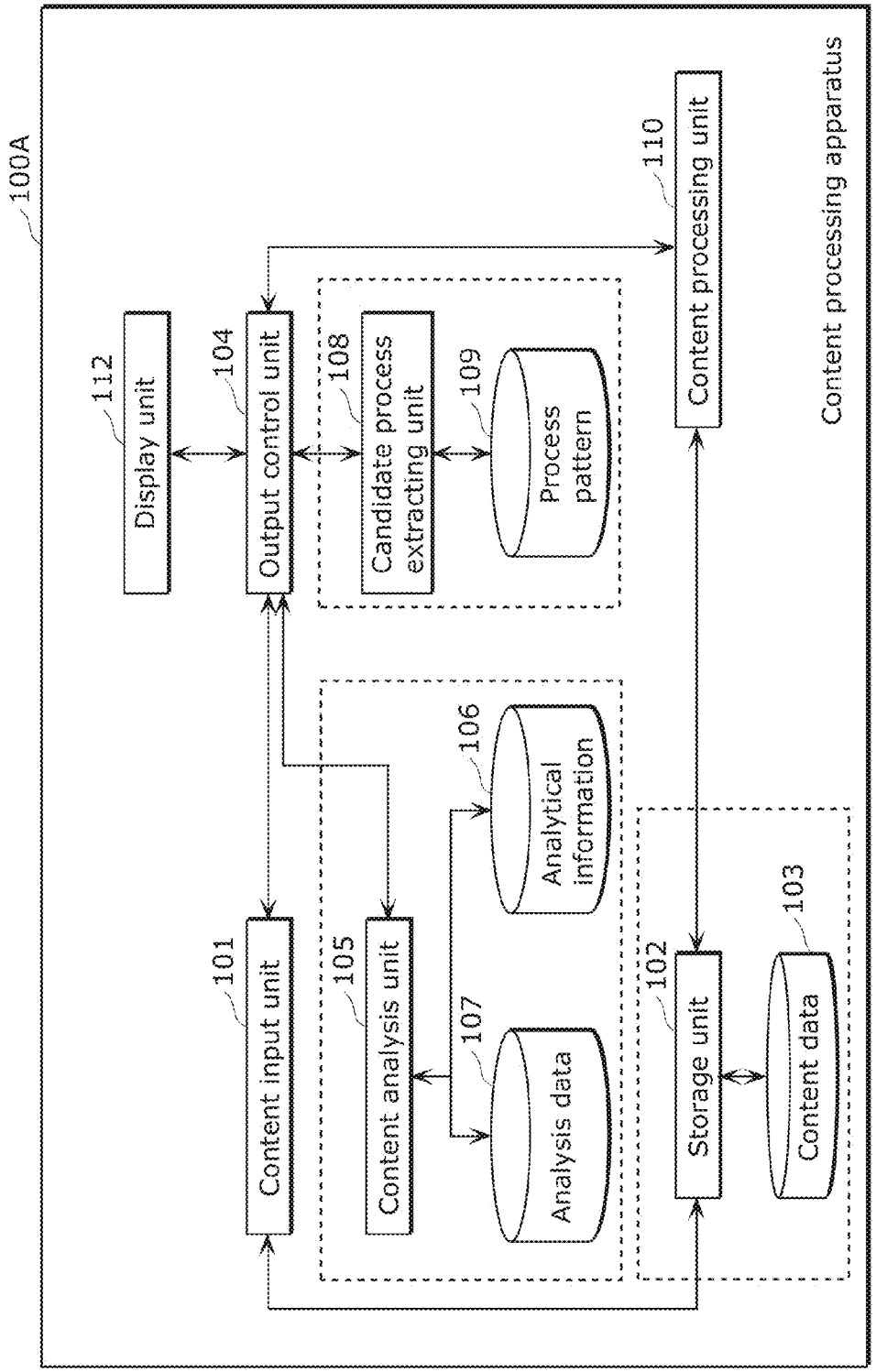
FIG. 21 is a block diagram showing a configuration of a content processing apparatus according to Embodiment 2.

FIG. 21 is a block diagram showing a configuration of a content processing apparatus 100A according to Embodiment 2. In FIG. 21, the same reference numerals are given to structural elements that are the same as those of FIG. 1, and descriptions thereof are omitted.

The content processing apparatus 100A shown in FIG. 21 includes a display unit 112 in place of the output unit 111 of the content processing apparatus 100 shown in FIG. 1.

The display unit 112 includes a display screen such as a liquid crystal panel, and displays content and information regarding a process performed on the content. For example, the display unit 112 displays a process currently executed in the content processing apparatus.

The content processing apparatus 100A of the present embodiment can be a digital still camera, a digital video camera, a personal computer or the like in which a display unit 112 is included, a storage medium capable of storing moving image data can be inserted or is included, and image-capturing, viewing or editing of a plurality of moving image data is possible.

Figure 22:
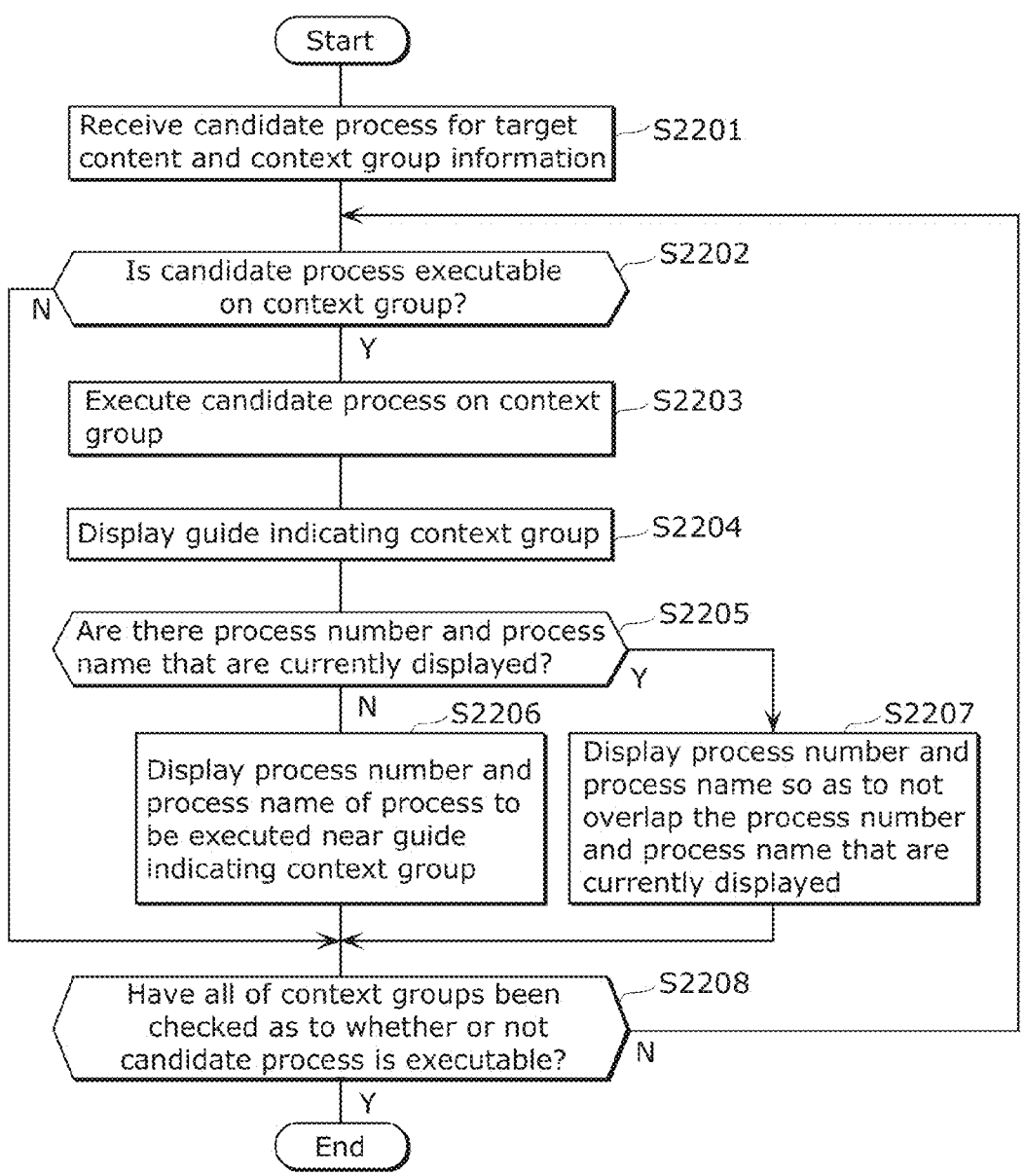
FIG. 22 is a flowchart illustrating a flow of candidate process execution processing according to Embodiment 2.

FIG. 22 is a flowchart illustrating a flow of candidate process execution processing according to Embodiment 2.

In the flowchart of FIG. 22, steps S2201 to S2203 and step S2208 of FIG. 22 are similar to steps S1801 to S1803 and step S1804 of the flowchart shown in FIG. 18, and thus descriptions thereof are omitted.

If the determination is affirmative (Yes) in step S2202, the output control unit 104 executes a candidate process on the context group (S2203).

Next, the output control unit 104 provides, to the display unit 112, an instruction to display a guide indicating the target area where the process is being executed on the context group by using a solid line, dotted line or the like (S2204).

Next, the output control unit 104 checks whether there is, other than the context group, a candidate process (including its process number and process name) that is currently displayed (S2205).

If it is determined in S2205 that there is no candidate process (No in S2205), the output control unit 104 causes the display unit 112 to display the process number and process name of the candidate process to be executed in the neighborhood of the guide indicating the target area of the context group (S2206). If, on the other hand, it is determined in S2205 that there is a candidate process (Yes in S2205), the output control unit 104 causes the display unit 112 to adjust the display positions of the process number and the process name to be displayed with respect to the context group on the screen so as to not overlap with the process number and the process name that are currently displayed (S2207).

Next, the output control unit 104 checks whether all of the context groups have been checked as to whether or not a candidate process is executable (S2208).

Figure 23:
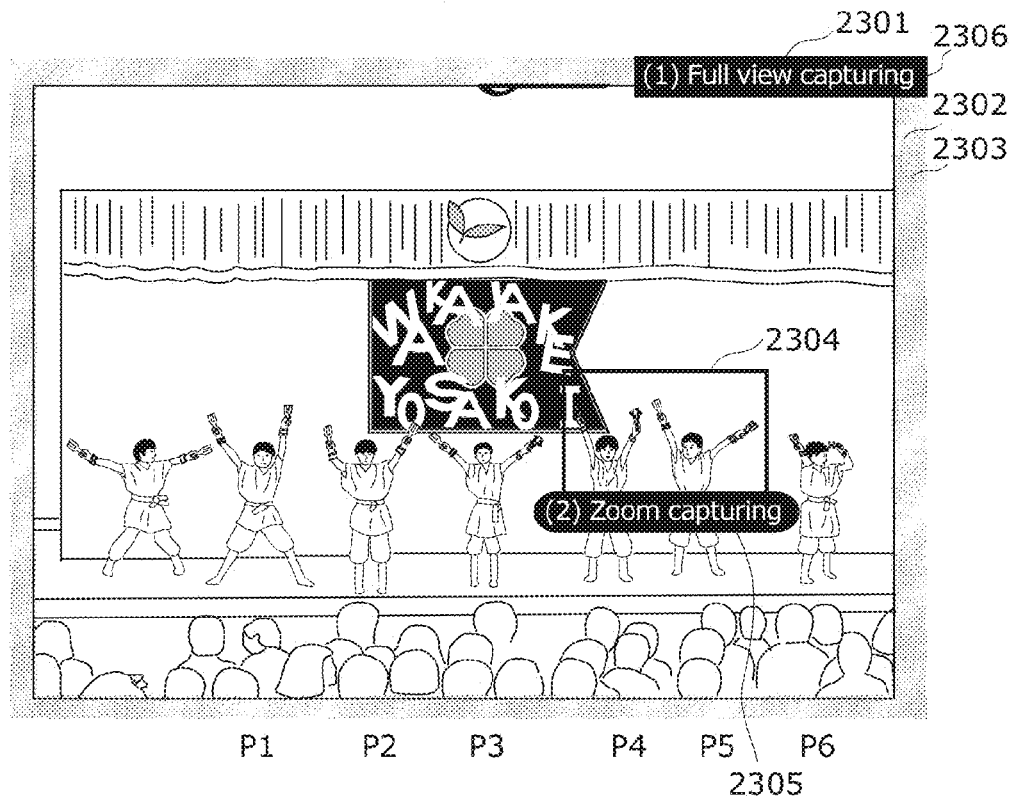
FIG. 23 is a diagram showing an example of a screen displayed by a display unit according to Embodiment 2.

FIG. 23 is a diagram showing an example of a screen displayed by the display unit 112 of Embodiment 2.

In FIG. 23, a full screen display area 2301 shows the entire screen displayed by the display unit 112. A moving image display area 2302 shows an area where a moving image that is input content serving as a target to be processed and actually viewed by the user is displayed. A margin area 2303 shows a margin of the moving image display area in the full screen display area, and is used to display related information.

Also, a guide 2304 shown in the diagram is an example of a guide that is displayed, which was described in relation to step S2204 of FIG. 22. In the example shown in FIG. 23, a guide that is based on the set of extraction coordinates and the extraction area of the context group "G4" containing P4 and P5 out of the people analysis data P1 to P6 shown in the lower part of the diagram is displayed (see the candidate processes of FIG. 17). A processing result indication 2305 indicates a process number "(2)" and a process name "zoom capturing" indicating the currently executed process, which are displayed as a result of execution of steps S2206 and S2207. A processing result indication 2306 indicates a process of capturing the entire input content that has been executed earlier, and in the example shown in FIG. 23, a process number "(1)" and a process name "Full view capturing" are displayed.

As described above, in the content processing apparatus 100A, on the display unit 112 viewed by the user, the currently executed process is displayed by adding a guide, a process name and the like that indicate the processing content of the process.

Figure 24:
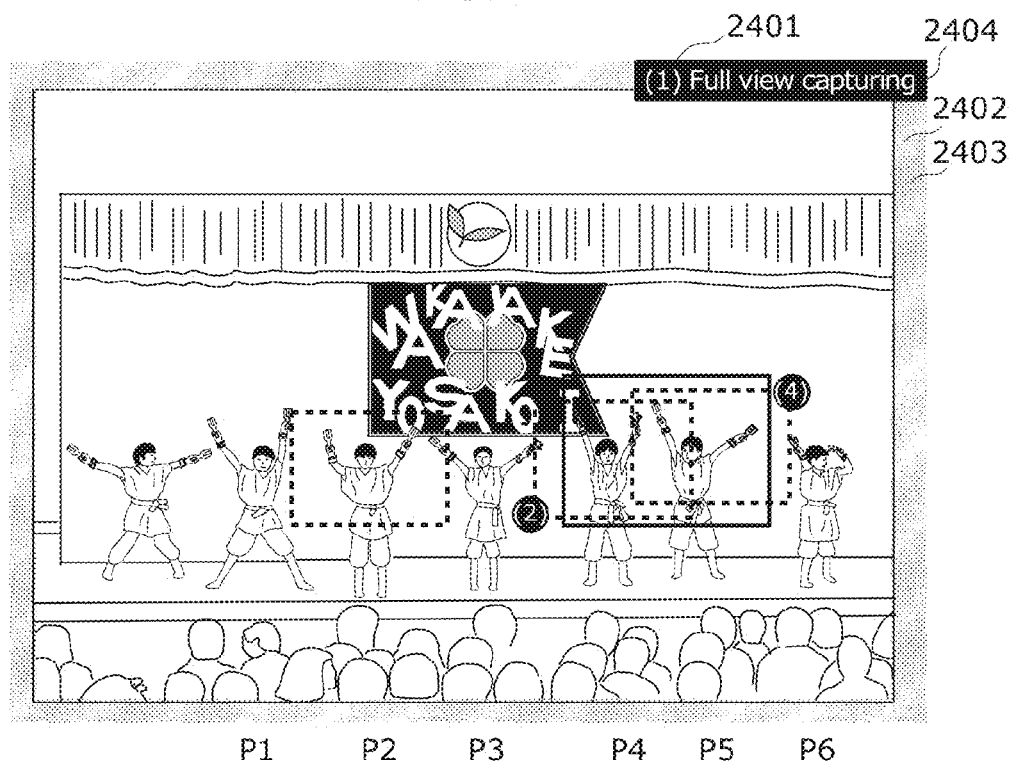
FIG. 24 is a diagram showing an example of another screen displayed by the display unit according to Embodiment 2.

FIG. 24 is a diagram showing an example of another screen displayed by the display unit 112 of Embodiment 2.

Here, differences from FIG. 23 will be mainly described. In a moving image display area 2402, process numbers (2) to (5) without process names are displayed. In FIG. 24, a guide for the process number (5) is indicated by a solid line, and guides for the process numbers (2) to (4) are indicated by a dotted line. Here, for example, the solid line is defined to indicate the currently executed process, and the dotted line is defined to indicate a standby candidate process. By doing so, the user can know the currently executed process by simply viewing the content of the display unit 112.

In the above example, whether the process is currently executed or standby is indicated by using a solid line and a dotted line, but the method of displaying the guides is not limited thereto. The solid line may be defined to indicate a high image quality mode, and the dotted line may be defined to indicate a low image quality mode. Alternatively, the solid line may be defined to indicate a context group including a plurality of people, and the dotted line may be defined to indicate a context group that is a main subject or secondary subject. Also, the guides may be indicated by any means other than solid lines and dotted lines such as using wavy lines, using different colors, changing the thicknesses of the lines, adding decoration, or assigning different uses. Furthermore, the process name is not limited to a text representation, and it may be indicated by using an icon or the like through which the user can quickly recognize the content of the process (an example of a screen using icons will be described later).

With the present embodiment, before or after execution of the extracted candidate process, candidate process execution information indicating whether or not the candidate process is executed is displayed on the display unit 112 of the content processing apparatus 100A. Accordingly, for example, a content process that is currently executed within the digital camera can be visualized on the main screen or sub-screen of the digital camera for the user by using a character string or icon. That is, it is possible to more reliably notify the user of the content process currently executed within the content processing apparatus by using the character string or icon, without requiring the operating user to perform an operation or provide an instruction.

[Embodiment 3]

Embodiment 3 will be described next. In the present embodiment, a case will be described in which, in addition to extracted people, common objects are also defined as context groups. Furthermore, in the present embodiment, a description of a content processing apparatus 100B is also given that can receive an operation or instruction regarding a content process requested by the user while the user is viewing candidate content processes.

Figure 25:
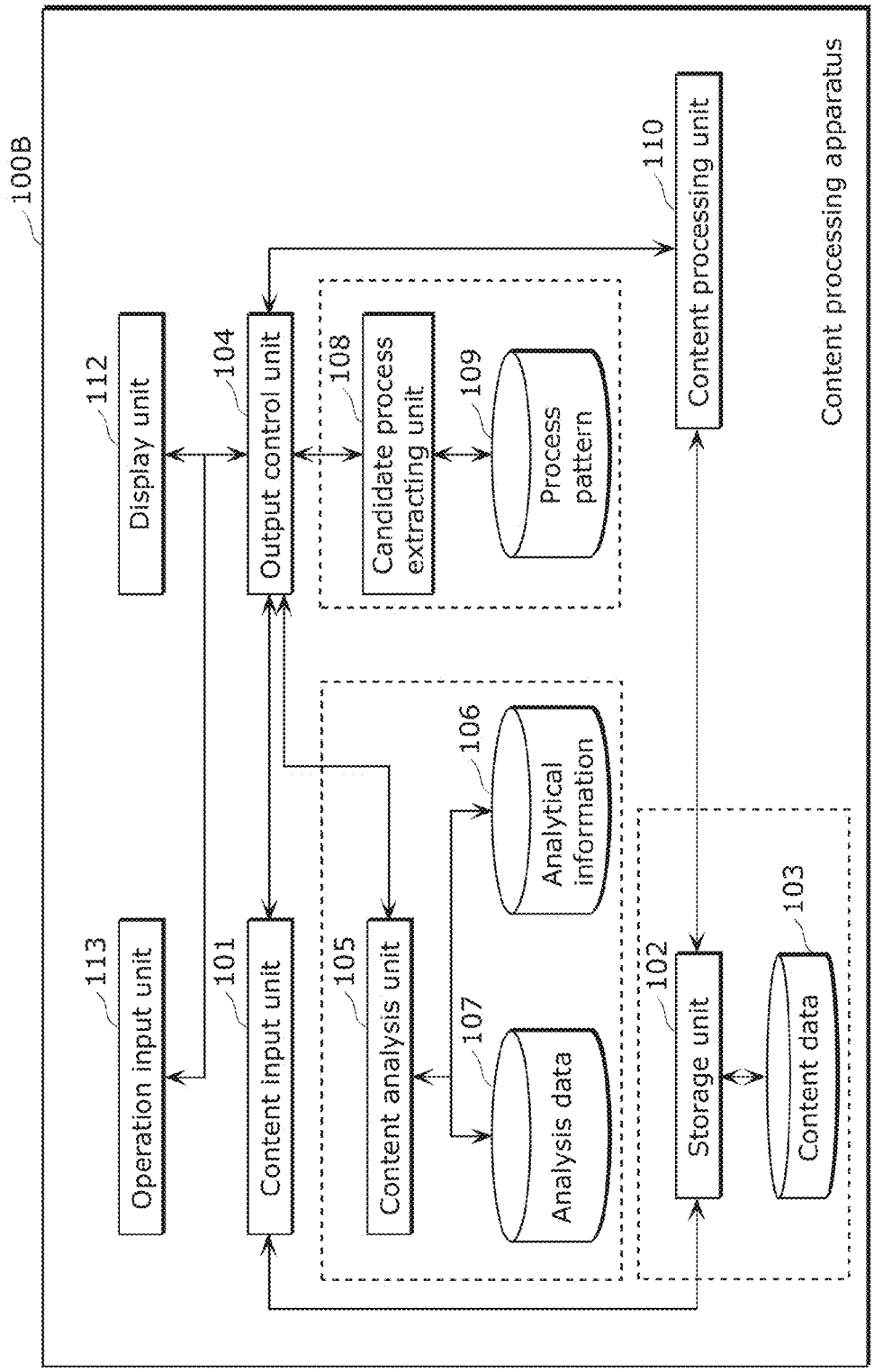
FIG. 25 is a block diagram showing a configuration of a content processing apparatus according to Embodiment 3.

FIG. 25 is a block diagram showing a configuration of a content processing apparatus 100B according to Embodiment 3. In FIG. 25, the same reference numerals are given to structural elements that are the same as those of FIGS. 1 and 21, and descriptions thereof are omitted.

The content processing apparatus 100B shown in FIG. 25 includes an operation input unit 113 in addition to the structural elements of the content processing apparatus 100A shown in FIG. 21.

The operation input unit 113 receives an operation from the user. The operation input unit 113 may be, for example, an input device such as a touch panel, and functions to receive an operation from the user.

The content processing apparatus 100B includes a unit configured to control the screen by using an input device such as a touch panel screen or a mouse. Also, the content processing apparatus 100B can be a touch-panel digital still camera or digital video camera in which a storage medium capable of storing moving image data can be inserted or is included, and image-capturing, viewing or editing of a plurality of moving image data is possible, or a personal computer operable with a mouse or touch panel, as with the content processing apparatus 100A.

Figure 26:
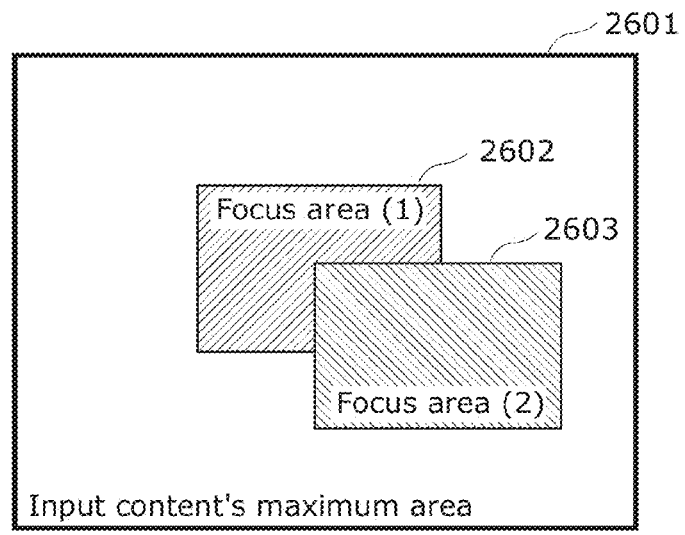
FIG. 26 is a diagram showing an example of an arrangement of focus areas in an input content's maximum area according to Embodiment 3.

FIG. 26 is a diagram showing an example of an arrangement of focus areas in an input content's maximum area according to Embodiment 3.

The input content (target content) to be processed by the content processing apparatus 100B is a moving image input by the content input unit 101, and there is a maximum area called the angle of view or resolution. FIG. 26 shows an input content's maximum area 2601 indicating the maximum area of input content. A portion of the input content's maximum area 2601 that is zoomed in through digital processing is defined as a focus area 2602. In the example shown in FIG. 26, there are two focus areas: a focus area (1) (focus area 2602 in the diagram) and a focus area (2) (focus area 2603 in the diagram). The focus area 2602 indicates a focus area (focus area (1)) in the case where digital zoom is performed on the center with respect to the set of center coordinates of the input content's maximum area 2601, and the focus area 2603 indicates a focus area (focus area (2)) in the case where digital zoom is performed on a selected portion in the area of the input content's maximum area 2601. For example, in the case of a movie by simultaneous image-capturing using a wide angle camera and an ordinary camera, the area captured by the wide angle camera can be set as a maximum area, and the area captured by the ordinary camera can be set as a focus area. Also, when a captured photo or moving image is viewed or edited, the area of the entire captured content can be set as a maximum area, and the area displayed so as to be viewed or edited can be set as a focus area. Hereinafter, an example will be described in which a digital camera digitally zooms in on the focus area 2603 while continuing the image capturing of the input content's maximum area 2601, with reference to FIGS. 27 to 30.

Figure 27:
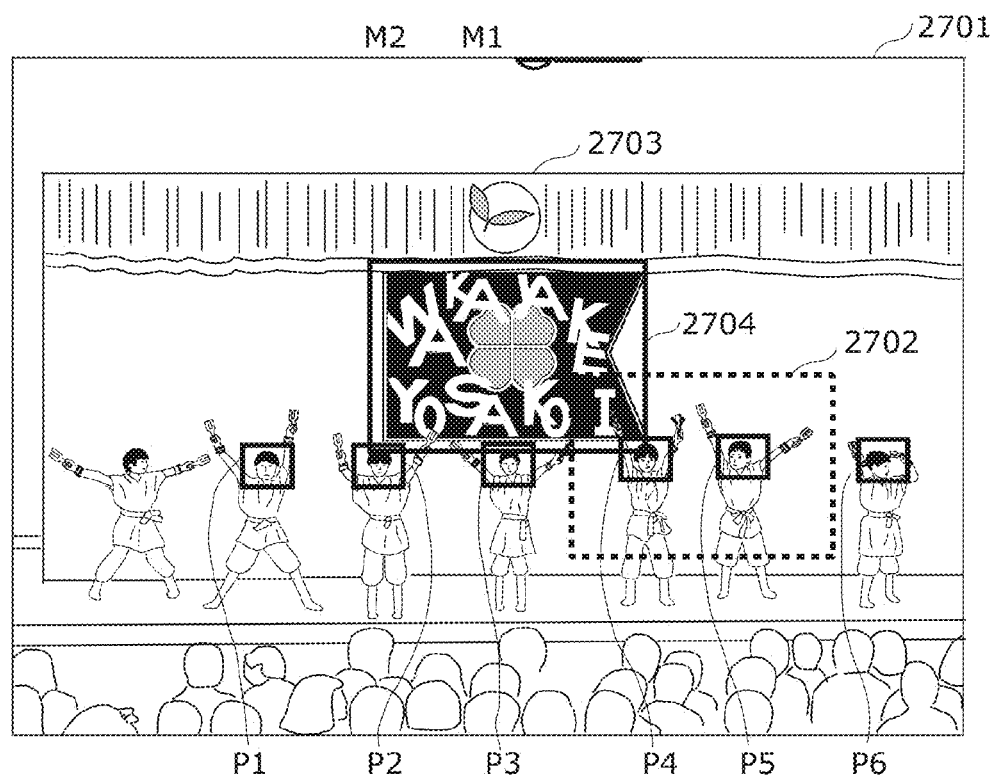
FIG. 27 is a diagram showing an example of a moving image of input content according to Embodiment 3.
Figure 31:
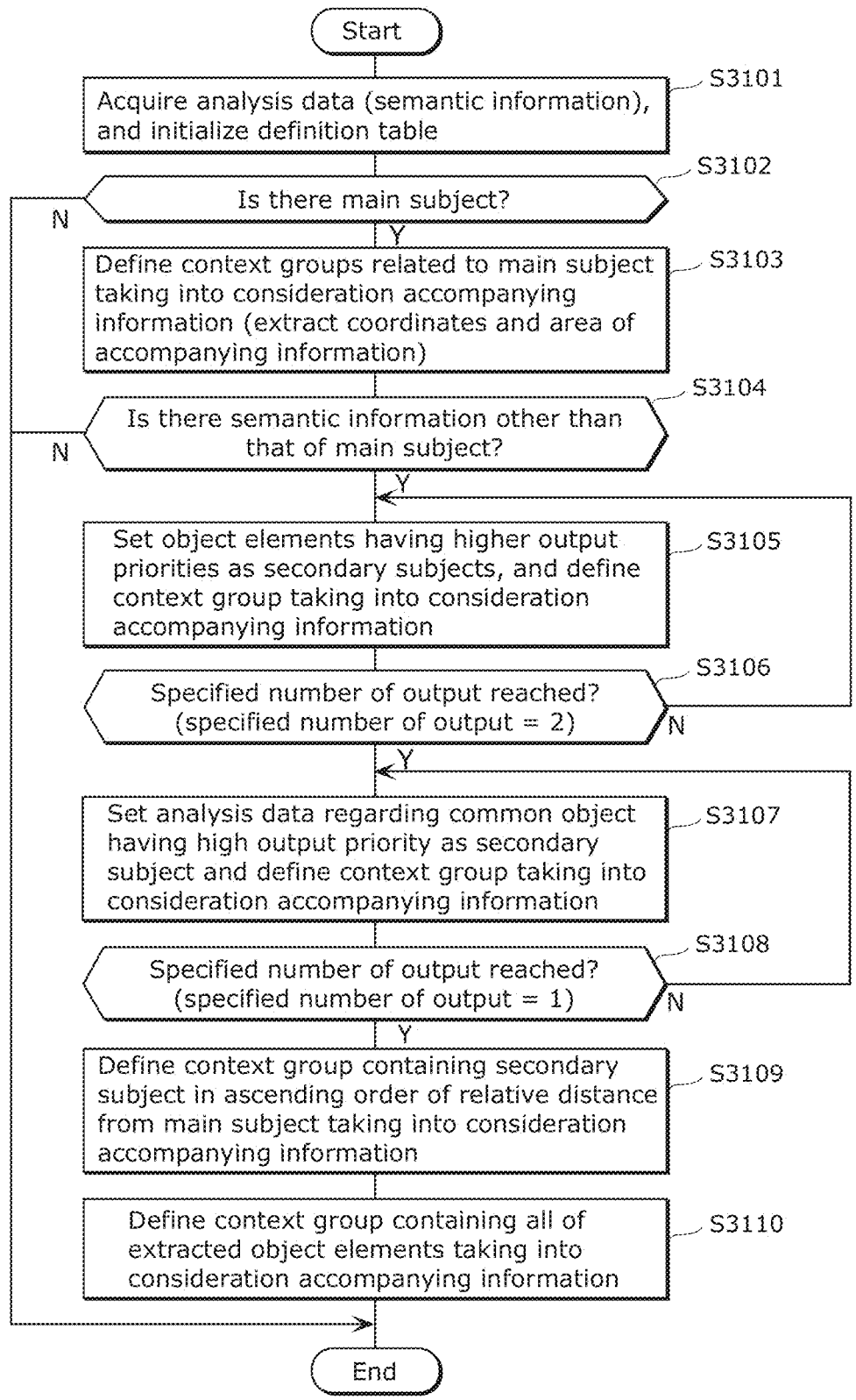
FIG. 31 is a flowchart illustrating a flow of context group defining processing according to Embodiment 3.

FIG. 27 is a diagram showing an example of a moving image of input content according to Embodiment 3. FIG. 28 is a diagram showing an example of analysis data (common object) according to Embodiment 3. FIG. 29 is a diagram showing an example of an attention information priority point-addition table according to Embodiment 3, FIG. 30 is a diagram showing an example of a relative distance priority point-addition table according to Embodiment 3, FIG. 31 is a flowchart illustrating a flow of context group defining processing according to Embodiment 3.

As shown in FIG. 27, an input content's maximum area 2701 input by the content input unit 101 includes a plurality of subjects (people). In the input content's maximum area 2701, a focus area 2702 that is actually viewed by the user is indicated by a dotted line.

In the present embodiment, the content analysis unit 105 analyzes subjects (people) P1 to P6 as described in Embodiment 1, and provides them to the output control unit 104 as analysis data. In addition, the content analysis unit 105 also analyzes a common object 2703 and a common object 2704 shown in FIG. 27, and provides their outlines to the output control unit 104 as analysis data shown in FIG. 28. Hereinafter, only differences from the processing of analyzing people as object elements will be described (or in other words, only processing of analyzing a common object will be described).

As shown in FIG. 28, the content analysis unit 105 extracts two object elements included in the input content as common object data, and assigns IDs "M1" and "M2" to the object elements. Next, as subject information of each object element, a set of extraction coordinates and an extraction area are added to the analysis data. Next, as attribute information, determination is made as to whether or not there is a similar object element in the registered dictionary serving as the analytical information, and if it is determined that there is a similar object element, its name and similarity are determined, and determination is made as to whether the object element is the main subject, and the obtained results are added to the analysis data.

Furthermore, the content analysis unit 105 adds a classification to which a common object belongs and its analyzable information (text data, general term of related object, etc.) as attention information. In this example, it is assumed that the classification of the ID "M1" indicated by 2703 in FIG. 27 is "MARK". The ID "M2" indicated by 2704 in FIG. 27 is subjected to text analysis, and "TEXT: YOSAKOI" indicating that YOSAKOI has been extracted as text is added. Furthermore, the content analysis unit 105 adds information indicating that the appearance order is, from the left, ID "M2", followed by the ID "M1" to the analysis data as the positional relationship under the item "State information (dynamic)". Also, the content analysis unit 105 adds, to the analysis data, a cross for the ID "M1" because it is outside the focus area, and a triangle for the ID "M2" because it partially overlaps the focus area, as the focus area under the item "State information (dynamic)". The content analysis unit 105 also adds, to the analysis data, "3.2" for the ID "M1" and "0.8" for the ID "M2" under the item "State information (dynamic)" as the relative distance, or in other words, the relative distance from the main subject "P4" analyzed earlier. In the case where there is an extracted object element within the focus area, a circle can be added.

The output control unit 104 refers to the analysis data extracted by the content analysis unit 105 and adds output priority to the analysis data. In the present embodiment, in order to determine the output priority of a common object, an example will be described in which the attention information priority point-addition table shown in FIG. 29 and the relative distance priority point-addition table shown in FIG. 30 are used.

The output control unit 104 calculates output priority of the common objects from the attention information under the item "Attribute information" and the relative distance from the main subject under the item "State information" recorded in FIG. 28 by a point addition method. In this example, the attribute information of the ID "M1" is "MARK", and thus 0.5 points are added by referring to the priority point-addition table. Also, the relative distance from the main subject is "3.2", and thus 0.5 points are added by referring to the priority point-addition table. As a result, a total of 1.0 point is obtained. Meanwhile, the ID "M2" is "TEXT", and thus 1.0 point is added, and the relative distance is "0.8", and thus 2.0 points are added. As a result, a total of 3.0 points is obtained. Next, context group defining processing using such points will be described.

Figure 33:
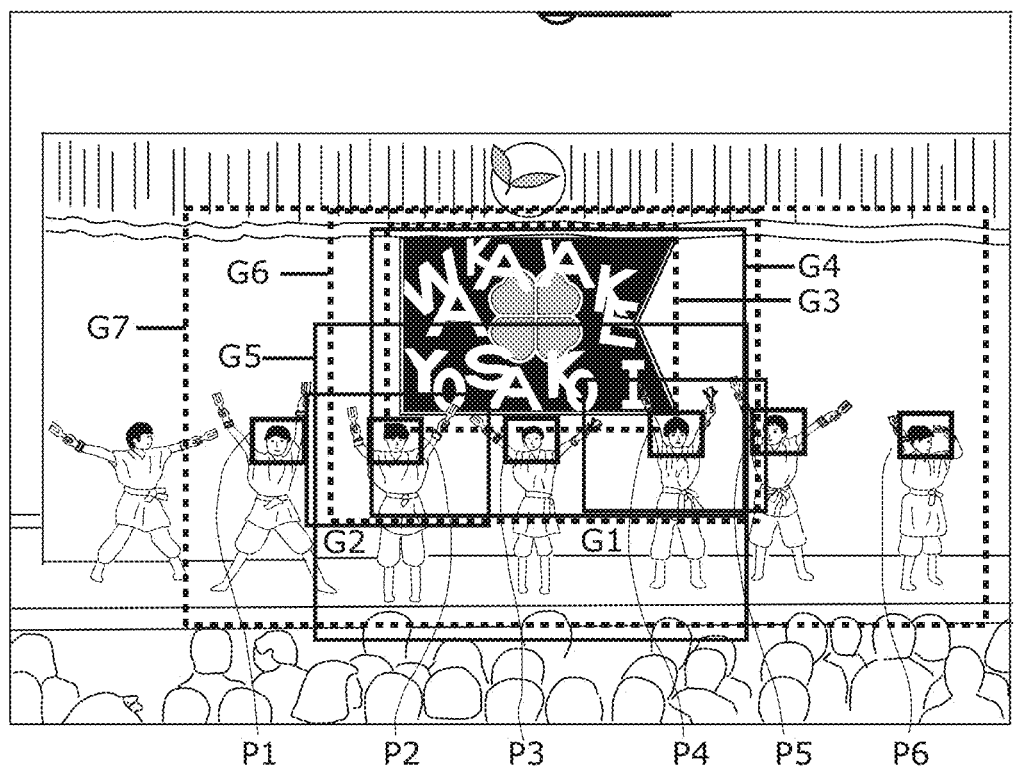
FIG. 33 is a diagram showing an example in which definitions of context group information are overlaid on a moving image serving as input content to be processed according to Embodiment 3.

FIG. 31 is a flowchart illustrating a flow of the context group defining processing according to Embodiment 3. FIG. 32 is a diagram showing an example of a context group information definition table Embodiment 3, FIG. 33 is a diagram showing an example in which context groups are overlaid on a moving image serving as input content to be processed according to Embodiment 3.

In the flowchart of processing performed by the output control unit 104 shown in FIG. 31, steps S3101 to S3106 and steps S3109 to S3110 of FIG. 31 are similar to steps S1201 to S1206 and steps S1207 to S1208 of the flowchart shown in FIG. 12, and thus descriptions thereof are omitted.

In steps S3101 to S3106, the output control unit 104 sets object elements regarding people as context information, and defines context groups serving as secondary subjects for up to a specified number of output, from the context groups specially related to the main subject and the output priority of people (Yes in S3106).

Furthermore, the output control unit 104 sets object elements regarding common objects as context information, and defines context groups serving as secondary subjects from the output priority based on the analysis data of the common objects (S3107). At this time, with respect to common objects, as with people, it is desirable to add accompanying information obtained as a result of analysis to the definition of the context groups. For example, in the case of the common object 2704 whose ID is "M2" shown in FIG. 27, a portion surrounding the analyzed text is set as accompanying information and is defined as a part of the common object.

Then, the output control unit 104 defines context groups regarding common objects for up to a specified number of output (Yes in S3108). To be specific, the analysis of common objects is generally highly dependent on the dictionary of the analytical information. In some cases, a very large number of common objects are analyzed, and thus the output control unit 104 defines context groups serving as secondary subjects based on the specified number of output regarding common objects (Yes in S3108). Note that the present embodiment is described taking an example in which among the context information regarding the extracted common objects, only one common object is used as a secondary subject.

Next, the output control unit 104 defines context groups including secondary subjects in ascending order of the relative distance from the main subject (S3109).

Next, the output control unit 104 defines context groups including all of the extracted object elements (S3110).

As a result of the above processing, a context group information definition table shown in FIG. 32 is formed.

Here, the context group "G3" shown in FIG. 32 is not a context group indicating people, but a context group having an ID "M2" indicating a common object. In Embodiment 1, the context group "G1" includes the main subject "P4", the context group "G2" includes "P2" having the next highest output priority, and the context group "G3" includes "P5" having the next highest output priority. In contrast, in the present embodiment, the specified number of output of context groups regarding people is set to "2". Accordingly, the context groups "G1" and "G2" respectively include "P4" and "P2" indicating people, and the context group "G3" includes "M2" indicating a common object because the specified number of output of context groups regarding common objects is set to "1". Among the extracted common objects "M1" and "M2", "M2" having a higher total number of points calculated based on the point-addition table described above is used.

FIG. 33 shows, in the input content's maximum area of the input content (target content), areas corresponding to the context groups that are based on the set of coordinates and the area of each context group shown in FIG. 32. Here, as the accompanying information of the context group "G3" shown in FIG. 32, "TEXT: YOSAKOI" is recorded. The context group "G3" corresponds to a dotted frame indicated by "G3" in FIG. 33, and is a context group including event signage that is a common object, rather than people. That is, for the defined area of the context group "G3", in addition to the extracted text, context information and a context group area are defined as a part of the common object. The processing related to defining of a neighboring part of a common object can be implemented by a combination of general techniques such as the continuity of color or shape of the neighboring part of the recognized common object and the appearance pattern definition defined in the analytical information.

Furthermore, the context group "G4" shown in FIG. 32 consists of a combination of the context information "P4" that is the main subject and the semantic information "M2" having the shortest relative distance from the main subject, and corresponds to a solid frame indicated by "G4" in FIG. 33. In this way, in the present embodiment, in addition to the extracted people, common objects are also defined as context groups. Note that, as described above, the defined context groups are defined in a table (definition table) as the context group information.

Next, the candidate process extracting processing performed by the candidate process extracting unit 108 in the present embodiment will be described.

Figure 35:
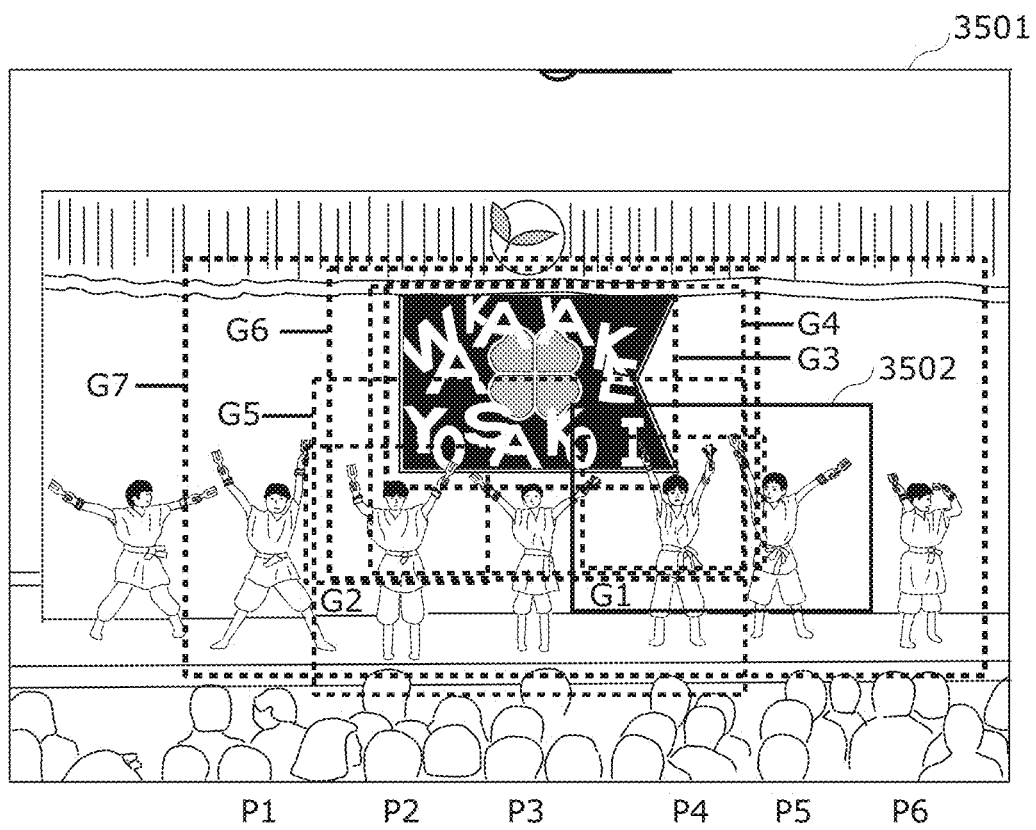
FIG. 35 is a diagram showing examples of positional relationships between a focus area and defined areas of respective context groups according to Embodiment 3.

FIG. 34 is a diagram showing an example of a candidate process pattern table according to Embodiment 3. FIG. 35 is a diagram showing examples of positional relationships between a focus area and the defined areas of respective context groups according to Embodiment 3. FIG. 36 is a diagram showing an example in which candidate processes are set with respect to context group information according to Embodiment 3.

The candidate process extracting unit 108 holds a candidate process pattern table as shown in FIG. 34 as the process pattern 109. In the candidate process pattern table shown in FIG. 34, process patterns are managed with candidate process IDs such as E1 and E2, and for each candidate process ID, a candidate process that can be processed in the content processing unit 110 is written. Furthermore, for each candidate process, a requirement needed to execute the process is written.

In the present embodiment, a case will be described where the requirement includes the relationship between the area in which the context group is defined (context group area) and the focus area. Here, the candidate processes E1 and E2 indicate candidate processes in the case where the context group area is included within the focus area, and require that the coverage area of the context group area in the focus area is less than 80%. This corresponds to, for example, a situation in which when the context group is included within the focus area, a part of the currently displayed moving image is digitally zoomed (zoomed in) so as to fit the focus area through the candidate process E1. Also, the candidate process E2 indicates a candidate process in which a part of the moving image currently displayed as the focus area is clipped and displayed as a separate file.

The output control unit 104 passes the definition table in which the context group information is defined to the candidate process extracting unit 108.

Here, it is assumed that, as shown in FIG. 35, for example, in input content 3501 to be processed, a focus area 3502 is displayed so as to be visible to the user. In this case, the candidate process extracting unit 108 determines that the candidate processes E1 and E2 are executable on the context group "G1" that fits within the focus area, and also determines that the candidate processes E5 and E6 are executable on the context group "G2" that does not fit within the focus area. The other context groups "G3" to "G7" partially overlap the focus area, and thus the candidate process extracting unit 108 determines that the candidate processes E3 and E4 are executable. The flow of the candidate process extracting processing performed by the candidate process extracting unit 108 has already been described with reference to FIG. 16, and thus a description thereof is omitted. As a result, as shown in FIG. 36, in the definition table (dynamic), for each of the context groups (each group) that are groups indicating object elements grouped based on the context group information, candidate processes that meet the requirements written in the candidate process table are recorded.

Candidate process execution processing performed by the output control unit 104 will be described next.

Figure 37:
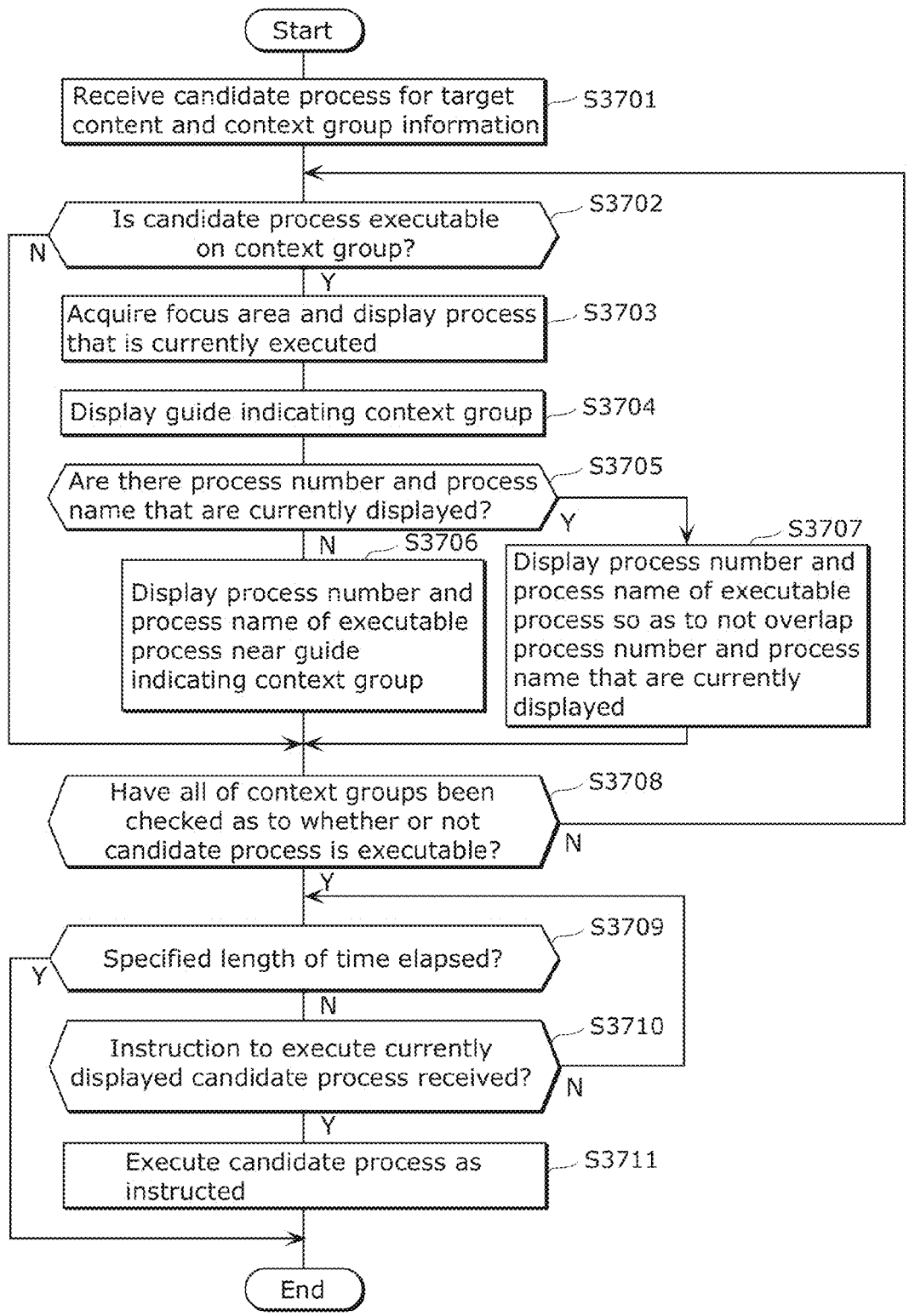
FIG. 37 is a flowchart illustrating a flow of candidate process execution processing according to Embodiment 3.
Figure 38:
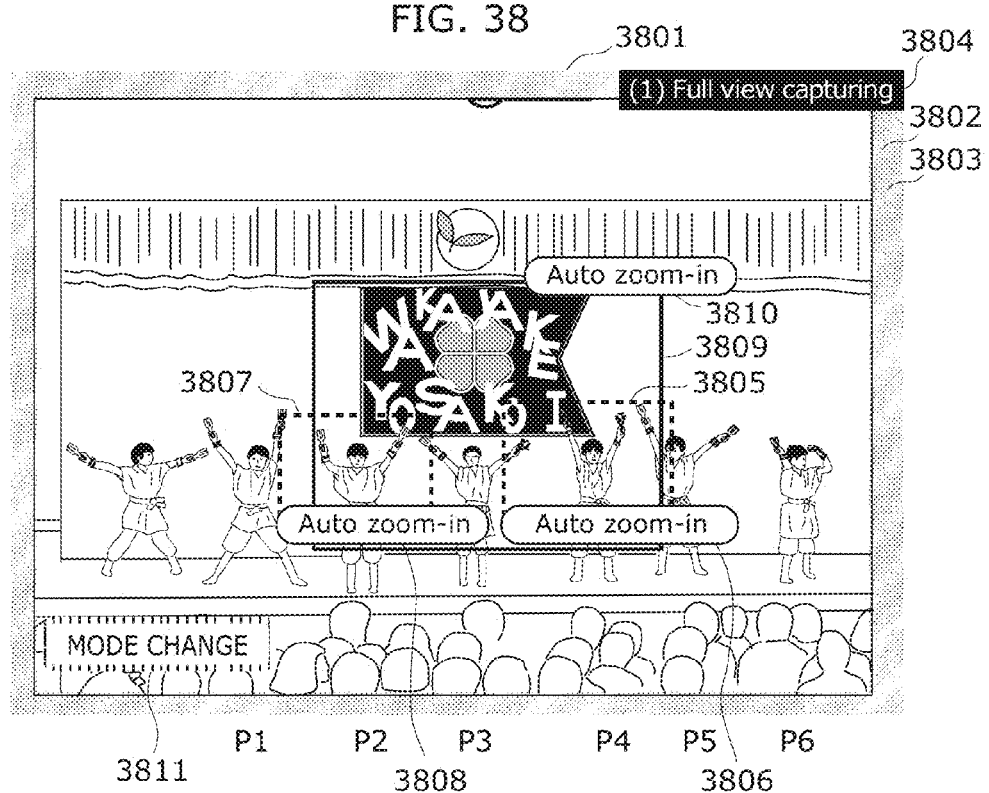
FIG. 38 is a diagram showing an example of a candidate content process display screen according to Embodiment 3.
Figure 39:
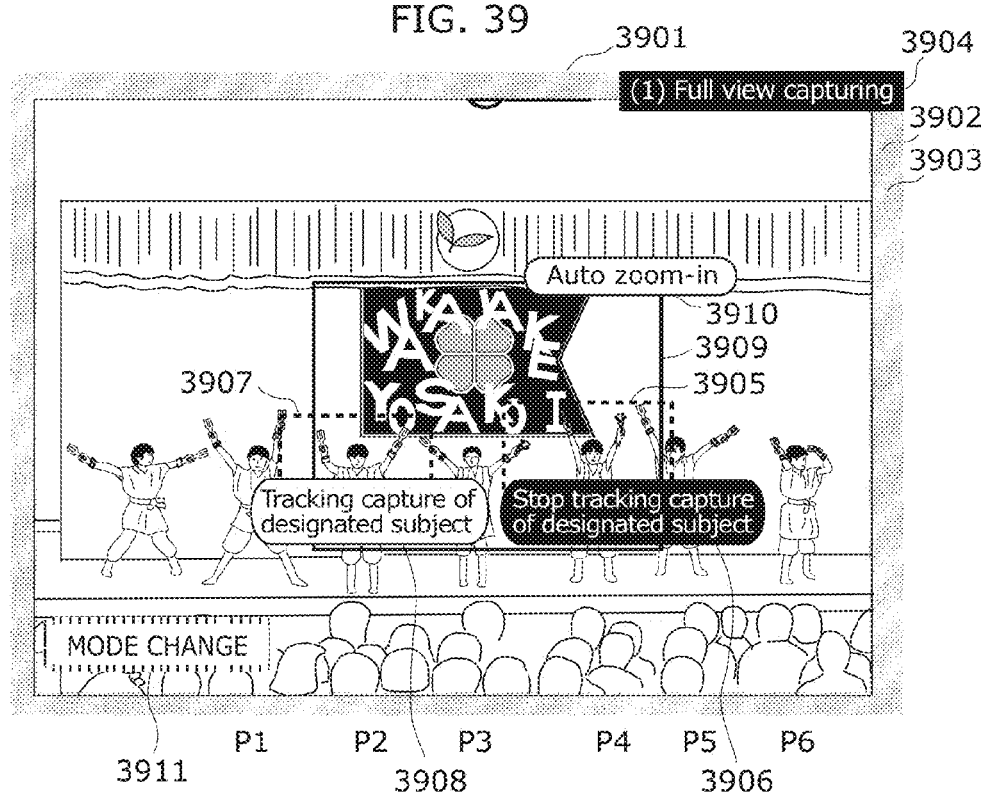
FIG. 39 is a diagram showing another example of the candidate content process display screen according to Embodiment 3, which is an example of a screen on which an operation to stop execution of content processing can be received.

FIG. 37 is a flowchart illustrating a flow of candidate process execution processing according to Embodiment 3. FIG. 38 is a diagram showing an example of a candidate content process display screen according to Embodiment 3, FIG. 39 is a diagram showing another example of the candidate content process display screen according to Embodiment 3, which is an example of a screen on which an operation to stop execution of content processing can be received.

In the flowchart of the candidate process execution processing performed by the output control unit 104 shown in FIG. 37, steps S3701 to S3702 and steps S3704 to S3705 are similar to the corresponding steps in FIGS. 18 and 22, and thus descriptions thereof are omitted.

If the determination is affirmative (Yes) in S3702, the output control unit 104 acquires a display area of the focus area currently displayed by the display unit 112, and displays the currently executed process (S3703).

In the example shown in FIG. 38, in a full screen display area 3801 displayed by the display unit 112, a currently displayed focus area 3802 matches the maximum area of the input content to be processed. In order to simplify the following description, an example will be used in which the candidate processes E1 and E2 are selected in a state in which the input moving image is displayed at a maximum size. A margin area 3803 indicates a margin of the focus area 3802 in the full screen display area 3801. A character string indication 3804 in the upper right corner indicates the currently executed process, which is processing of recording the input content, with the use of a character string such as "(1) Full view capturing".

Next, the output control unit 104 displays a guide indicating a context group (S3704), and checks whether or not there are a process number and a process name that are currently displayed (S3705).

If it is determined in step S3705 that there are not a process number and a process name that are currently displayed (No in S3705), the output control unit 104 displays the process number and the process name of an executable process in the neighborhood of the guide indicating the context group (S3706). If, on the other hand, it is determined in step S3705 that there are a process number and a process name that are currently displayed (Yes in S3705), the output control unit 104 displays the process number and the process name of the executable process so as to not overlap the process number and the process name that are currently displayed (S3707).

In the example shown in FIG. 38, the output control unit 104 determines that there are not a process number and a process name that are currently displayed with respect to the context group "G1" (No in S3705), and causes the display unit 112 to display a defined area of P4 in the neighborhood of P4 by using a dotted line as a guide 3805. Also, the output control unit 104 causes the display unit 112 to display a process name "auto zoom-in" as a candidate process 3806 in the neighborhood of the guide of the context group "G1". With respect to the context group "G2", the output control unit 104 determines that there are a process number and a process name that are currently displayed (Yes in S3705), causes a guide 3807 of the context group "G2" to be displayed with the use of a dotted line, and adjusts the arrangement such that a candidate process 3808 does not overlap the currently displayed candidate process 3806. Similarly, the output control unit 104 causes the display unit 112 to display a guide 3809 of the context group "G4" including a common object with the use of a solid line, and adjusts the arrangement such that a candidate process 3810 does not overlap the currently displayed candidate processes.

Next, the output control unit 104 checks whether all of the context groups have been checked as to whether or not a candidate process is executable (S3708), and determines whether a specified length of time (for example, one second) has elapsed (S3709). If it is determined that a specified length of time has elapsed, the candidate process execution processing ends (Yes in S3709).

If it is determined in step S3709 that a specified length of time has not elapsed (No in S3709), the output control unit 104 determines whether or not an instruction to execute a candidate process that is currently displayed has been received from the operation input unit 113 (S3710). If it is determined that such an instruction has not been received (No in S3710), the output control unit 104 waits for an instruction to execute a candidate process within a specified length of time.

If it is determined in step S3710 that an instruction to execute a candidate process that is currently displayed has been received from the operation input unit 113 (Yes in S3710), the candidate process is executed as instructed (S3711). For example, when the user touches "auto zoom-in" that is the candidate process 3806 or the dotted line of the guide 3805 on the touch panel shown in FIG. 38, execution of the candidate process E1 assigned to the context group "G1" starts.

In FIG. 38, "MODE CHANGE" is shown as a menu 3811. That is, in the present embodiment, the menu 3811 has a function of switching the display mode of candidate processes displayed by the display unit 112 as a result of the menu 3811 being touched. FIG. 39 shows another display mode for displaying candidate processes, which is different from that shown in FIG. 38, that is, an example of the screen displayed on the display unit 112 as a result of the menu 3811 being touched, so as to present a plurality of candidate processes assigned to a single context group to the user.

FIG. 38 shows an example of a case (mode) in which when an instruction to execute the candidate process E1 is received for each context group, whereas FIG. 39 shows an example of a case (mode) in which an instruction to execute the candidate process E2 is received for each context group.

In FIG. 39, a candidate process 3908 linked to the context group "G2" and a candidate process 3910 linked to the context group "G4" are displayed by using a character string "Tracking capture of designated subject" which is the name of a candidate process, with a menu configuration of a white background. With respect to the context group "G1", a character string "Stop tracking capture of designated subject", which is the name of a candidate process, is displayed with a menu configuration of a black background. This indicates that the candidate process is currently executed on the context group "G1", and thus the instruction that can be received from the user is an instruction to stop the currently executed process.

In this way, in the example shown in FIG. 39, while the fact that the entire input content's maximum area that matches the focus area is being captured is indicated by a character string indication 3904, the process currently executed on the context group "G1" is indicated by using a menu configuration of a black background, whereby the current execution status of the currently executed process can be indicated and an operation or instruction to stop the currently executed process can be received.

Another aspect of the present embodiment will be described with reference to FIG. 40.

Figures 40, 41:
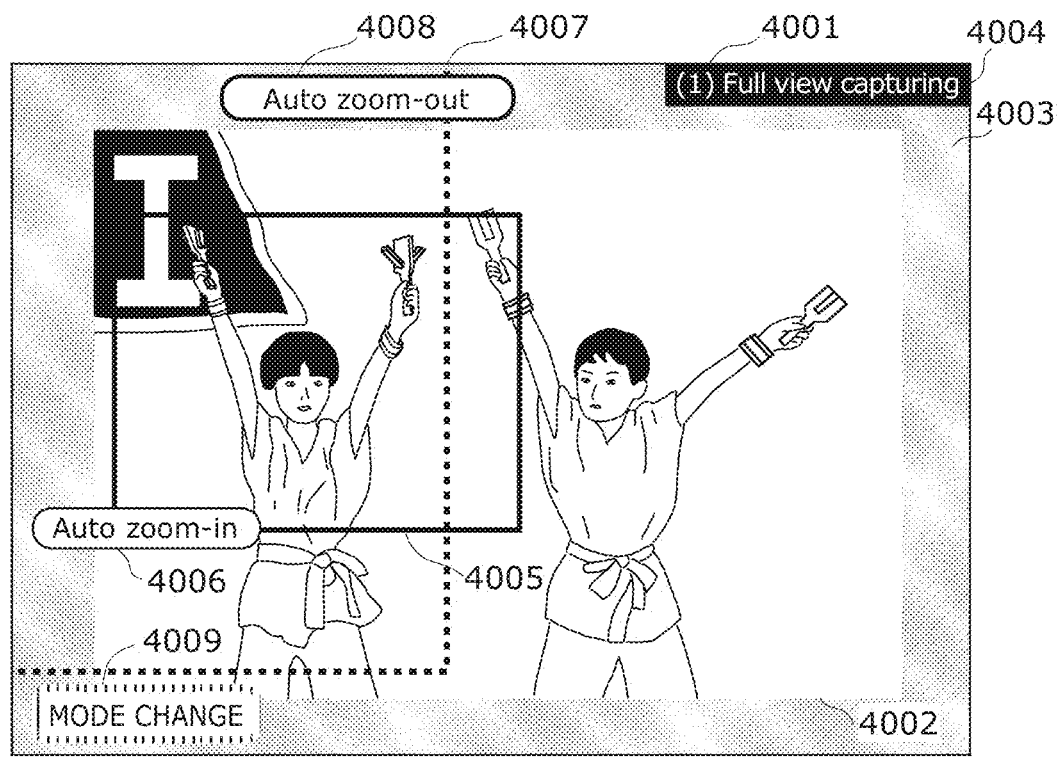
FIG. 40 is a diagram showing another example of the candidate content process display screen according to Embodiment 3.
FIG. 41 is a diagram showing an example of an icon reference table according to Variation 1 of Embodiment 3.

FIG. 40 is a diagram showing another example of a candidate content process display screen according to Embodiment 3.

In the example of FIG. 40, a case will be described where a focus area 4002 in a full screen display area 4001 displayed by the display unit 112 is displayed as a part of the input content's maximum area, and thus the user actually views a part of the moving image.

In FIG. 40, a guide 4005 and a candidate process name 4006 "auto zoom-in" are displayed with respect to the context group "G1" that fits within the focus area 4002, and a guide 4007 and a candidate process name 4008 "auto zoom-out" are displayed with respect to the context group "G3". Here, when the focus area is displayed as a part of the input content's maximum area, a situation can occur in which a context group partially overlaps the focus area such as the context group "G3". In this case, as shown in FIG. 40, the guide of the context group is partially displayed, and the name of a candidate process linked to the guide is displayed in the neighborhood of the guide such as a margin area 4003, thereby intuitively providing the user the candidate process.

In the present embodiment, in order to simplify the description, the context group "G3", the context group "G5" and the subsequent context groups are omitted, but it is also possible to perform control so as to display a guide and the name of a candidate process with respect to each of these context groups. In order to reduce the complexity of processing of displaying the screen, it is also possible to perform control so as to intermittently remove a specified number of candidate processes or to display them in a time series.

Note that the present embodiment has been described taking an example in which an instruction to execute a candidate process or a menu operation is given as a result of a touch operation on the screen assuming that the screen is a touch panel screen, but the operation system is not limited thereto. For example, a flexible operation method may be used such as a system that delivers the content of an operation by an operation using a mouse or the like, or an operation to draw a circle by using a stylus pen. Also, if the guides displayed on the screen become complex, the candidate processes linked to the respective guides may be numbered and displayed, or the name of a candidate process may be displayed in the neighborhood of the guide or on the guide. Furthermore, in order to prevent erroneous input of a touch operation or the like, a part of a candidate process or a guide may be enlarged and displayed while linked to the guide, so that the touch operation becomes easy.

In the present embodiment, the focus area is described as a portion that is zoomed in through digital zooming, but the definition of the focus area is not limited thereto. In the case where a template or a decorative part is superimposed around the target content during editing, a portion that can be viewed by the user may be defined as the focus area. Also, in a digital camera or a head mounted display including a plurality of cameras, one camera captures the input content's maximum area at a wide angle, and a portion captured by another camera may be defined as the focus area.

With the present embodiment, it is possible to perform control so as to display candidate content processes on the display unit and execute a candidate content process based on a user operation or instruction received through the operation input unit. Accordingly, for example, in a digital camera equipped with a touch panel screen or an electronic device in which operation is possible through an input device such as a mouse, it is possible to receive an operation or instruction regarding a content process requested by the user while the user is viewing the candidate content processes. That is, it is possible to execute a content process intended by the user or suggest and execute a content process not conceivable by the user while preventing execution of a content process unintended by the operating user that is determined automatically by the output control unit of the content processing apparatus.

Also, with the present embodiment, an extracted candidate process can be displayed in the neighborhood of the object element. Accordingly, for example, a candidate process linked to a subject such as a zoom-in process (digital zoom process) on the subject can be intuitively recognized. That is, it is possible to reduce the occurrence of an erroneous operation or instruction regarding a candidate process on a subject included in the target content, and thus content processing can be more reliably executed.

With the present embodiment, a guiding line in accordance with an output image when an extracted candidate process is executed can be displayed. Accordingly, for example, with the guiding line, the user can intuitively recognize the result obtained from execution of the process such as a zoom-in process (digital zoom process) on a subject, and thus the user can easily select a candidate process he/she wants from among a plurality of candidate processes. That is, it is possible to reduce the occurrence of an erroneous operation or instruction regarding a candidate process not intended by the user, and thus content processing can be more reliably executed while the user can visualize the image after execution of the content processing.

[Variation 1]

Another aspect of Embodiment 3 will be described as Variation 1 with reference to FIGS. 41 and 42.

Figure 42:
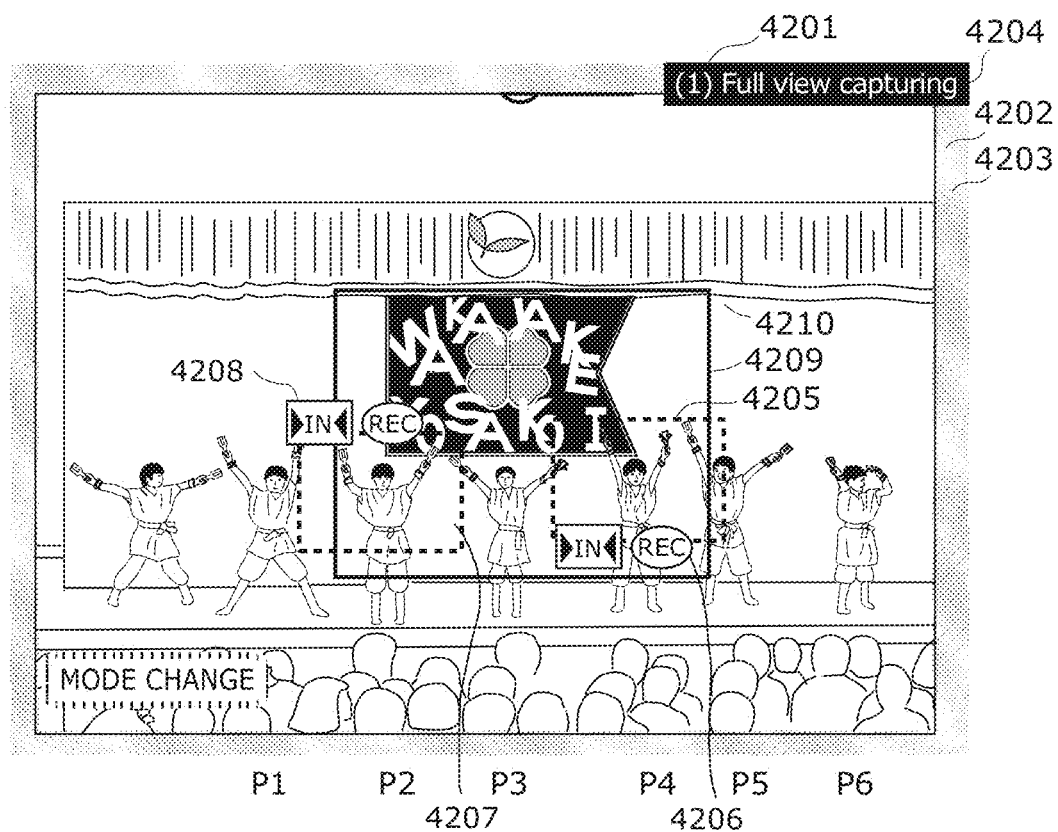
FIG. 42 is a diagram showing another example of a candidate content process display screen according to Variation 1 of Embodiment 3.

FIG. 41 is a diagram showing an example of an icon reference table according to Variation 1 of Embodiment 3, FIG. 42 is a diagram showing another example of a candidate content process display screen according to Variation 1 of Embodiment 3.

The candidate process extracting unit 108 holds therein, for example, an icon reference table used to display icons on the screen, as shown in FIG. 41

The icon reference table shown in FIG. 41 is configured such that, for example, each candidate process in the candidate process pattern table shown in FIG. 34 can be referred to by using an icon identifiable by the user such as an icon ID "ZI". In FIG. 41, the icon ID "ZI" indicates that the candidate process performs zoom-in processing, and an icon ID "ZO" indicates that the candidate process performs zoom-out processing. Also, an icon ID "FR" indicates that the candidate process captures or records the context group in a separate file. With respect to the icon ID "FR", in addition to an icon displayed before execution of the candidate process, an icon for stopping the process displayed during execution of the process is also prepared.

In response to an instruction from the output control unit 104, the display unit 112 displays the number and name of candidate processes.

In the present variation, the display unit 112 accesses data necessary to display the icon data such as a file name, a file path and the like that are not shown in the diagram by referring to the icon ID, and displays a screen, for example, as shown in FIG. 42. In FIG. 42, the candidate process name "auto zoom-in" is not displayed, as compared to the screen shown in FIG. 38. A guide 4205 and a candidate process icon 4206 are displayed with respect to the context group "G1.", a guide 4207 and a candidate process icon 4208 are displayed with respect to the context group "G2", and a guide 4209 and a candidate process icon 4210 are displayed with respect to the context group "G4". The same applies to the context group "G3", the context group "G5" and the subsequent context groups, and thus descriptions thereof are omitted in order to simplify the description of the specification.

As described above, in the present variation, in the case where there are a plurality of candidate processes with respect to a single context group, the plurality of candidate processes can be presented simultaneously to the user with the use of icons that can be intuitively recognized by the user.

According to the present variation, it is possible to display icons indicating the outlines of extracted candidate processes, and icons or menus that facilitate designation of an operation or instruction through the operation input unit. Accordingly, for example, with such icons, the user can intuitively recognize a process such as a zoom-in process (digital zoom process) on a subject, and in the case where a plurality of candidate processes are shown on the same screen, the user can easily select a candidate process he/she wants by using an icon or menu. That is, it is possible to reduce the occurrence of an erroneous operation or instruction regarding a candidate process not intended by the user, and thus content processing can be more reliably executed while the user recognizes the outline of the content processing.

[Variation 2]

Another aspect of Embodiment 3 will be described as Variation 2 with reference to FIGS. 43 and 44.

Figure 43:
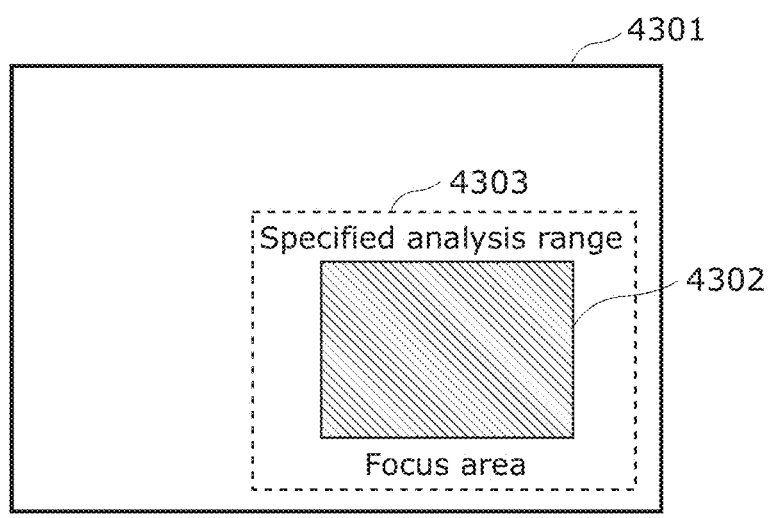
FIG. 43 is a diagram showing an example of an arrangement of a focus area and a specified analysis range in an input content's maximum area according to Variation 2 of Embodiment 3.
Figure 44:
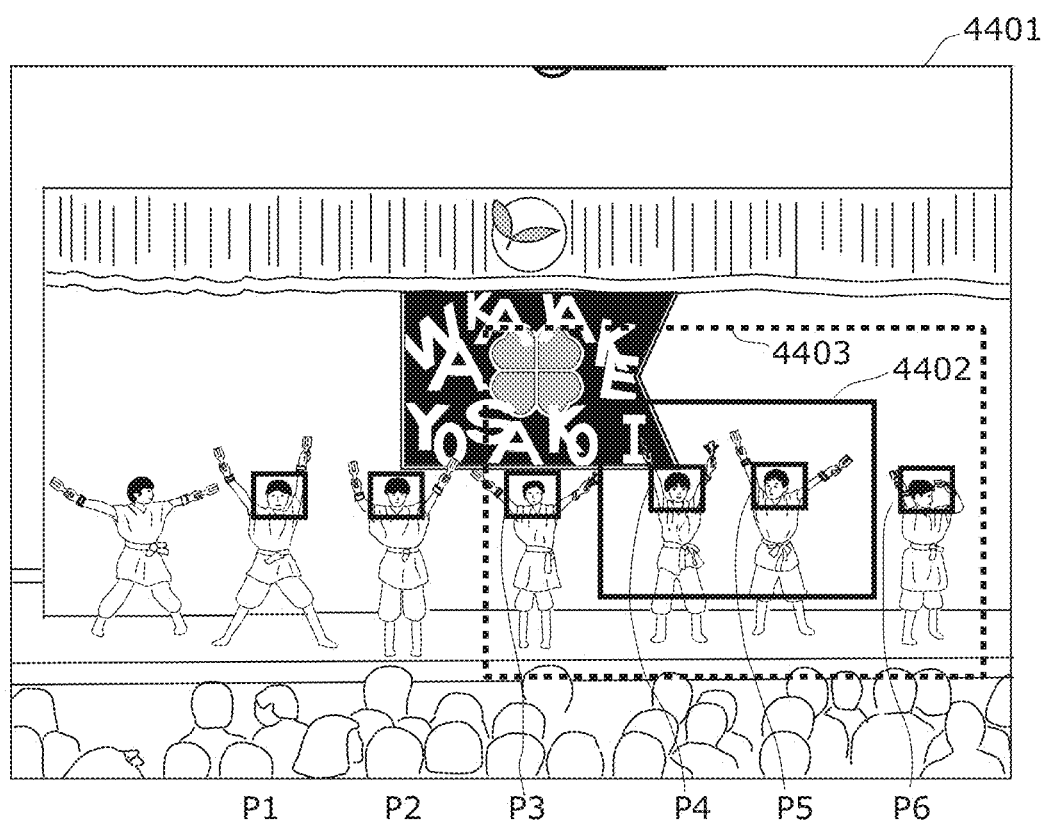
FIG. 44 is a diagram showing an internal state of content analysis processing according to Variation 2 of Embodiment 3.

FIG. 43 is a diagram showing an example of an arrangement of a focus area and a specified analysis range in an input content's maximum area according to Variation 2 of Embodiment 3. FIG. 44 is a diagram showing an internal state of content analysis processing according to Variation 2 of Embodiment 3.

In the present variation, as shown in FIG. 43, for example, the output control unit 104 constantly acquires and manages a maximum area 4301 and a current focus area 4302 of the input content to be processed. Then, when the output control unit 104 requests the content analysis unit 105 to perform content analysis processing on the input content, the output control unit 104 provides an instruction to calculate a specified analysis range in the current focus area 4302 and perform content analysis processing only on the specified analysis range.

In response to a request from the output control unit 104, the content analysis unit 105 extracts object elements from only the specified analysis range. As a result, as shown in FIG. 44, only the object elements within a specified analysis range 4403 of a focus area 4402 in an input content's maximum area 4401 are extracted. Here, the extracted object elements are the aforementioned object elements "P3" to "P6" indicating people.

According to the present variation, it is possible to perform control so as to perform analysis processing based on the focus area on the target content. Accordingly, for example, in the case where the resolution of the maximum area is 4096 horizontal pixels×2160 vertical pixels, and the resolution of the specified analysis range in the focus area is 1024 horizontal pixels×768 vertical pixels, candidate processes can be extracted only through analysis of object elements included in the specified analysis range in the focus area, and thus the load of content analysis processing on the maximum area can be reduced. Accordingly, as a result of the processing load being reduced, an improvement in the response speed of the content processing apparatus and a reduction in the power consumption can be expected.

[Variation 3]

Another aspect of Embodiment 3 will be described as Variation 3 with reference to FIGS. 45 to 48.

Figure 45:
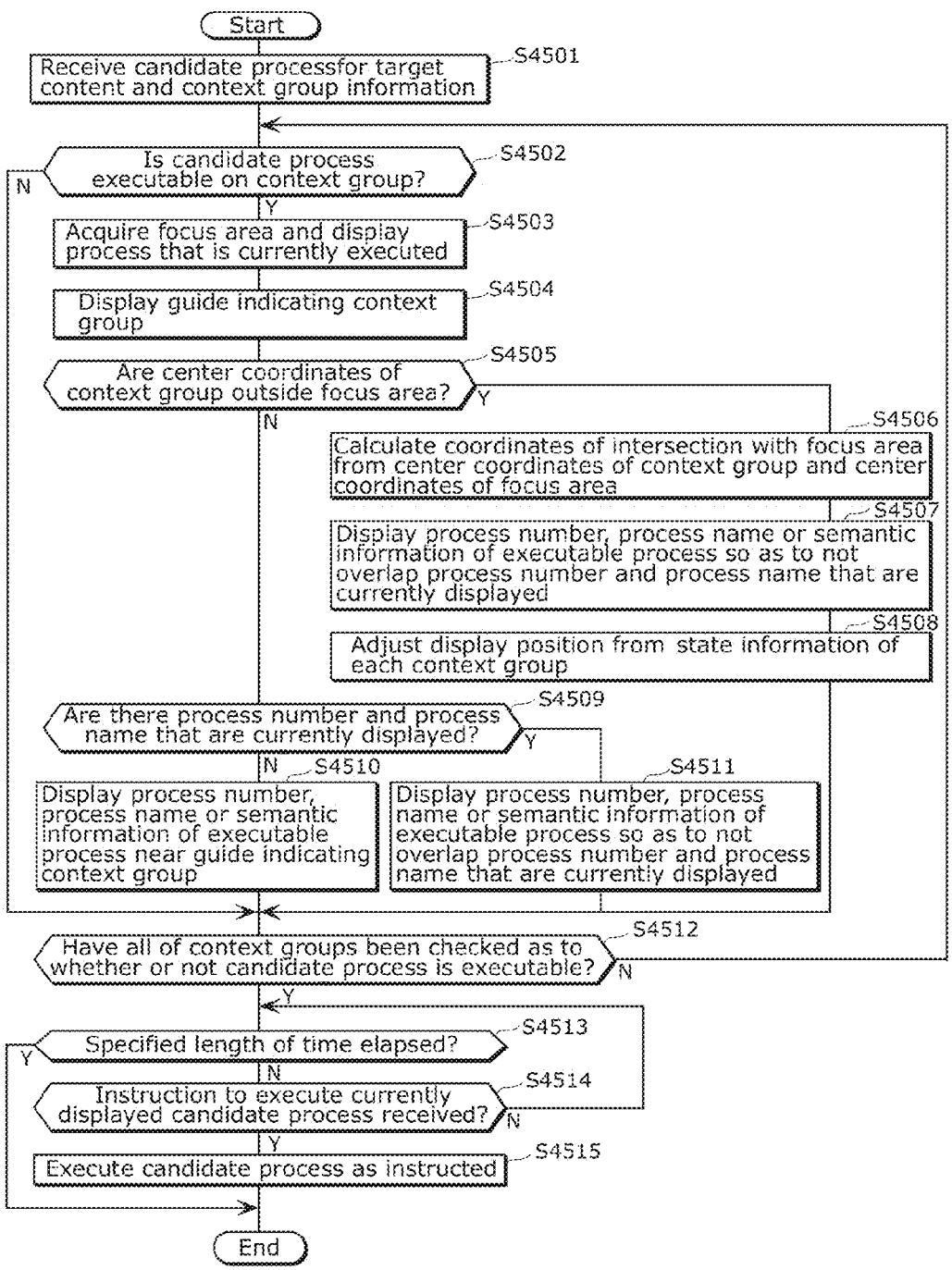
FIG. 45 is a flowchart illustrating a flow of candidate process execution processing according to Variation 3 of Embodiment 3.
Figures 46, 47:
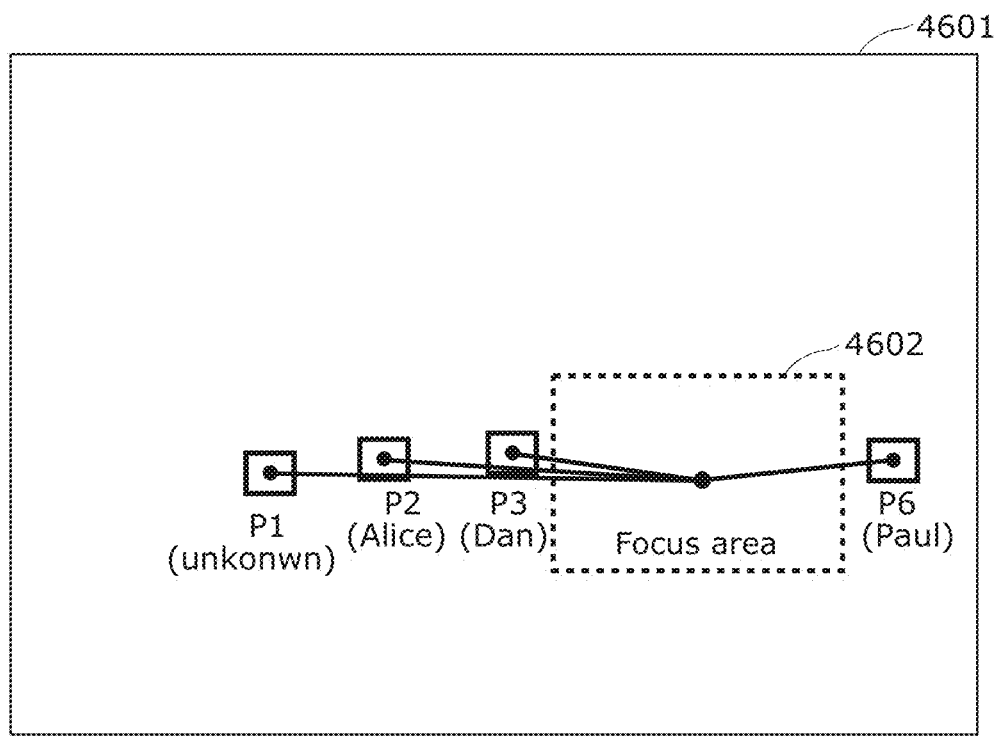
FIG. 46 is a diagram showing an example of a relative positional relationship between a focus area and context information that is outside the focus area according to Variation 3 of Embodiment 3.
FIG. 47 is a diagram showing examples of results of calculation of relative coordinates for the context information that is outside the focus area according to Variation 3 of Embodiment 3.
Figure 48:
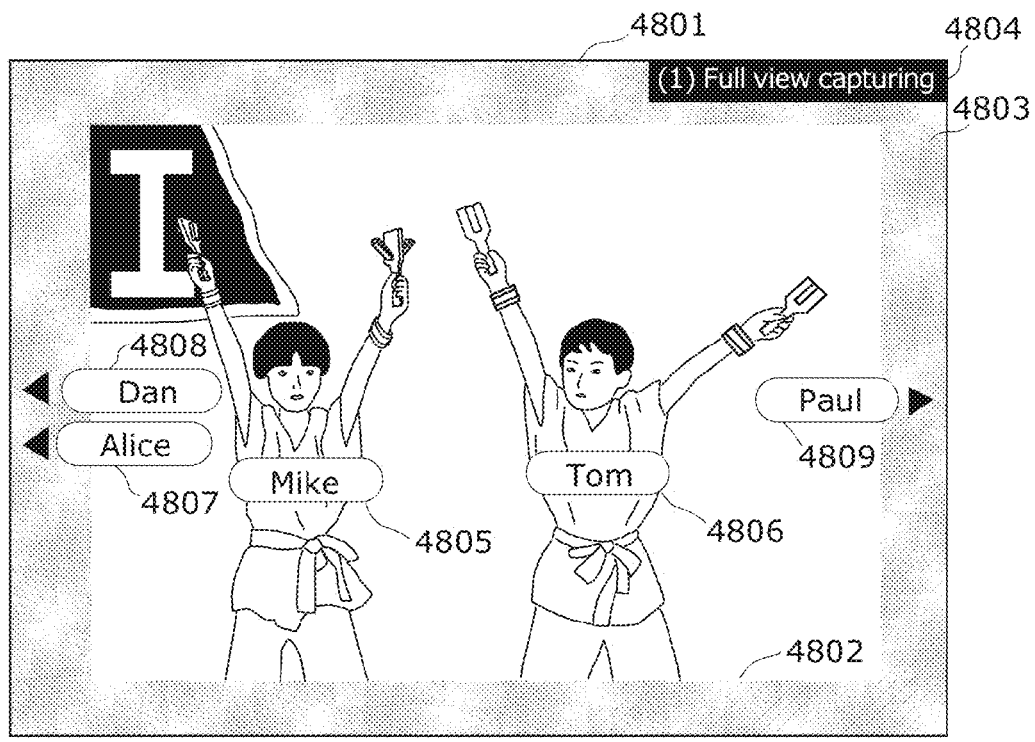
FIG. 48 is a diagram showing an example of a candidate content process display screen including candidate content processes outside the focus area according to Variation 3 of Embodiment 3.

FIG. 45 is a flowchart illustrating a flow of candidate process execution processing according to Variation 3 of Embodiment 3. FIG. 46 is a diagram showing an example of a relative positional relationship between a focus area and context information that is outside the focus area according to Variation 3 of Embodiment 3. FIG. 47 is a diagram showing examples of results of calculation of relative coordinates for the context information that is outside the focus area according to Variation 3 of Embodiment 3. FIG. 48 is a diagram showing an example of a candidate content process display screen including candidates to be subjected to context processing that are located outside the focus area according to Variation 3 of Embodiment 3.

In the flowchart of candidate process execution processing performed by the output control unit 104 shown in FIG. 45, steps S4501 to S4504 and steps S4509 to S4515 are similar to the corresponding steps in FIGS. 18, 22, and 37, and thus descriptions thereof are omitted.

In step S4505, the output control unit 104 checks whether the set of center coordinates of a context group is outside the focus area.

If it is determined that the set of center coordinates of the context group is outside the focus area (Yes in S4505), the output control unit 104 calculates a set of relative coordinates from a straight line connecting the set of center coordinates of the context group and the set of center coordinates of the focus area and an intersection with an end of the focus area (S4506).

For example, in the example shown in FIG. 46, in an input content's maximum area 4601, a focus area 4602 is present as a part of the input content's maximum area 4601, and thus the output control unit 104 logically calculates, for each of the context groups "P1" to "P3" and "P6" that are located outside the focus area 4602, a straight line extending from the set of center coordinates of the focus area 4602 to the set of center coordinates of the context group. Then, the output control unit 104 calculates a set of coordinates of an intersection with an end 4602 of the focus area as the set of relative coordinates.

For example, where coordinate axes are newly defined in the focus area 4602, the output control unit 104 calculates, for example, the set of relative coordinates of "P1" to be "0, 348", the set of relative coordinates of "P2 (Alice)" to be "0, 332", and the set of relative coordinates of "P3" to be "0, 315", as shown in FIG. 47.

In the present variation, in order to simplify the description, it is assumed that each context group includes an object element indicating people, and the name of people corresponding to the object element included in each context group is displayed, instead of the candidate process. After that, a candidate process with respect to such a context group designated by the user is displayed, which will be described below.

Next, the output control unit 104 displays the process number and process name of an executable process or the context information so as to not overlap the process number and process name that are currently displayed (S4507).

To be specific, as shown in FIG. 48, for example, the output control unit 104 causes the display unit 112 to display, with respect to a context group 4805 including "P4" and a context group 4806 including "P5" that are located within the focus area, the names of people included in the context groups such as "Mike" and "Tom" are displayed in the neighborhood of respective context groups. With respect to the context groups "P1" to "P3" and "P6" that are located outside the focus area except "P1" that is located at the leftmost position and was unable to be identified, the output control unit 104 causes the display unit 112 to display point icons indicating the direction in which each context group appears such as solid triangles in a margin area 4803 based on the set of relative coordinates. Furthermore, control is performed such that, in the order of appearance of the context groups, "P2 (Alice)" (indicated by 4807) that appears second from the left side is shown at a position further left than "P3 (Dan)" (indicated by 4808) that appears third from the left side. Also, "P6 (Paul)" (indicated by 4809) located on the right of the focus area is shown on the right side of the focus area. It is thereby possible to present the user, by using the margin area 4803, that there are context groups outside the focus area.

In the present variation, in order to simplify the description, a method has been described in which, instead of displaying candidate processes with respect to the context groups, person's names are displayed as context information corresponding to the object elements included in the context groups so as to intuitively present the user that there are context groups outside the focus area, but the display method is not limited thereto. For example, it is also possible to set the size of the margin area to be relatively large and display the context groups located outside the focus area together with candidate processes such that all of them fit within the margin area. It is also possible to, for each context group located outside the focus area, display the name of a candidate process or an icon indicating the outline of a candidate process, or display images output as a result of execution of candidate processes in the form of thumbnails or the like.

According to the present variation, control can be performed so as to display candidate processes in the candidate process display area other than the focus area. Accordingly, it is possible to, for example, display candidate processes in the candidate process display area while displaying the content of the target content in the focus area. In this way, the reduction in the visibility of the target content caused by candidate processes being displayed overlapping the object elements in the focus area can be avoided, and a desired process can be executed by simply selecting a candidate process displayed in the candidate process display area.

Also, according to the present variation, object elements located in an area other than the focus area in the target content can be analyzed, and candidate processes with respect to the object elements located in an area other than the focus area can be extracted. Accordingly, for example, in addition to the people displayed in the focus area, other object elements that need to be captured, viewed or edited can be found, and candidate processes with respect to the people and common objects that are not displayed in the focus area are displayed. It is therefore possible to instantly zoom out (digitally zoom out) on the content by the user simply selecting a candidate process to be executed. In this way, it is possible to suggest and execute a content process with respect to an object element located in an area other than the focus area, which is not conceivable by the user, in addition to the content processes in the focus area which are intended by the user.

Also, according to the present variation, candidate processes with respect to the object elements located in an area other than the focus area can be displayed in the direction of appearance and in the order of appearance with respect to the center of the focus area. Accordingly, for example, in addition to the people displayed in the focus area, the presence of other object elements that need to be captured, viewed or edited as well as the direction in which the object elements are present can be visualized, which makes selection of a candidate process for a person or common object that is not displayed in the focus area more intuitive with the use of the order of appearance and the like, and thus the user can select a candidate process and provide an instruction to execute the candidate process based on the positional relationship in the real space. In this way, the occurrence of an error when designating a candidate process with respect to an object element located in an area other than the focus area can be reduced, and thus a candidate process can be executed more reliably.

[Variation 4]

Another aspect of Embodiment 3 will be described as Variation 4 with reference to FIG. 49.

Figure 49:
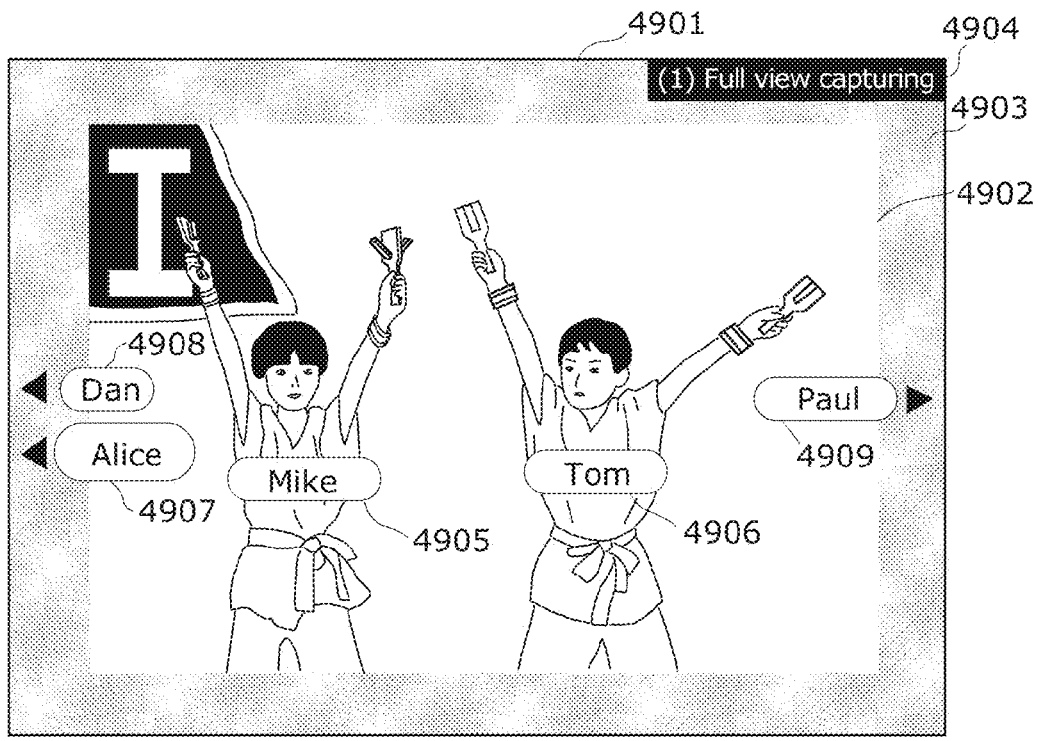
FIG. 49 is a diagram showing an example of a candidate content process display screen including candidate content processes outside the focus area of Variation 3 according to Variation 4 of Embodiment 3.

FIG. 49 is a diagram showing an example of a candidate content process display screen including candidates to be subjected to context processing that are located outside the focus area according to Variation 4 of Embodiment 3.

In the present variation, the output control unit 104 changes the indications of candidate processes linked to the context groups by using decoration according to the output priority of the context information or the execution priority of the candidate processes. As shown in FIG. 49, for example, control is performed so as to show the context information "P4 (Mike)" included in the context group that is the main subject with decoration using a special color or pattern such as shading, rather than by using an ordinary icon with a white background such as an indication 4905. Also, control is performed so as to show the context information "P2 (Alice)" that is contained in a context group having a relatively high output priority and is located outside the focus area with decoration using an indication (indicated by 4907) larger than an ordinary icon with a white background and also making the character string bold. Furthermore, control is performed so as to show the context information "P3 (Dan)" included in a context group having a low output priority by using an indication (indicated by 4908) that is smaller than an ordinary icon but can be visually recognized by the user.

As described above, according to the present variation, control is possible so as to highlight the indications of candidate processes with decoration or the like according to the output priority of the context information. Accordingly, for example, the user can easily find the main subject and an important secondary subject. Also, the presence or absence of subjects that need to be captured, viewed or edited other than the people displayed in the focus area can be notified to the user through such highlighting. In this way, it is possible to reduce the opportunity loss such as in the case where the user misses an object element.

[Variation 5]

Another aspect of Embodiment 3 will be described as Variation 5 with reference to FIGS. 50 to 55.

Figure 51:
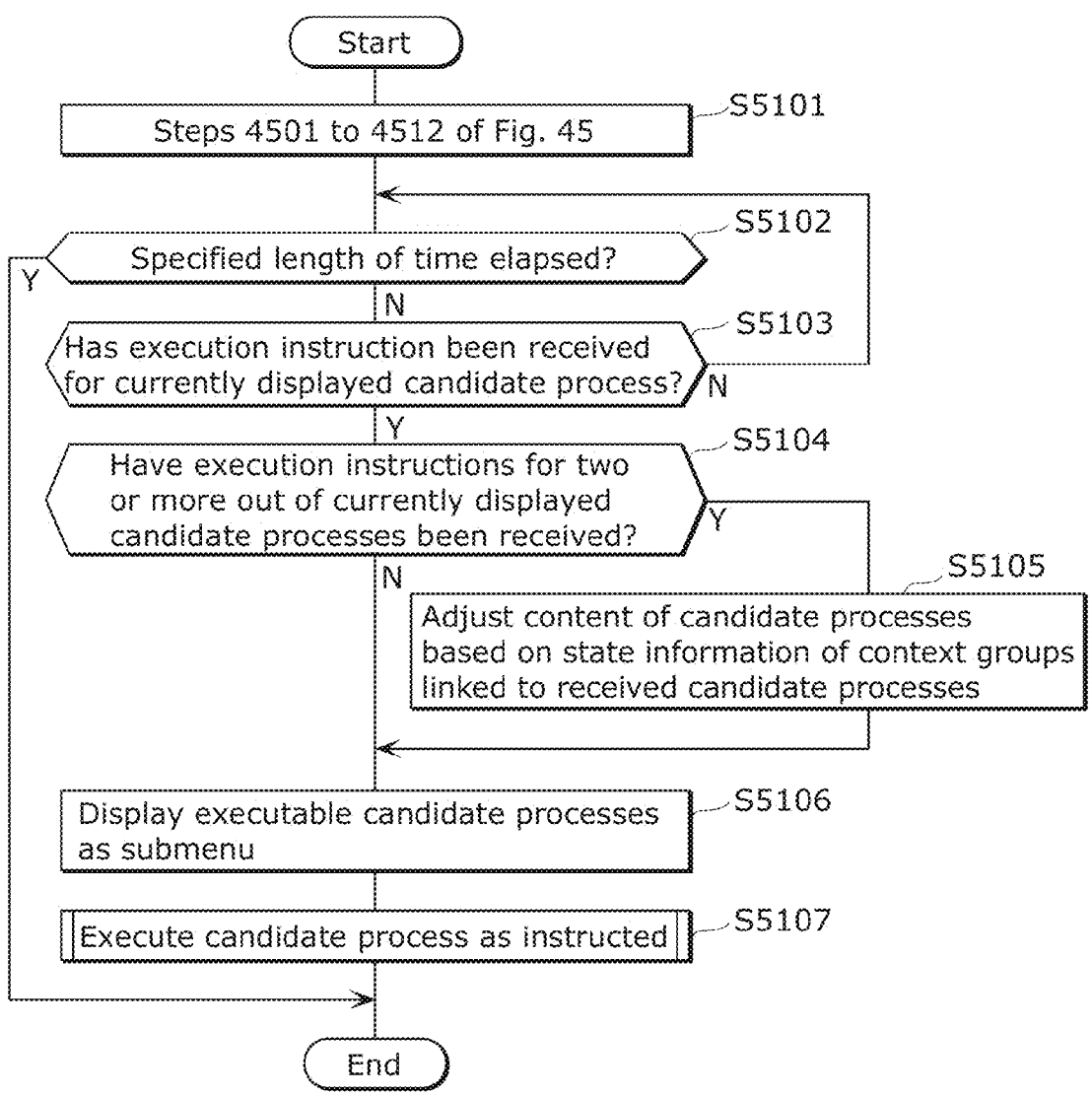
FIG. 51 is a flowchart illustrating a flow of candidate process execution processing according to Variation 5 of Embodiment 3.
Figure 52:
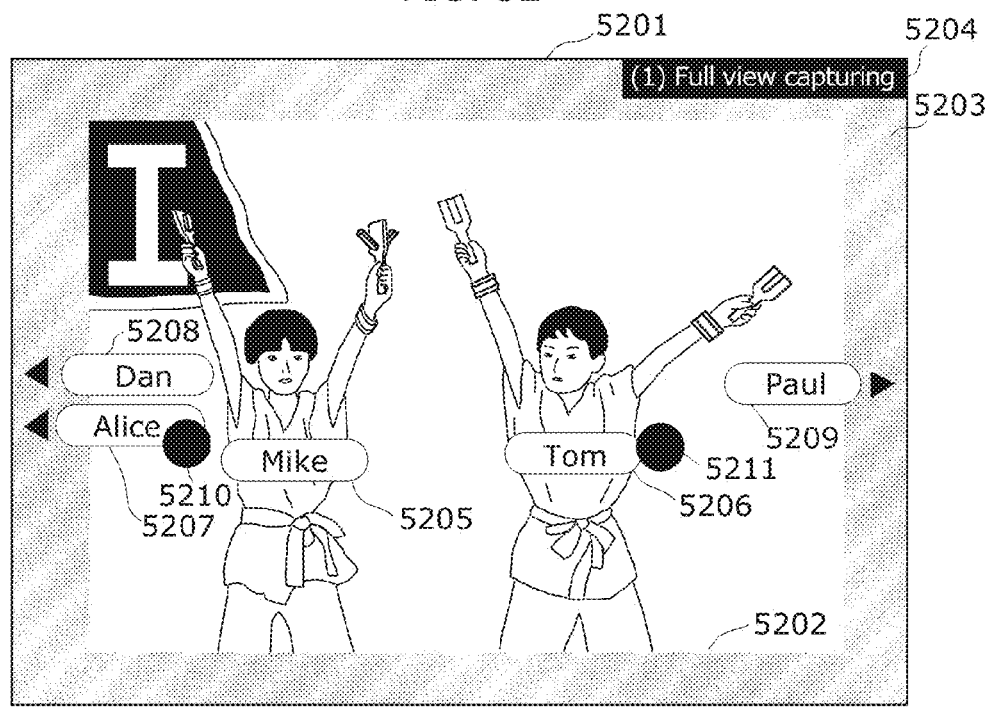
FIG. 52 is a diagram showing an example of a candidate content process display screen according to Variation 5 of Embodiment 3.
Figure 53:
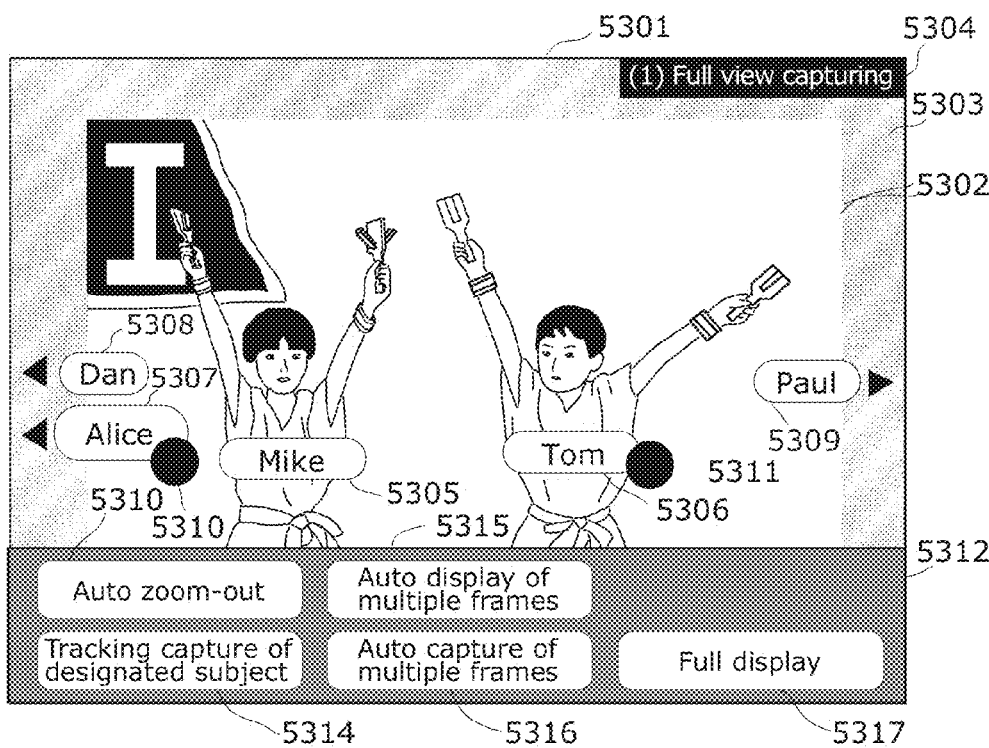
FIG. 53 is a diagram showing an example in which a submenu is displayed in the candidate content process display screen according to Variation 5 of Embodiment 3.

FIG. 50 is a diagram showing an example of a candidate process pattern table according to Variation 5 of Embodiment 3. FIG. 51 is a flowchart illustrating a flow of candidate process execution processing according to Variation 5 of Embodiment 3. FIG. 52 is a diagram showing an example of a candidate content process display screen according to Variation 5 of Embodiment 3, FIG. 53 is a diagram showing an example in which a submenu is displayed in the candidate content process display screen according to Variation 5 of Embodiment 3.

In the present variation, the candidate process extracting unit 108 holds therein a candidate process pattern table shown in FIG. 50. FIG. 50 shows an example in which a requirement requiring that a plurality of context groups are selected is added to the candidate process patterns shown in FIG. 34. Here, for example, a candidate process E7 indicates a process of, when a plurality of context groups are designated, displaying the context group areas as separate frames as "auto display of multiple frames". Likewise, a candidate process E8 indicates a process of, when a plurality of context groups are designated, combining the context groups in a single moving image, and clipping and recording separately from the display of the focus area, as "auto capture of multiple frames".

Next, a description will be given of a flow of receiving processing and a flow of multiple frame outputting processing in candidate process execution processing performed by the output control unit 104 when a plurality of context groups are designated.

In the flowchart of the candidate process execution processing performed by the output control unit 104 shown in FIG. 51, steps S5101 to S103 are similar to the corresponding steps in FIGS. 18, 22, 37 and 45, and thus descriptions thereof are omitted.

In steps S5101 and S5102, the output control unit 104 causes the display unit 112 to display candidate processes of the context groups, and receives an instruction to execute a candidate process from the user within a specified length of time.

Next, the output control unit 104 checks whether or not an instruction to execute a currently displayed candidate process has been received (S5103).

If it is determined in step S5103 that an execution instruction has been received for a currently displayed candidate process (Yes in S5103), and execution instructions for two or more candidate processes or context information among the currently displayed candidate processes have been received (Yes in S5104), the content of candidate processes is adjusted based on the state information of the context groups linked to the received candidate processes or context information (S5105). To be specific, for example, in a focus area 5202 shown in FIG. 52, indications 5205 to 5209 are displayed, and black circles that can be touched by the user via the operation input unit 113 are displayed. By the user touching "Alice" and "Tom" with the black circles 5210 and 5211 to select these two simultaneously or with a small time lag, a plurality of candidate processes or context information are selected.

Next, the output control unit 104 displays executable candidate processes in a submenu (S5106) as a result of adjustment of the content of candidate processes based on the state information of the context groups linked to two or more candidate processes or context information received by the operation input unit 113.

To be specific, for example, by black circles 5310 and 5311 shown in FIG. 53 being touched, the output control unit 104 determines, taking into consideration the order of appearance in the real space, "Alice" that is located at the leftmost position, "Dan" that appears next, "Mike" that is displayed in the focus area, and "Tom" that is designated by the touch operation as target context groups for use in adjustment of the content of candidate processes, and highlights the displayed icons by using colors to indicate that they are in a selectable state. Furthermore, the output control unit 104 causes the display unit 112 to display a submenu display area 5312. For example, the output control unit 104 causes the display unit 112 to display executable candidate processes that are common to the plurality of selected context groups in the submenu display area 5312. Here, the candidate process E3 is assigned as "Auto zoom-out" in a submenu 5313, the candidate process E2 is assigned as "Tracking capture of designated subject" in a submenu 5314, the candidate process E7 is assigned as "Auto display of multiple frames" in a submenu 5315, and the candidate process E8 is assigned as "Auto capture of multiple frames" in a submenu 5316. A general candidate process for displaying the whole which is the maximum area of the input content in the focus area is displayed as "Full view display" in a submenu 5317.

Next, upon receiving, with respect to one of the presented submenus, an execution instruction via the operation input unit 113, the output control unit 104 executes the candidate process as instructed (S5107).

Figure 54:
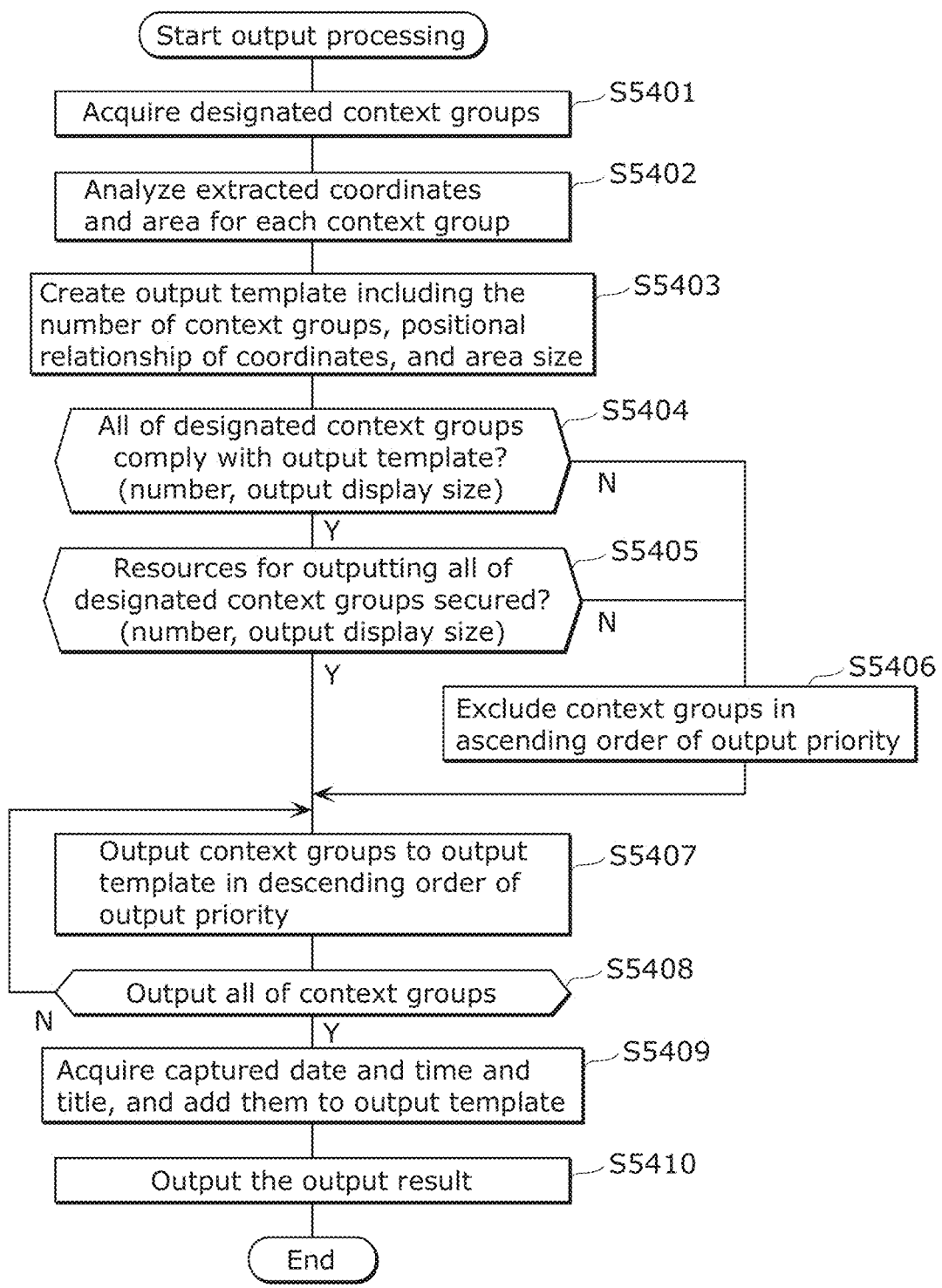
FIG. 54 is a flowchart illustrating a flow of multiple frame output processing according to Variation 5 of Embodiment 3.
Figure 55:
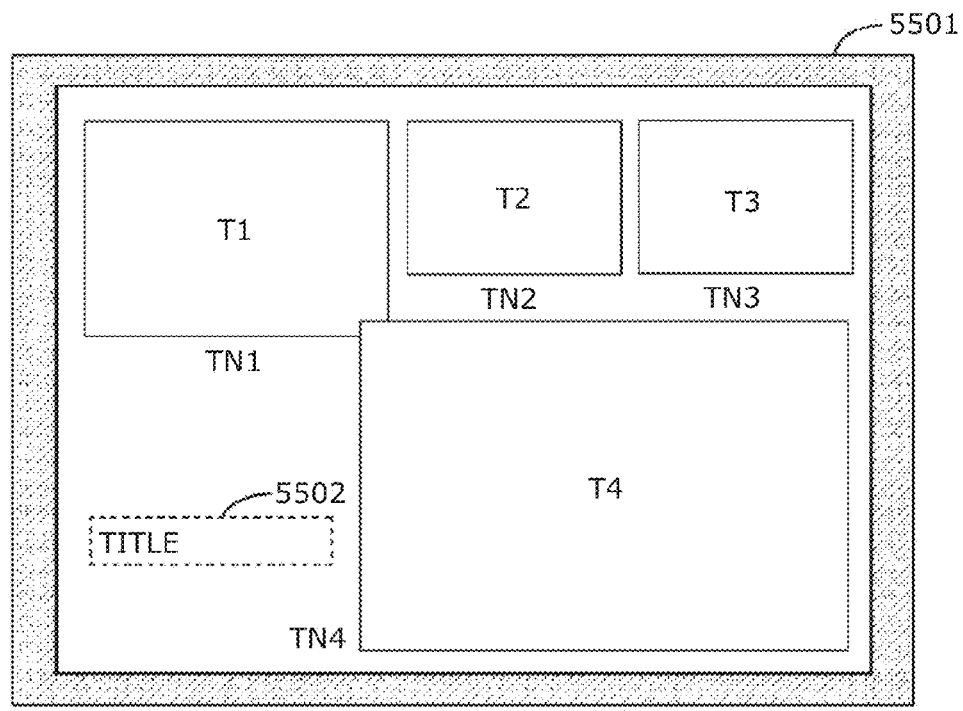
FIG. 55 is a diagram showing an example of a multiple frame combining template according to Variation 5 of Embodiment 3.
Figure 56:
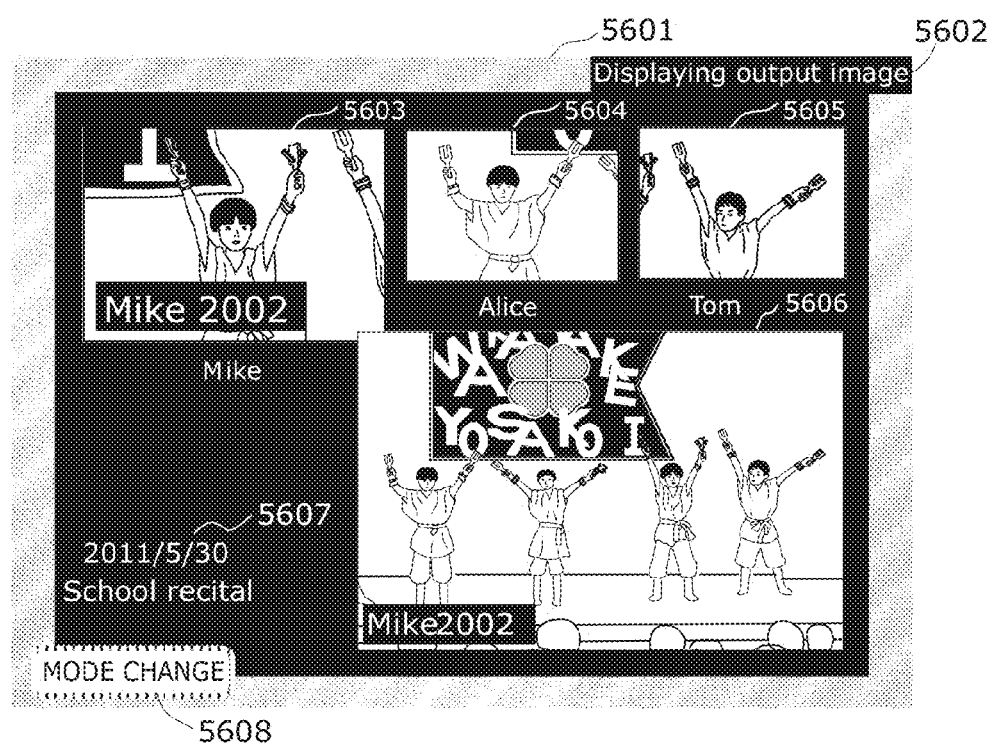
FIG. 56 is a diagram showing an example of a screen that displays multiple frames output as a result of the multiple frame output processing according to Variation 5 of Embodiment 3.

FIG. 54 is a flowchart illustrating a flow of multiple frame output processing according to Variation 5 of Embodiment 3, FIG. 55 is a diagram showing an example of a multiple frame combining template according to Variation 5 of Embodiment 3. FIG. 56 is a diagram showing an example of a screen that displays multiple frames output as a result of the multiple frame output processing according to Variation 5 of Embodiment 3.

The flowchart shown in FIG. 54 shows a flow of output processing in the case of displaying multiple frames, which is a specific example of step S5107 in the candidate process execution processing shown in FIG. 51. Hereinafter, an example will be described in which the designated context groups are displayed as multiple frames.

First, the output control unit 104 acquires at least one content group received by the operation input unit 113 from the user (S5401).

Next, the content analysis unit 105 performs analysis to acquire a set of extraction coordinates and an extraction area extracted from each context group (S5402).

Next, the output control unit 104 creates an output template that can be output by the content processing apparatus 100 for each candidate process based on the number of designated context groups, the positional relationship between context groups based on the set of extraction coordinates, the size of extraction area, and the like (S5403).

Here, the "multiple frame combining template" that displays the designated context groups as separate frames will be described as an example.

A multiple frame combining template 5501 shown in FIG. 55 has separate frames "T1" to "T4", and the like. In response to a request from the output control unit 104, the content processing unit 110 partially clips the input content based on the set of extraction coordinates and the extraction area of each context group, and assigns the clipped moving images to separate frames. Here, the names of the separate frames are indicated as "TN1" to "TN4", and the name of the multiple frame combining template is indicated as "TITLE (5502 in the diagram)".

Next, with respect to the created output template, the output control unit 104 determines whether all of the designated context groups comply with the output template based on the number of context groups that need to be included in the output template and the output display sizes such as the number of frames (S5404).

If it is determined in step S5404 that all of the context groups comply with the output template (Yes in S5404), it is checked whether output resources for assigning all of the designated context groups to the output template are available in the content processing apparatus 100 (S5405). As used herein, the output resources refer to the preparation and processing power required for general digital processing such as, for example, the channels for processing the moving images, CPU processing, and a free space required for output in the storage unit 102.

If it is determined in step S5405 that the resources are available (Yes in S5405), the output control unit 104 outputs the context groups sequentially to the output template in descending order of the output priority (S5407), and checks whether all of the context groups have been output (S5408).

If negative determinations are made in steps S5404 and step S5405, context groups are excluded from among the designated context groups in ascending order of the output priority such that the context groups comply with the output template (S5406).

Next, when the output control unit 104 determines that all of the designated context groups have been output (Yes in S5408), thereafter the output control unit 104 acquires the captured date and time of the input content, the event title of the input content and the like that can be output to the output template, and combines them into the output template (S5409).

Then, the output control unit 104 outputs the output result (S5410). Here, for example, the output control unit 104 causes the display unit 112 to display the resulting multiple frames, and outputs a file intended to be displayed as multiple frames in the storage unit 102.

FIG. 56 shows an example of the resulting multiple frames output to the "multiple frame combining template" shown in FIG. 55. To be specific, the context group "G1" (the video of the main subject P4: Mike) is combined to "T1" in the multiple frame combining template, and "Mike", which is the context information of the main subject, is combined to "TN1". Similarly, the context group "G2" and the subsequent context groups are output to "T2" to "T4" according to the output priority. Also, "2011 May 30 School Recital" indicating the captured date and time and the event name is output to "TITLE (5502 in the diagram)" in the multiple frame combining template.

Note that, in the present variation, when a plurality of context groups are selected as candidates to be processed, context groups according to the order of appearance are set as targets to be processed at a time, but the method of adjusting the content of the candidates to be processed when a plurality of context groups are selected is not limited thereto. For example, adjustment of the content of candidates to be processed may be performed only on context groups that are individually selected, or only on context groups having higher priorities.

Also, in the present variation, in order to simplify the description, the output template is created by the output control unit 104 as appropriate. However, the method of creating the output template is not limited thereto. For example, a predetermined number of output patterns may be prepared in a template management table (not shown) managed in the output control unit 104.

Also, in the present variation, in order to simplify the description, the case where the object elements extracted by the content analysis unit 105 are common objects is not described, but the present variation is not limited thereto. For example, the output control unit 104 may determine that any common object is not assigned to a separate frame "T1" or the like in step S5403, step S5404, or step S5406. Alternatively, a recommended method of using output frames may be written in the initial definition of the output template.

As described above, according to the present variation, it is possible to perform control so as to perform selection, content adjustment and display of candidate processes to be processed on at least two context information designated by the user, based on the output priority and the analysis data including the positions in the real space, the order of appearance, the positional relationship, and the relationship between people. Accordingly, for example, a candidate process common to a plurality of subjects can be selected intuitively and easily, and candidates to be processed can be presented according to the positions in the real space. In this way, erroneous operations by the user can be prevented, and the number of operations can be reduced.

Also, according to the present variation, an output template including at least one selected context information (context information) can be generated based on the output priority and the analysis data including the position of the context information in the real space, the order of appearance, the positional relationship, and the relationship between people, and displayed as multiple frames in a single screen and output as a composite file. Accordingly, for example, moving images displayed as multiple frames can be generated according to the template that can be dynamically changed, and it is possible to eliminate the burden of having to edit a single moving image from a plurality of moving images by using a dedicated tool such as a personal computer. In this way, it is possible to achieve a new means that generates composite footage in which at least one piece of context information is arranged at the same time when an operation such as image-capturing or viewing is performed.

[Variation 6]

Another aspect of Embodiment 3 will be described as Variation 6 with reference to FIGS. 57 and 58.

Figure 57:
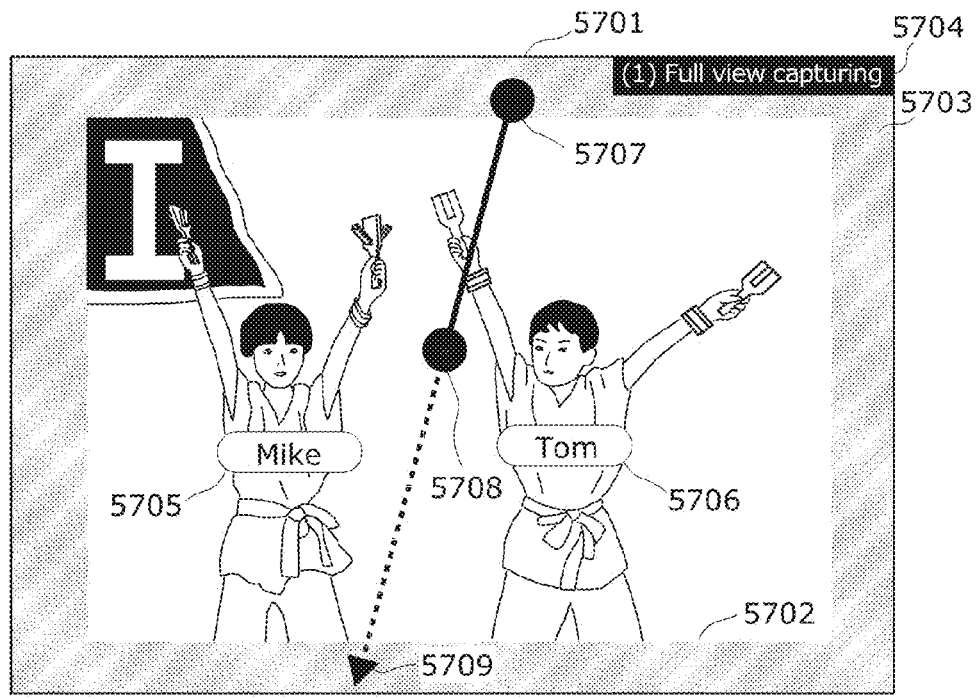
FIG. 57 is a diagram showing an example of an operation of providing an instruction to perform output processing on context information according to Variation 6 of Embodiment 3.

FIG. 57 is a diagram showing an example of an operation to provide an instruction to perform output processing on context information according to Variation 6 of Embodiment 3. FIG. 58 is a diagram showing another example of a screen that displays multiple frames as an output result according to Variation 6 of Embodiment 3.

As shown in FIG. 57, for example, it is assumed that in a full screen display area 5701 displayed by the display unit 112, a part of the input content to be processed is displayed in a focus area 5702, and "(1)", which is the process number of the process currently being executed, and "Full view capturing", which is the process name of the same are displayed as an indication 5704 in a margin area 5703. Also, the following description will be given assuming that the main subject "Mike (5705)" and a secondary subject "Tom (5706)" have been extracted as the context groups within the focus area.

In Variation 5, a description has been given of a flow in which upon receiving a designation of a plurality of context groups from the operation input unit 113, the output control unit 104 causes submenus including candidate processes to be displayed and allows the user to select a candidate process, with reference to FIG. 52.

In the present variation, a case will be described with reference to FIG. 57 where, for example, the user touches a point in a margin area 5703, or in other words, outside the focus area, and drags the finger from a black circle 5707 indicated by "●" to a black circle 5708. As used herein, dragging refers to an operation of moving the finger to any position of up, down, right and left while touching.

To be more specific, the output control unit 104 detects, from the operation input unit 113, that the user has started dragging the finger from the margin area 5703, and manages the direction in which and the trajectory along which the finger is dragged. Then, when the finger is dragged in the direction indicated by an arrow 5709 in the diagram to reach the opposite side of the margin area, the output control unit 104 determines that the context groups included in the focus area are separate context groups separated by the line passing through the focus area, and then performs content adjustment as well as determination as to a candidate process is executable.

Figure 58:
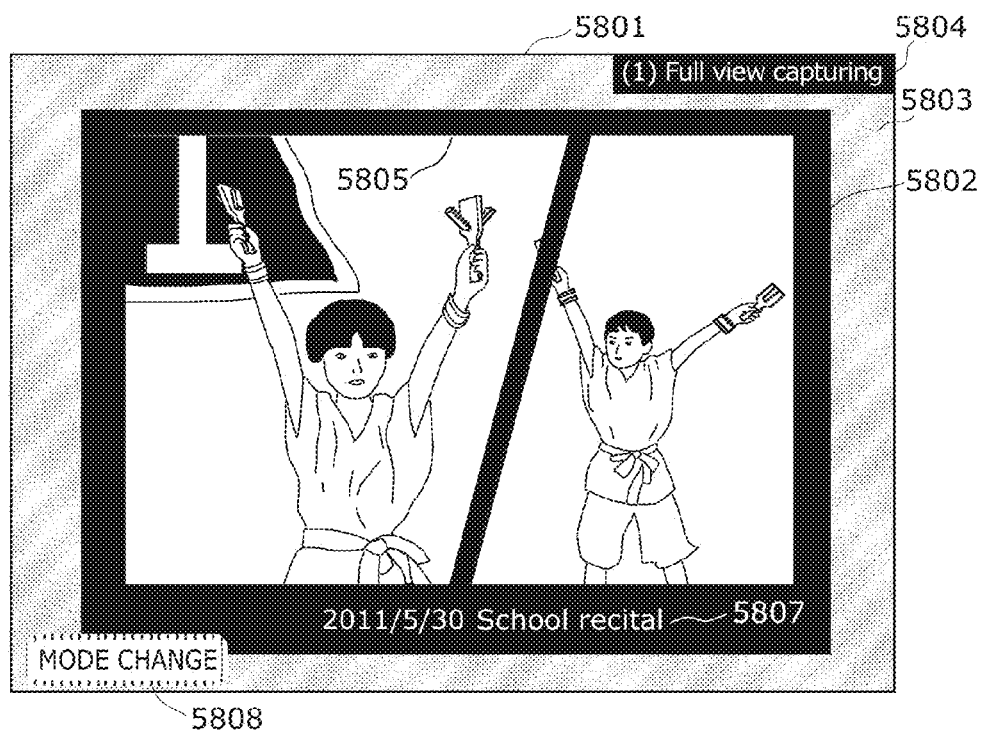
FIG. 58 is a diagram showing another example of the screen displaying multiple frames that is output as a result of multiple frame output processing according to Variation 6 of Embodiment 3.

FIG. 58 shows an example in which a context group including the context information "Mike" and a context group including the context information "Tom" are determined as separate context groups by the dragging operation of the user, and as a result the context groups are displayed as separate frames in the screen.

Here, the output control unit 104 creates an output template in which division is performed according to the trajectory along which the context groups are separated by the dragging operation (corresponding to step S5403 in FIG. 54), instead of displaying a part of the input content in a focus area 5802. Then, the moving images are respectively combined to separate frames 5805 and 5806 by adjusting the degree of clipping of the context groups such that the context information and the accompanying information are included, and then displayed together with the captured date and time and a title frame 5807.

In the diagram, a menu 5808 indicating "MODE CHANGE" is shown. To the menu 5808, a function may be assigned that changes the display mode for displaying candidate processes displayed by the display unit 112 through a touch operation on the menu 5808, in this case, the display mode can be reverted to a mode in which a part of the input content is displayed in the focus area, which was performed before the divisional screen is displayed.

Note that, in the present variation, an example was described in which the dragging operation was performed from one side of the margin area to the opposite side of the margin area via the focus area, but the touch operation including the dragging operation is not limited thereto. It is possible to, for example, perform a dragging operation of continuously surrounding context information independently of the margin area, and upon detection of a closed space defined by the dragging operation, set at least one of the context information contained in the closed space as a target to be processed. It is also possible to use a configuration in which when at least one piece of context information is surrounded with a specified shape (for example, a triangular shape, a heart shape, etc.), a candidate process assigned to the specified shape is executed (in the case where the shape is triangle, a digital zoom process is executed, in the case where the shape is heart, a heart-shaped frame is displayed in the template, etc.).

As described above, according to the present variation, in response to input of a touch operation from the user, at least one piece of context information can be designated and a candidate process can be specified. It is also possible to dynamically generate the output template based on, in addition to the context information, the trajectory of the dividing line that divides the designated area by a touch operation, the area ratio assigned to each context group, and the like, and thus candidates to be processed in the moving image, how they are combined, and the output result can be changed. Accordingly, for example, control is possible such as controlling the zoom factor based on the area ratio, or determining the angle of view of context groups to be combined based on the moving range of the object elements per unit time. In this way, designation of context information and execution of a candidate process can be achieved intuitively by a touch operation, reducing the operational burden of the user.

As described above, with the present embodiment, it is possible to implement a content processing apparatus, a content processing method, and a program that reduce the intellectual and operational burdens of the user required to perform content processing at the time of image-capturing, viewing or editing of the content.

Note that the present embodiment has been described based on the assumption that the content output as a file during image-capturing, viewing or editing is output after the content is subjected to content processing at the same time as when image-capturing, viewing or editing is performed, but the timing of processing and outputting is not limited thereto. It is also possible to, for example, store the content of processing based on an instruction determined in the content processing apparatus or an instruction received from the user, and execute the content processing asynchronously from the instruction or determination made in the content processing apparatus or the instruction or determination from the user. It is also possible to execute the content processing at a timing when the aforementioned output resources are reserved.

Also, the present embodiment has been described taking an example in which the content output as a file during image-capturing, viewing or editing is content obtained by clipping in time series the input content input at the same time as when image-capturing, viewing or editing is performed, but the input content subjected to content processing is not limited thereto. The content data 103 and the context information and the context groups of the content data 103 may be stored in the storage unit 102 as history information. Then, at the same time when image-capturing is performed, the content data 103, the context information and the context groups stored in the storage unit 102 may be referred to, and combined with the input content input from the content input unit 101. In this case, during image-capturing, viewing or editing, not only the input content to be processed but also the content data 103 stored in the storage unit 102 can be set as a target to be combined. This results in an increased breadth of image-capturing, viewing or editing, thus making it possible to provide content processing involving different renditions and combinations that are different depending on image-capturing, viewing or editing such as a slideshow in which stored past objects (subjects) that are stored and current objects (subjects) are associated with each other and displayed in a comparative manner or displayed as multiple frames and then reproduced based on the context information.

Also, the present embodiment has been described focusing on using, as the content displayed or output as a file during image-capturing, viewing or editing, target content to be captured, viewed or edited or the content data 103 stored in the storage unit 102, but the present embodiment is not limited thereto. For example, a content element to be combined at the time of displaying or outputting to a file may be configured to be combined with a decorative part (for example, an animated decorative part deformed from a landmark such as a tower, etc.) associated thereto. In this case, the breadth of combination and rendition can be increased.

[Embodiment 4]

Embodiment 4 will be described next. In the present embodiment, an example will be described in which the content processing apparatus is connected to a network.

Figure 59:
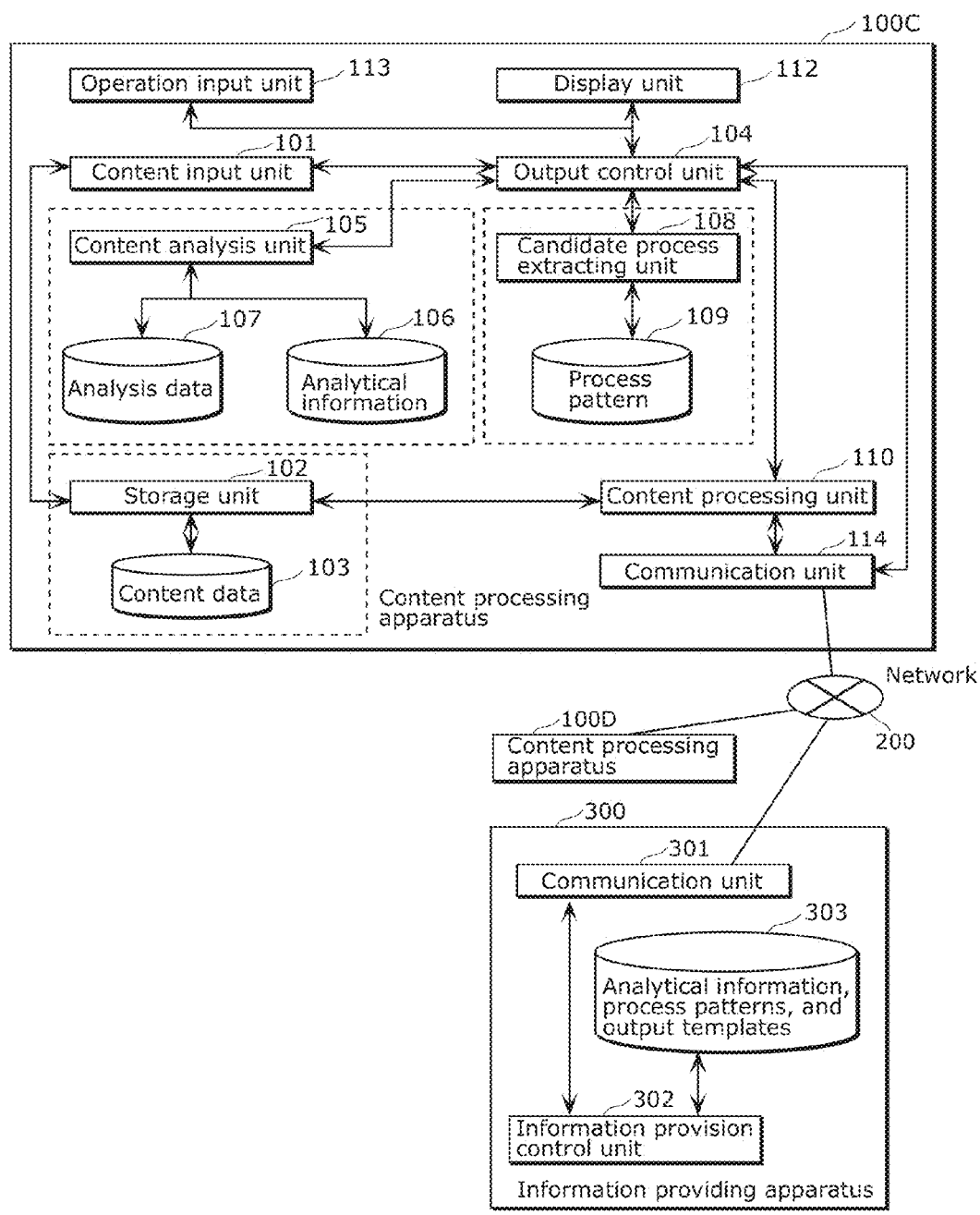
FIG. 59 is a block diagram showing a configuration of a content processing apparatus according to Embodiment 4.

FIG. 59 is a block diagram showing a configuration of a content processing apparatus 1000 according to Embodiment 4. In FIG. 59, the same reference numerals are given to structural elements that are the same as those of FIGS. 1, 21 and 25, and descriptions thereof are omitted.

The content processing apparatus 1000 shown in FIG. 59 includes a communication unit 114 in addition to the structural elements of the content processing apparatus 100B shown in FIG. 25.

The communication unit 114 performs communication with a device external to the content processing apparatus 100C. The communication unit 114 may be, for example, a communication device such as a network card, and has a function of receiving communication or a remote control with various apparatuses that are connected to the content processing apparatus 1000 and an external network 200. In the present embodiment, as shown in FIG. 59, the communication unit 114 is connected to an external content processing apparatus 100D and an external information providing apparatus 300 via the network 200 such as the Internet or an intranet.

Also, in response to a request from the output control unit 104, the communication unit 114 sends, to the information providing apparatus 300 via the network 200, a request message requesting information from the information providing apparatus 300.

Also, the communication unit 114 receives a response message from the information providing apparatus 300, checks the content of the response message, and sends, as a response, the acquired information to the output control unit 104. The acquired information can be information such as, for example, the analytical information, the process pattern and the output template that can be used in the content processing apparatus 100C.

The output control unit 104 breaks down the acquired information, and transfers the resultant to the content analysis unit 105 in the case where the information is the analytical information 106, and to the candidate process extracting unit 108 in the case where the information is the process pattern 109. In the case where the information is the output template, addition or update is performed on the output template held in the output control unit 104.

The information providing apparatus 300 includes a communication unit 301 and an information provision control unit 302. The information provision control unit 302 holds, in an internal storage 303 such as a HDD, information that can be provided to the outside and can be used in the content processing apparatus 100C such as the analytical information, the process patterns and the output templates. In the present embodiment, the information providing apparatus 300 may be, for example, an application server or content distribution server connected to the Internet or an intranet, a database or a service server such as a social networking service.

Also, the communication unit 301 receives a request message from the content processing apparatus 100C, and checks the content of the request message by using the information provision control unit 302. Here, generally, it is determined whether the content processing apparatus 100C which is the source of the request is an apparatus permitted to receive information that is provided thereto, or whether the owner of the content processing apparatus 100C has the right to receive information that is provided thereto. If it is determined that the content processing apparatus 100C is an apparatus permitted to receive the information that is provided thereto, a response message containing information useful for the content processing apparatus 100C is created and sent as a response to the content processing apparatus 100C via the communication unit 301.

The present embodiment has been described taking an example in which the content processing apparatus 100C requests the information providing apparatus 300 to provide information, but the information acquiring method is not limited thereto. It may be possible that the communication unit 114 starts information acquisition based on a request from the information providing apparatus 300 via the network 200.

Note that the present embodiment has been described, taking an example in which the analytical information, the process patterns and the output templates are used as the information acquired by the content processing apparatus 100C to add or update the information, but the information that is added or updated is not limited thereto. It is also possible to use a configuration in which, for example, the candidate process extracting unit 108 manages composition color patterns having compositions and color patterns of general moving images, and the composition color patterns are acquired from the information providing apparatus 300. It is also possible to use a configuration in which the candidate process extracting unit 108 compares the maximum area or focus area of the input content to be processed, or the moving image of the clipped area for each defined context group with the composition color patterns, and uses a candidate process (for example, digitally zooming out so as to display the entire object elements, increasing the chroma of a food that is a subject, etc.) extracted as a result of the comparison with the composition color patterns.

As described above, according to the present embodiment, it is possible to acquire information such as the updated analytical information, process patterns and output templates from the information providing apparatus connected via the network, and add the information to the information held in the content processing apparatus or update the information. Accordingly, for example, the failure in extraction of context information caused by stale analytical information can be reduced, and thus it is possible to achieve addition, improved quality and maintenance of the process patterns and output templates of the content processing method regarding output.

[Embodiment 5]

Embodiment 5 will be described next.

Figure 60:
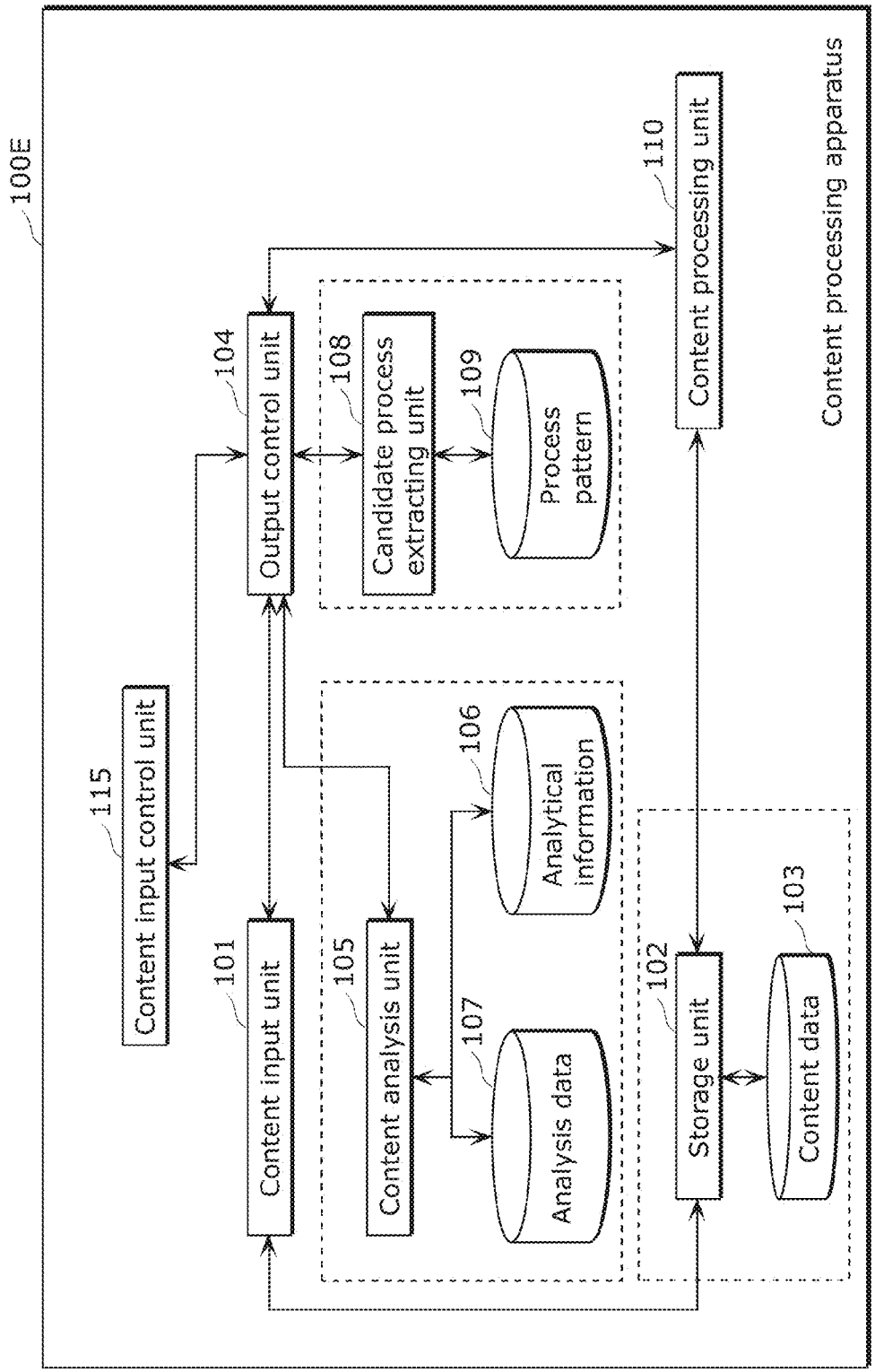
FIG. 60 is a block diagram showing a configuration of a content processing apparatus according to Embodiment 5.

FIG. 60 is a block diagram showing a configuration of a content processing apparatus 100E according to Embodiment 5. In FIG. 60, the same reference numerals are given to structural elements that are the same as those of FIG. 1, and descriptions thereof are omitted.

The content processing apparatus 100E shown in FIG. 60 is different from the content processing apparatus 100 shown in FIG. 1 in that a content input control unit 115 is added instead of the output unit 111.

The content input control unit 115 controls the content input unit 101 based on the processing result of the output control unit 104. The content input control unit 115 may be, for example, a tripod or a pan head internally provided in or equipped to the content processing apparatus 100E, and in the case where the content input unit 101 is a camera, the content input control unit 115 functions to adjust the direction in which the camera is pointing.

Figure 61A:
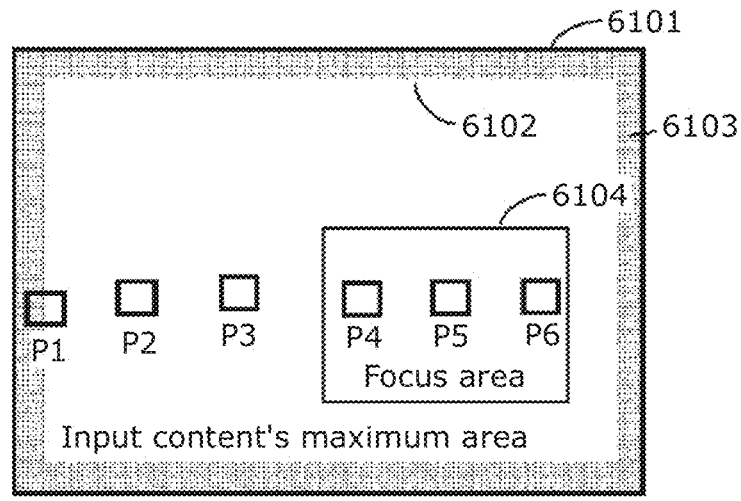
FIG. 61A is a diagram showing examples of positional relationships of context information in an input content's maximum area according to Embodiment 5.
Figure 61B:
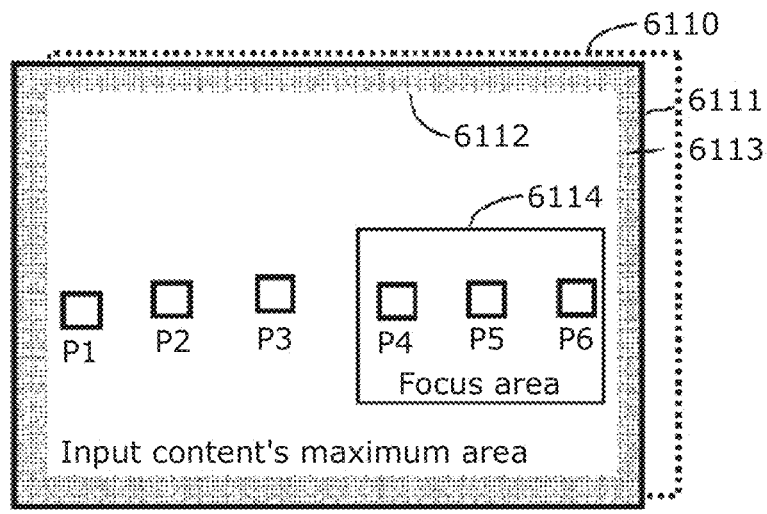
FIG. 61B is a diagram showing examples of positional relationships of context information in an input content's maximum area according to Embodiment 5.

FIGS. 61A and 61B are diagrams showing an example of a positional relationship of context information in an input content's maximum area according to Embodiment 5.

As shown in FIG. 61A, the output control unit 104 acquires input content to be processed from the content input unit 101, and requests the content analysis unit 105 to analyze the input content's maximum area. Here, the output control unit 104 defines a maximum area's margin frame 6102 shown in the diagram by using a specified width from the four sides of the maximum area. Then, the output control unit 104 requests the content analysis unit 105 to determine whether or not the context information extracted into the maximum area's margin frame 6102 lies on the boarder between an input content's maximum area 6101 and the maximum area's margin frame 6102, based on the set of extraction coordinates and the positional relationship of the extraction area that are the state information of the extracted context group. At this time, the output control unit 104 manages a focus area 6104 to which the user who is operating the content processing apparatus 100E gives attention, separately from the input content's maximum area 6101.

Here, as shown in FIG. 61A, the content analysis unit 105 extracts object elements "P1" to "P6" that are people subject information as the context information. When, for example, the context information "P1" lies overlapping the maximum area's margin area, a notification indicating the occurrence of the overlap on the maximum area's margin frame of the input content, the direction of the overlap, and the width of the overlap is sent to the output control unit 104. Upon receiving the notification from the content analysis unit 105, the output control unit 104 requests the content input control unit 115 to change the direction of the content input unit 101 according to the direction of the overlap and the width of the overlap notified from the content analysis unit 105. The content input control unit 115 changes the direction in response to the request from the output control unit 104, and sends the result as a response.

As shown in FIG. 61B, with respect to an input content's maximum area 6110 before the output control unit 104 requests the content input control unit 115 to change the direction of the content input unit 101, an input content's maximum area 6111 obtained after the request is shifted based on the position of the context information "P1" shown in FIG. 61A. That is, the state is improved and thus none of the context information "P1" to "P6" lies on the boarder between the maximum area's margin frame 6112 and a maximum area's margin frame 6113 after the direction of the content input unit 101 has been changed by the content input control unit 115.

Note that the present embodiment has been described, using as an example an overlap between the context information extracted by the content analysis unit 105 and the maximum area margin area, but the trigger for adjusting the content input unit 101 by the content input control unit 115 is not limited thereto. For example, the trigger may be an overlap between the focus area 6104 and the maximum area margin area. Alternatively, a margin area may be defined around the focus area 6104, and the trigger may be, like a focus area 6114, when it overlaps or is closer to the maximum area's margin frame 6112.

Also, the present embodiment has been described, taking an example in which the content input control unit 115 performs control so a to adjust the physical direction of the content input unit 101, but the control by the content input control unit 115 is not limited thereto. It is also possible to, for example, adjust the focal length or the like so as to prevent the context information "P1" to "P6" from being captured with blur. Also, for example, the depth of field may be adjusted according to the output priority of the context information, or these may be implemented by a physical mechanism or implemented through digital data processing.

As described above, with the present embodiment, the direction, focal length and the like of the input apparatus such as a camera can be automatically adjusted and controlled according to the state of the context information of the subjects in the input moving image such that the context information is not partially lost. Accordingly, for example, when image-capturing is performed while a part of the entire image is displayed on the screen of the digital camera by zooming in through digital zoom processing, even if the user who is capturing the image while holding the camera by hand pays too much attention to the moving image on the display screen and unintentionally changes the direction of the digital camera, the direction of the digital camera can be automatically adjusted by the pan head or the like provided in the digital camera. It is thereby possible to reduce the partial loss of the context information caused by an optical illusion of the capturing user or an operation error.

[Embodiment 6]

Embodiment 6 will be described next.

FIG. 62 is a block diagram showing a configuration of a content processing apparatus 100F according to Embodiment 6. In FIG. 62, the same reference numerals are given to structural elements that are the same as those of FIGS. 1, 21, 25, 59 and 60, and descriptions thereof are omitted.

The content processing apparatus 100F shown in FIG. 62 includes an authentication managing unit 116 in addition to the structural elements of the content processing apparatus shown in FIG. 59 or 60.

The authentication managing unit 116 performs authentication on a processing request sent to the content processing apparatus 100F. The authentication managing unit 116 has a function of performing authentication, for example, per device, per device owner (user), per social attribute to which the user belongs, or per contract.

Also, in the present embodiment, the content processing apparatus 100F is provided with a network 200 such as the Internet or an intranet, and is connected to external content processing apparatuses 100D.

Hereinafter, an example will be described in which an input moving image serving as input content and input from the content input unit 101 of the content processing apparatus 100F is viewed on the content processing apparatus 100D by way of a distribution method such as streaming. Here, in order to simplify the diagram, the constituent blocks of the content processing apparatuses 100D will be described by referring to those of the content processing apparatus 100F.

In the content processing apparatus 100F, the output control unit 104 sends, to another content processing apparatus 100D that is on the network 200 via the communication unit 114, a distribution available message indicating that the content processing apparatus 100F can distribute a moving image. The content processing apparatus 100D receives the distribution available message from the content processing apparatus 100F, and causes the display unit 112 of the content processing apparatus 100D to display a message indicating that the content processing apparatus 100F can distribute a moving image.

The operating user of the content processing apparatus 100D issues an instruction to connect to the content processing apparatus 100F, via the operation input unit 113 of the content processing apparatus 100D. The output control unit 104 of the content processing apparatus 100D sends a connection request message to the content processing apparatus 100F via the communication unit 114 in accordance with the instruction from the user.

The output control unit 104 of the content processing apparatus 100F transfers the connection request message acquired via the communication unit 114 to the authentication managing unit 116. The authentication managing unit 116 checks the content of the connection request message, determines whether the content processing apparatus 100D allows a connection to the content processing apparatus 100F, and sends a response to the output control unit 104. The output control unit 104 determines, from the response result of the authentication managing unit 116, whether or not to distribute available input content to the content processing apparatus 100D via the content input unit 101. If it is determined that distribution is possible, the output control unit 104 of the content processing apparatus 100D receives the distributed content from the content processing apparatus 100F via the communication unit 114, and displays the content on the display unit 112.

Next, the output control unit 104 of the content processing apparatus 100D sends the analytical information 106 held in the content analysis unit 105 to the content processing apparatus 100F. The content processing apparatus 100F receives the analytical information 106 from the content processing apparatus 100D, and temporarily merges it with the analytical information 106 of the content analysis unit 105. Then, the output control unit 104 of the content processing apparatus 100F transfers a definition table of the context groups extracted based on the analysis data extracted by the content analysis unit 105 to the content processing apparatus 100D.

Through the above processing, the output control unit 104 of the content processing apparatus 100D can display, on the display unit 112, the input content distributed from the content processing apparatus 100F and candidate processes from among the context groups based on the analytical information 106 obtained by merging those of the content processing apparatuses 100F and 100D.

Then, the output control unit 104 of the content processing apparatus 100D receives an instruction to execute a candidate process with respect to a context group from the operation input unit 113. In accordance with the process pattern of the content processing apparatus 100D, the output control unit 104 requests the content processing unit 110 to process the input content distributed from the content processing apparatus 100F so as to generate content data 103 in the storage unit 102 or the like of the content processing apparatus 100D or display the content on the display unit 112.

Furthermore, the output control unit 104 of the content processing apparatus 100D notifies the content processing apparatus 100F of a processing result of the candidate process executed in the content processing apparatus 100D. The output control unit 104 of the content processing apparatus 100F checks the content of the processing result notified from the content processing apparatus 100D, and uses the result when determining the priority of process pattern of the candidate process extracting unit 108 or adds or updates the result as an output template held in the output control unit 104.

Note that the present embodiment has been described, taking an example in which the content processing apparatus 100D sends a request to distribute the input content to the content processing apparatus 100F and the request is successfully authenticated, but the authentication processing of the authentication managing unit 116 is not limited thereto. It may be possible to use a configuration in which, in the case where requests to distribute content are simultaneously received from a plurality of content processing apparatuses 100D, the priority of the apparatus to which content is distributed is determined by referring to the people relationship information contained in the analytical information 106 managed by the content analysis unit 105.

Also, the present embodiment has been described taking an example in which content processing for making footage is executed in the content processing apparatus 100D, but the processing apparatus is not limited to a distributed type. A configuration is also possible in which, for example, the content processing apparatus 100F collectively receives operations of designation of at least one piece of context information and execution of a candidate process from the operation input unit 113 of the content processing apparatus 100D. In this case, it is possible that the output control unit 104 of the content processing apparatus 100F controls the execution while the authentication managing unit 116 of the content processing apparatus 100F authenticates the content processing apparatuses 100 from which operations are performed, and processes and distributes the input content by the content processing unit 110.

As described above, with the present embodiment, it is possible to perform content processing and distribution while the moving image input from other terminals via a network, the extracted context information or the like is shared between authenticated content processing apparatuses. Accordingly, for example, a new image-capturing/viewing/ editing unit can be provided that enables individual mobile terminals to clip given context information to make footage while distributing the captured moving image to the mobile terminals connected to a network and while sharing the moving image between the plurality of mobile terminals. It is also possible to provide a new image-capturing/viewing/editing unit that while extracting consistent context information by temporarily merging the facial dictionaries of individual mobile terminals, can distribute a single piece of footage to the individual mobile terminals.

The foregoing has described a content processing apparatus according to one aspect of the present invention with reference to the embodiment, but the present invention is not limited to embodiments given above. Embodiments implemented by making various modifications conceived by a person skilled in the art to any of the embodiments described herein or embodiments configured by combining the structural elements of different embodiments without departing from the spirit of the present invention may also fall within the scope of the present invention.

For example, in the embodiments, a configuration has been described in which context groups are defined based on the context information and the output priority of object elements, and candidate processes corresponding to the context groups are extracted, but it is also possible to use a configuration in which candidate processes are extracted based on the context information and the output priority, without defining the context groups. In this case, for example, the requirements and the candidate processes in the process patterns shown in the examples of FIGS. 15, 34 and 50 may be defined using the context information (context information) and the output priority.

Also, the content processing apparatuses of Embodiments 1 to 6 may be used to assist in clipping the composition such as a print order.

Also, in the case where a broadcast that can provide higher resolution than that of the current digital broadcast or a network distribution via the Internet, a cable, a satellite, a radio or the like becomes available, the content processing apparatuses of Embodiments 1 to 6 may be configured to, for example, present operations such as a zoom-in operation such that, among a plurality of people objects included in the target content, those corresponding to the people registered in advance are captured with the best angles, or may be configured to present a composition in which multiple frames are displayed while tracking people objects that correspond to the people registered in advance.

Also, the content processing apparatuses of Embodiments 1 to 6 may be configured to present a suggestion to remove an object among a plurality of objects included in the target content that is determined as unwanted from the composition candidates by exclusion, mosaicing, or image composition.

Also, the content processing apparatuses of Embodiments 1 to 6 may be configured to present a composition (operation) to divide the composition of the target content into areas, detect an area having a risk of zoom-out, and causes such a detected area to fade out.

Also, the input target content may be made of two or more input resources. In this case, the content processing apparatuses of Embodiments 1 to 6 may be configured to present a composition (operation) to divide the composition of the target content made of two or more input resources.

Also, some or all of the structural elements of the content processing apparatuses of Embodiments 1 to 6 or the information providing apparatus may be configured from a single system LSI (Large Scale Integration). For example, the content processing apparatus 100 may be configured from a system LSI including an output control unit 104 and a candidate process extracting unit 108. Likewise, for example, the information providing apparatus 300 may be configured from a system LSI including an information provision control unit 302.

A system LSI is a super-multifunctional LSI produced by integration of a plurality of constituent elements on a single chip, and can specifically be a computer system including a microprocessor, a ROM (Read Only Memory), a RAM (Random Access Memory) and the like. The ROM stores a computer program. The system LSI implements its function by the microprocessor operating in accordance with the computer program.

The above example has been discussed using a system LSI, but the system LSI may be called IC, LSI, super LSI, or ultra LSI according to the degree of integration. The method for implementing an integrated circuit is not limited to an LSI, and the integration of a circuit may be implemented by a dedicated circuit or a general-purpose processor. It is also possible to use an FPGA (Field Programmable Gate Array) that can be programmed after LSI production or a reconfigurable processor that enables reconfiguration of the connection and setting of circuit cells in the LSI.

Furthermore, if a technique for implementing an integrated circuit that can replace LSIs appears by another technique resulting from the progress or derivation of semiconductor technology, the functional blocks may of course be integrated by using that technique. Application of biotechnology or the like is possible.

Also, the present invention is not only implemented as a content processing apparatus or information providing apparatus including distinctive processing units as described above, and may be implemented as a content processing method in which the distinctive processing units of the content processing apparatus or the information providing apparatus are configured as steps. Also, the distinctive steps of the method may be implemented as a computer program that causes a computer to execute the steps. It is also possible to, needless to say, distribute such a computer program via computer-readable non-transient recording media such as CD-ROMs or via communication networks such as the Internet.

INDUSTRIAL APPLICABILITY

The present invention is applicable to a content processing apparatus, a content processing method, and a program, specifically, for example, to a content processing apparatus or the like that processes content having a relative large data size such as still images or moving images, wherein content processing such as image-capturing, viewing or editing is controlled by using the feature information of objects (subjects) included in the content. Also, the content processing apparatus according to the present invention is useful for applications such as a digital still camera, a digital video camera, a video recorder, a home server, a personal computer, a computer for use in an enterprise (workstation), a digital television receiver having an image data acquiring function, a set-top box, a car navigation system, a projector, a mobile terminal such as a tablet, a music micro system, a digital photo frame, and a remote controller terminal for controlling a device.

REFERENCE SIGNS LIST 100, 100A, 100B, 100C, 100D, 100E, 100F Content Processing Apparatus
101 Content Input Unit 102 Storage Unit
103 Content Data
104 Output Control Unit
105 Content Analysis Unit
106 Analytical Information
107 Analysis Data
108 Candidate Process Extracting Unit
109 Process Pattern
110 Content Processing Unit
111 Output Unit
112 Display Unit
113 Operation Input Unit
114 Communication Unit
115 Content Input Control Unit
116 Authentication Managing Unit
200 Network
300 Information Providing Apparatus
301 Communication Unit
302 Information Provision Control Unit
303 Storage
2301, 3801, 4001, 5701 Full Screen Display Area
2302, 2402 Moving image Display Area
2303, 3803, 4003, 4803, 5703 Margin Area
2304, 3805, 3807, 3809, 4005, 4007, 4205, 4207, 4209 Guide
2305, 2306 Processing Result Indication
2601, 2701, 4401, 4601, 6101, 6110, 6111 Input Content's Maximum Area
2602, 2603, 2702, 3502, 3802, 4002, 4302, 4402, 4602, 5202, 5702, 5802, 6104, 6114 Focus Area
2703, 2704 Common Object
3501 Input Content
3804, 3904 Character String Indication
3806, 3808, 3810, 3908, 3910 Candidate Process
3811 Menu
4006, 4008 Candidate Process Name
4206, 4208, 4210 Candidate Process Icon
4301 Maximum Area
4403 Specified Analysis Range
4806 Context Group
4905, 4907, 4908, 5205, 5209, 5704 Indication
5210, 5211, 5310, 5311, 5707, 5708 Black Circle
5312 Submenu Display Area
5313, 5314, 5315, 5316, 5317 Submenu
5501 Multiple Frame Combining Template
5709 Arrow
5805, 5806 Separate Frame
5807 Title Frame
5808 Menu
6102, 6112, 6113 Maximum Area's Margin Frame

The invention claimed is:

1. A content processing apparatus comprising:
a processor; and
a non-transitory computer-readable medium having executable instructions stored thereon that, when executed by said processor, cause said content processing apparatus to function as:
a content acquiring unit configured to acquire target content that is content to be processed;
a content analysis unit configured to extract at least two objects included in the target content and feature information indicating features of the objects, and specify context information based on analytical information and the extracted feature information, the context information indicating contexts of the objects and including attribute information, the analytical information being information for specifying the contexts of the objects, and the attribute information being information for supplementing the features of the objects and including relationship information indicating a relationship between the objects;
a processing control unit configured to control processing performed on the target content;
a candidate process extracting unit configured to extract at least one candidate process that is executable on the target content among pre-set candidate processes based on the context information and processing priority; and
an output unit configured to output a notification regarding a processing status of the candidate process,
wherein the process control unit is configured to calculate the processing priority of each of the objects based on the attribute information included in the context information,
the candidate process extracting unit is configured to extract at least one candidate process based on the context information and the processing priority,
the processing control unit is configured to, before or after execution of the candidate process extracted by the candidate process extracting unit, cause the output unit to output information indicating whether or not the candidate process is executed as the notification, and
the processing control unit is configured to, when the two objects are people and one of the two objects is an object of interest, increase the processing priority of an object having a high degree of closeness with the object of interest based on the relationship information indicating a degree of closeness between the objects.

2. The content processing apparatus according to claim 1, wherein the feature information includes at least one of a set of relative coordinates, a relative size, a relative area, an appearance timing and a duration of appearance in a time axis of the target content of the objects in the target content.

3. The content processing apparatus according to claim 1, wherein the context information includes the attribute information and state information regarding states of the objects including information indicating a positional relationship between the object of interest and the object in the target content.

4. The content processing apparatus according to claim 1, wherein the processing control unit is configured to define context group information based on the context information of each of the extracted objects and determine whether or not the candidate process extracted by the candidate process extracting unit is executed, the context group information being information indicating criteria for grouping the objects, and
the candidate process extracting unit is configured to extract at least one candidate process executable on each group into which the objects are grouped based on the context group information.

5. The content processing apparatus according to claim 4, wherein the processing control unit is configured to generate an output template containing at least one piece of context information according to the calculated processing priority and the attribute information and the state information that are contained in the context information, combine the target content linked to at least one piece of context group information while dynamically changing the output template, and output the output template.

6. The content processing apparatus according to claim 4, wherein the executable instructions, when executed by said processor, cause said content processing apparatus to further function as:
a content input control unit configured to perform control on the content acquiring unit based on a processing result of the processing control unit,
wherein the processing control unit is configured to monitor a relationship between a maximum area and the state information corresponding to context information referred to from the defined context group information, the maximum area being a maximum area where the target content acquired by the content input unit can be displayed by the display unit, and perform physical control or digital processing control on the content acquiring unit via the content input control unit according to an overlap between the maximum area and the context information or according to a state of the context information.

7. The content processing apparatus according to claim 1, wherein the executable instructions, when executed by said processor, cause said content processing apparatus to further function as:
a display unit configured to display information regarding processing performed on the target content,
wherein the processing control unit is configured to, before or after execution of at least one candidate process extracted by the candidate process extracting unit, cause the display unit to display execution information indicating whether or not the at least one candidate process is executed.

8. The content processing apparatus according to claim 7, wherein the processing control unit is configured to cause the display unit to display the execution information in a neighborhood of the objects displayed by the display unit in a visually recognizable manner based on at least one of the set of relative coordinates and the relative size contained in the feature information extracted by the content analysis unit.

9. The content processing apparatus according to claim 7, wherein the processing control unit is configured to cause the display unit to display a guiding line for visualizing an area on which at least one candidate process extracted by the candidate process extracting unit is to be executed based on at least one of the set of relative coordinates and the relative size contained in the feature information extracted by the content analysis unit.

10. The content processing apparatus according to claim 7, wherein the processing control unit is configured to manage a maximum area and a focus area, the maximum area being a maximum area where the target content acquired by the content acquiring unit can be displayed by the display unit, and the focus area being a display area currently displayed by the display unit, and
the processing control unit is configured to request the content analysis unit to analyze, among the at least one object included in the target content, only an object within a specified range in at least one of the maximum area and the focus area.

11. The content processing apparatus according to claim 10,
wherein the processing control unit is configured to:
set a candidate process display area in a predetermined portion of the focus area when the focus area is displayed by the display unit; and
cause the display unit to display at least one candidate process extracted by the candidate process extracting unit in the candidate process display area.

12. The content processing apparatus according to claim 10,
wherein the processing control unit is configured to request the content analysis unit to analyze, in addition to the object that is within the focus area, an object that is not within the focus area.

13. The content processing apparatus according to claim 10,
wherein the processing control unit is configured to:
when causing the display unit to display a candidate process with respect to a first object that is not within the focus area, calculate, from a relative positional relationship based on each feature information of second objects that are not within the focus area, a direction and order of appearance of the second objects as viewed from a center of the focus area; and
cause the display unit to display the at least one candidate process extracted by the candidate process extracting unit in the candidate process display area according to the calculated direction and order of appearance.

14. The content processing apparatus according to claim 1, wherein the executable instructions, when executed by said processor, cause said content processing apparatus to further function as:
a display unit configured to display information regarding processing performed on the target content; and
an operation input unit configured to receive an operation from a user,
wherein the processing control unit is configured to, before or after execution of the candidate process extracted by the candidate process extracting unit, cause the display unit to display at least one candidate process, and
the processing control unit is configured to, when the operation input unit receives an operation to execute at least one candidate process from among the at least one candidate process displayed by the display unit, execute a process corresponding to the at least one candidate process.

15. The content processing apparatus according to claim 14,
wherein the processing control unit is configured to cause the display unit to display at least one of (a) information indicating an outline of the candidate process and (b) an icon or menu corresponding to an operation that can be received by the operation input unit, based on the feature information extracted by the content analysis unit and at least one candidate process extracted by the candidate process extracting unit.

16. The content processing apparatus according to claim 14,
wherein the processing control unit is configured to, in response to the operation received by the operation input unit, perform designation of at least one piece of context information and specifying of a candidate process, and dynamically change an output template containing at least one piece of context information based on the operation.

17. The content processing apparatus according to claim 1, wherein the processing control unit is configured to cause the display unit to display at least one candidate process extracted by the candidate process extracting unit, and
the processing control unit is configured to change content of the at least one candidate process displayed by the display unit according to the calculated processing priority.

18. The content processing apparatus according to claim 17,
wherein the processing control unit is configured to change selecting content or processing content of the at least one candidate process displayed by the display unit according to the calculated processing priority and the attribute information and the state information that are contained in the context information.

19. The content processing apparatus according to claim 1, wherein the executable instructions, when executed by said processor, cause said content processing apparatus to further function as:
a communication unit configured to perform communication with a device external to the content processing apparatus,
wherein the processing control unit is configured to acquire, from an external information providing apparatus via the communication unit, at least one of the following: information required by the content analysis unit to extract the objects and the feature information; information required by the candidate process extracting unit to extract at least one candidate process; and information required to generate an output template containing at least one piece of context information.

20. A content processing method performed by a content processing apparatus, the method comprising:

acquiring target content by the content processing apparatus, the target content being content to be processed;

extracting at least two objects included in the target content and feature information indicating features of the objects;

specifying context information based on analytical information and the extracted feature information, the context information indicating contexts of the objects and including attribute information, the analytical information being information for specifying the contexts of the objects, and the attribute information being information for supplementing the features of the objects and including relationship information indicating a relationship between the objects;

specifying context information indicating the contexts of the object elements based on the analytical information for specifying the contexts of the objects;

controlling processing performed on the target content; and extracting at least one candidate process that is executable on the target content among pre-set candidate processes based on the context information and processing priority; and outputting a notification regarding a processing status of the candidate process, wherein in the controlling of processing, the processing priority of each of the objects is calculated based on the attribute information included in the context information, before or after execution of the candidate process extracted in the extracting of objects, in the outputting of a notification, information indicating whether or not the candidate process is executed is output as the notification, and in the controlling of processing, when the two objects are people and one of the two objects is an object of interest, the processing priority of an object having a high degree of closeness with the object of interest is increased based on the relationship information indicating a degree of closeness between the objects.

21. A computer-readable non-transitory recording medium in which a program for causing a computer to execute content processing performed by a content processing apparatus is recorded, the processing comprising:

acquiring target content by the content processing apparatus, the target content being content to be processed;

extracting at least two objects included in the target content and feature information indicating features of the objects;

specifying context information based on analytical information and the extracted feature information, the context information indicating contexts of the objects and including attribute information, the analytical information being information for specifying the contexts of the objects, and the attribute information being information for supplementing the features of the objects and including relationship information indicating a relationship between the objects;

specifying context information indicating the contexts of the object elements based on the analytical information for specifying the contexts of the objects;

controlling processing performed on the target content; and extracting at least one candidate process that is executable on the target content among pre-set candidate processes based on the context information and processing priority; and outputting a notification regarding a processing status of the candidate process, wherein in the controlling of processing, the processing priority of each of the objects is calculated based on the attribute information included in the context information, before or after execution of the candidate process extracted in the extracting of objects, in the outputting of a notification, information indicating whether or not the candidate process is executed is output as the notification, and in the controlling of processing, when the two objects are people and one of the two objects is an object of interest, the processing priority of an object having a high degree of closeness with the object of interest is increased based on the relationship information indicating a degree of closeness between the objects.

* * * * *